(12) United States Patent
Koseki

(10) Patent No.: US 8,943,266 B2
(45) Date of Patent: Jan. 27, 2015

(54) STORAGE SYSTEM AND METHOD OF CONTROL FOR STORAGE SYSTEM

(71) Applicant: Hitachi, Ltd., Tokyo (JP)

(72) Inventor: Hideyuki Koseki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/114,857

(22) PCT Filed: Mar. 13, 2013

(86) PCT No.: PCT/JP2013/057056
§ 371 (c)(1),
(2) Date: Oct. 30, 2013

(87) PCT Pub. No.: WO2014/141411
PCT Pub. Date: Sep. 18, 2014

(65) Prior Publication Data
US 2014/0281168 A1    Sep. 18, 2014

(51) Int. Cl.
*G06F 12/02* (2006.01)
(52) U.S. Cl.
CPC .... *G06F 12/0246* (2013.01); *G06F 2212/7208* (2013.01)
USPC .................. 711/103; 711/E12.008; 711/171; 711/E12.002

(58) Field of Classification Search
None
See application file for complete search history.

(56) References Cited

U.S. PATENT DOCUMENTS

| 5,630,093 | A | 5/1997 | Holzhammer et al. | |
|---|---|---|---|---|
| 2003/0084238 | A1 | 5/2003 | Okada et al. | |
| 2007/0086260 | A1 | 4/2007 | Sinclair | |
| 2008/0140918 | A1 | 6/2008 | Sutardja | |
| 2011/0145486 | A1 | 6/2011 | Owa et al. | |
| 2011/0283046 | A1* | 11/2011 | Koseki | 711/103 |
| 2012/0191900 | A1 | 7/2012 | Kunimatsu et al. | |
| 2013/0132641 | A1* | 5/2013 | Suzuki | 711/103 |
| 2013/0151763 | A1 | 6/2013 | Yamamoto et al. | |
| 2013/0205070 | A1* | 8/2013 | Koseki et al. | 711/103 |
| 2013/0232297 | A1 | 9/2013 | Tanaka et al. | |

FOREIGN PATENT DOCUMENTS

JP    05-241741 A    9/1993
JP    8-249128 A    9/1996

(Continued)

*Primary Examiner* — Denise Tran
(74) *Attorney, Agent, or Firm* — Mattingly & Malur, PC

(57) ABSTRACT

The storage system includes a plurality of storage devices and a storage controller. The storage controller stores a data request quantity indicating the data quantity of write data written to the target area in a specific period, and estimates, based on the quantity of request data and relationship information received from storage devices, the estimated data quantity written to the nonvolatile semiconductor memory chips based on the write data written to the target area in the specific period. The storage controller selects a second logical storage area with an estimated data quantity less than an estimated data quantity for the first logical storage area and assigned to a storage device different from a storage device assigned to the first logical storage area, and migrates the first data stored in the first logical storage area to the second logical storage area.

10 Claims, 37 Drawing Sheets

(56) References Cited

FOREIGN PATENT DOCUMENTS

| JP | 2007-265265 A | 10/2007 |
| JP | 2009-512066 A | 3/2009 |
| JP | 2010-512569 A | 4/2010 |
| JP | 2011-128792 A | 6/2011 |
| JP | 2011-186561 A | 9/2011 |
| WO | 2011/010344 A1 | 1/2011 |

* cited by examiner

Fig.9

Disk management TBL 13100

| 13101 | 13102 | 13103 | 13104 | 13105 | 13106 | 13107 | 13108 | 13109 | 13110 |
|---|---|---|---|---|---|---|---|---|---|
| Disk# | Disk type | Date of information update | Remaining guarantee period | Predicted residual lifetime | Compression configuration | FM total read quantity | FM total write quantity | Average compression ratio | Remaining number of deletions |
| 0 | SSD (SLC) | yy.mm.dd | 1460 day | 3000 day | ON | 10 GB | 123 GB | 30% | 95 % |
| 1 | SSD (SLC) | | | | | | | | |
| 2 | SSD (MLC) | | | | | | | | |
| n | SSD (MLC) | | | | OFF | | | N/A | 50% |
| m | HDD | | | — | — | — | — | N/A | N/A |

| RG# | Disk type | RAID Level | RAID structure | Compression configuration | Disk# | | | |
|---|---|---|---|---|---|---|---|---|
| 0 | SSD (SLC) | RAID 5 | 3D + 1P | ON | 1 | 10 | ... | — |
| 1 | SSD (SLC) | RAID 6 | 6D + 2P | ON | 33 | 34 | ... | 40 |
| 2 | SSD (MLC) | RAID 1 | 3D + 3P | OFF | | | ... | |
| 3 | SSD (MLC) | RAID 1+0 | — | — | | | ... | |
| n | HDD | RAID 5 | 7D + 1P | OFF | | | ... | |

RG management TBL
13200

Entry management TBL — 13800

| Disk# 13801 | Entry # 13802 | Size 13803 | Start-LBA 13804 | Last-LBA 13805 | Assignment destination extent # 13806 |
|---|---|---|---|---|---|
| 0 | 0 | 12MB | 0 | 100 | 100 |
| | 1 | 12MB | 120 | 220 | 220 |
| | 2 | 12MB | 2 | 102 | 102 |
| | 3 | 12MB | 4321 | 4421 | N/A |
| | n | 12MB | n | m | n |

| Extent # | Size | Disk # | Assigned entry # |
|---|---|---|---|
| 0 | 1GB | 0 | 0 |
| | | ... | ... |
| | | k | k |
| | | n | n |
| | | ... | ... |
| | | m | m |

13401 / 13402 / 13403 / 13404

13400 Extent management TBL

Figure 14:
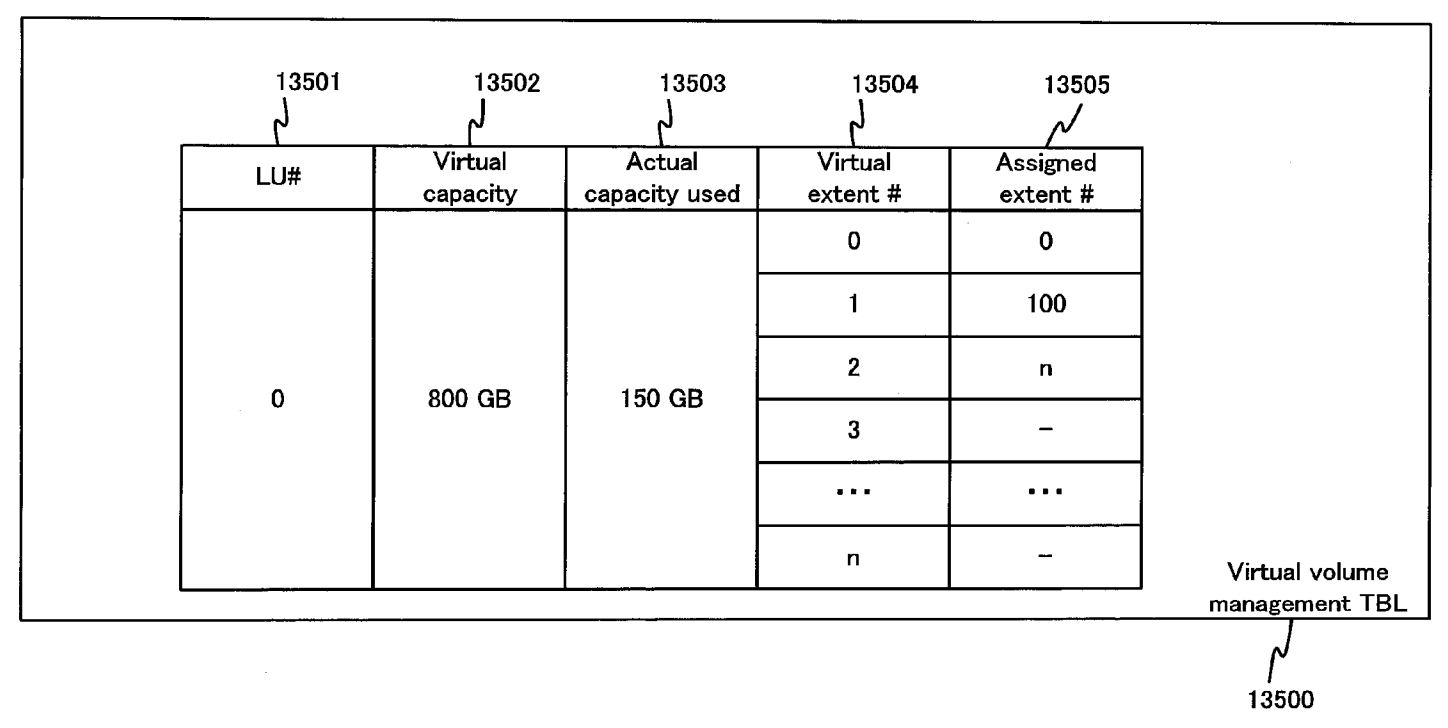

| LU# 13501 | Virtual capacity 13502 | Actual capacity used 13503 | Virtual extent # 13504 | Assigned extent # 13505 |
|---|---|---|---|---|
| 0 | 800 GB | 150 GB | 0 | 0 |
| | | | 1 | 100 |
| | | | 2 | n |
| | | | 3 | - |
| | | | ... | ... |
| | | | n | - |

Virtual volume management TBL  13500

Figure 15:
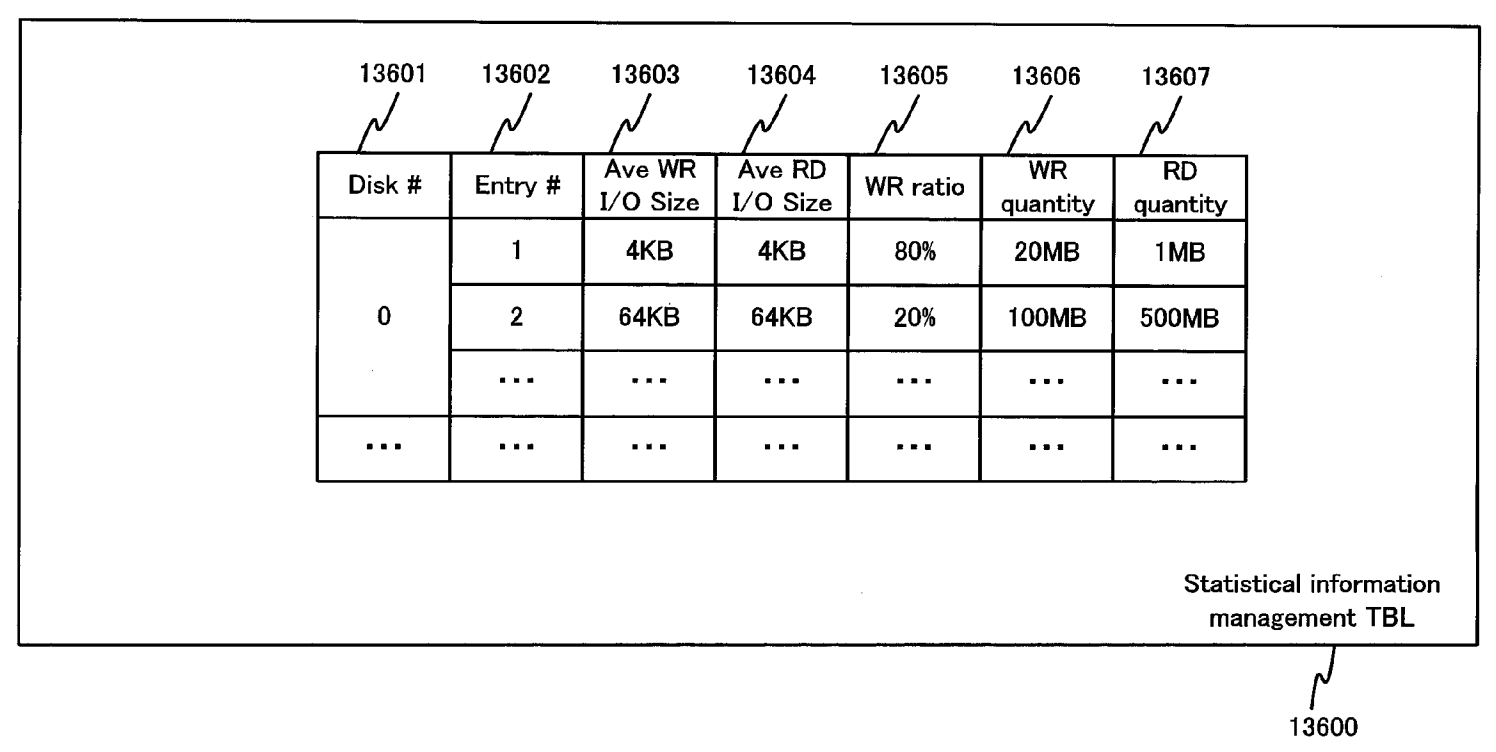

| Disk # | Entry # | Ave WR I/O Size | Ave RD I/O Size | WR ratio | WR quantity | RD quantity |
|---|---|---|---|---|---|---|
| 0 | 1 | 4KB | 4KB | 80% | 20MB | 1MB |
|  | 2 | 64KB | 64KB | 20% | 100MB | 500MB |
| ... | ... | ... | ... | ... | ... | ... |

Statistical information management TBL 13600

FM WR quantity prediction TBL 13700

| Disk # 13701 | Entry # 13702 | WR quantity 13703 | Compression ratio 13704 | FM WR predicted quantity 13705 |
|---|---|---|---|---|
| 0 | 1 | 50MB | 50% | 25MB |
| | 2 | 100MB | | 50MB |
| | ... | ... | | ... |
| | n | n | | n MB |

| Extent # | Extent FM WR predicted quantity |
|---|---|
| 1 | 25MB |
| 2 | 50MB |
| ... | ... |
| n | n MB |

13901, 13902

Extent FM WR prediction TBL — 13900

| Start LBA | Block# | Page# | CW offset | length |
|---|---|---|---|---|
| 0 | 0 | 0 | 0 | 4 |
| 8192 | 0 | 0 | 4 | 2 |
| 16384 | 1 | 0 | 2 | 1 |
| ... | 3 | ... | 3 | 3 |
| n | n | n | n | n |

Logical conversion TBL 23100

| Total write request quantity 23211 | Total read request quantity 23212 | FM total write quantity 23213 | Average compression ratio 23214 | FM total read quantity 23215 | Remaining number of deletions 23216 |
|---|---|---|---|---|---|
| 112345 MB | 112345 MB | 112345 MB | 50% | 112345 MB | 1234567 |

Internal information management TBL 23200

Fig.31

Statistical information management TBL 13600

| Disk # 13601 | Entry # 13602 | Ave WR I/O Size 13603 | Ave RD I/O Size 13604 | WR ratio 13605 | WR quantity 13606 | RD quantity 13607 | Compression ratio 13608 |
|---|---|---|---|---|---|---|---|
| 0 | 1 | 4KB | 4KB | 80% | 20MB | 1MB | 80% |
| | 2 | 64KB | 64KB | 20% | 100MB | 500MB | 30% |
| ... | ... | ... | ... | ... | ... | ... | ... |

| Disk # | Entry # | WR quantity | Compression ratio | Predicted FM WR quantity |
|---|---|---|---|---|
| 0 | 1 | 50MB | 80% | 40MB |
| | 2 | 100MB | 30% | 30MB |
| | ... | ... | ... | ... |
| | n | n | n | n MB |

FM WR quantity prediction TBL 13700

| 13101 | 13102 | 13103 | 13104 | 13105 | 13106 | 13107 | 13108 | 13109 | 13110 | 13110 |
|---|---|---|---|---|---|---|---|---|---|---|
| Disk# | Disk type | Date of information update | Remaining guarantee period | Predicted residual lifetime | Compression configuration | FM total read quantity | FM total write quantity | Average compression ratio | Remaining number of deletions | WA |
| 0 | SSD (SLC) | yy.mm.dd | 1460 day | 3000 day | ON | 10 GB | 123 GB | 30% | 95 % | 2.0 |
| 1 | SSD (SLC) | | | | | | | | | 1.5 |
| 2 | SSD (MLC) | | | | | | | | | |
| n | SSD (MLC) | | | | OFF | | | N/A | 50% | 3.0 |
| m | HDD | | | — | — | — | — | N/A | N/A | N/A |

Disk management TBL 13100

FM WR quantity prediction TBL 13700

| Disk # 13701 | Entry # 13702 | WR quantity 13703 | Compression ratio 13704b | WA 13706 | Predicted FM WR quantity 13705 |
|---|---|---|---|---|---|
| 0 | 1 | 50MB | 80% | 2.0 | 80MB |
| | 2 | 100MB | 30% | | 60MB |
| | ... | ... | ... | | ... |
| | n | n | n | | n MB |

STORAGE SYSTEM AND METHOD OF CONTROL FOR STORAGE SYSTEM

TECHNICAL FIELD

The invention relates to a storage system with a nonvolatile memory.

BACKGROUND ART

Storage systems generally have a physical storage medium which stores data, and a storage controller which controls the physical storage medium. The storage controller provides data storage space (generally a logical volume) to a computer coupled to the storage system (for example a host computer).

Storage systems can increase the speed of I/O (input/output) processing and produce a high degree of fault-resistance in physical storage media through the use of a plurality of physical storage media in a RAID (Redundant Array of Independent (or Inexpensive) Disks).

Storage systems are generally mounted with an HDD (hard disk drive) as the physical storage medium, but in recent years storage media such as an SSD (Solid-State Drive) have become known which have a flash memory (hereinafter FM) as the physical storage medium.

An SSD has a memory capable of performing extremely rapid I/O processing compared to an HDD. At the same time the SSD has a limited lifetime. This limited lifetime of the SSD will now be described.

With FM (typically a NAND-type flash memory) when data is being rewritten, it is not possible to directly overwrite the data into the physical storage area, where this data is stored). In order to rewrite the data in this physical storage area, it is necessary to carry out a deletion process (hereinafter block deletion) for the data in the physical storage area in FM deletion units, known as blocks, and write data into a physical storage area in which block deletion has taken place.

However, due to physical restrictions on an FM, there is a limit to the number of block deletions that can be done for each block (hereinafter the number of deletions). Thus, when the number of deletions for a certain block goes past this limit, it is no longer possible for data to be stored in this block. In other words, when the number of deletions for the all the blocks (or spare areas) in the SSD goes over the limit, the SSD has reached the end of its life.

Attempts are being made to extend the lifetime of the SSD using a method known as Wear Leveling (hereinafter WL). This is a technology which levels out the number of deletions between blocks and suppresses deterioration in one particular block by controlling the data storage units such that data which is frequently updated is stored in a block whose number of deletions is small, and data which is updated infrequently is stored in blocks whose number of deletions is high.

Storage systems are known in which a plurality of SSDs are mounted as the physical storage medium. In such storage systems, there can be an imbalance in the load between the SSDs with load concentrated on a particular SSD, even where deterioration in a specific block within a single SSD is suppressed. Methods are known which, by applying WL between SSDs as well, is able to extend the lifetime of the overall storage system by leveling out the number of deletions across the plurality of SSDs. For example, there is a technique which determines target data for migration based on the average number of deletions by estimating the average number of deletions, the storage controller storing the gross quantity of writes taking place to the SSD as statistical data, and then dividing the gross number of writes by the physical capacity of the SSD, or a technique in which the storage controller acquires internal data such as the number of deletions and the write quantity for each block from the SSD, the storage controller determining target data for migration based on this information (PTL 1, PTL 2). In what follows, WL carried out between devices such as SSDs will be referred to as "inter-device WL". With inter-device WL, the storage controller determines the SSD and data targeted for migration.

Moreover, there are techniques which by reducing the quantity of data stored in the physical storage medium through data compression, enable a reduction in the footprint and reduce bit costs. For example, techniques are known whereby the storage controller compresses the write data received from the host, storing the compressed data in the storage medium (for example, PTL 3).

CITATION LIST

Patent Literature

[PTL 1]
Japanese Patent Application Publication No. 2007-265265
[PTL 2]
WO 2011/010344
[PTL 3]
Japanese Patent Application Publication No. H8-249128

SUMMARY OF INVENTION

Technical Problem

Where the SSD carries out data compression, with the technique for predicting the average number of deletions using the gross write quantity described above there is the possibility that the effect of leveling out the deterioration between devices using inter-device WL will be insufficient because of a divergence between the write quantity stored by the storage controller and the actual write quantity in the FM within the SSD. This is because whereas the write quantity stored by the storage controller is the size of the uncompressed data, the quantity written to FM is the size of the data compressed within the SSD.

An inter-device WL of the type described above migrates data to SSDs with a longer residual lifetime by selecting data with a greater gross write quantity from SSDs with a shorter residual lifetime. For example, suppose that data A with a gross write quantity of 100 GB and data B with a gross write quantity of 80 GB in the statistical information are stored in an SSD with a short residual lifetime. Moreover, suppose the compression ratio of data A with data compressed within the SSD is better than the compression ratio of data B, and that the quantity of data A actually stored in FM is 50 GB (compression ratio=50%), and the quantity of data B is 64 GB (compression ratio=80%). In this case the storage controller will select data A with its larger gross write quantity. However, to obtain the maximum effect from the load leveling process of WL, storage controller should select data B. In other words, this means that the storage controller has selected the wrong data.

With the technology described above in which the storage controller acquires internal information for each block from the SSD, it is possible to prevent an erroneous choice of target data for migration described above where the SSD carries out data compression, as the storage controller acquires the quantity written to the FM. However, as the storage controller acquires data written to the FM in block units, not only does the quantity of communication required for the storage controller to acquire internal information from each of the SSDs become enormous, the internal information stored in the memory of the storage controller is also very large. Thus when the storage controller is leveling out the number of deletions, it needs to refer to the enormous quantity of internal information stored in the memory. As a result, the load on the storage controller is greater, with a consequent drop in performance of the storage system.

Solution to Problem

To resolve the above difficulty, the storage system which is one aspect of the invention is provided with a plurality of storage devices and a storage controller coupled to a plurality of storage devices and a host computer. Each of the plurality of storage devices includes a plurality of nonvolatile semiconductor memory chips, and a memory controller coupled to the plurality of nonvolatile semiconductor memory chips and the storage controller. The storage controller assigns storage areas provided by each of the plurality of storage devices to a plurality of logical storage areas. When the storage controller receives a write instruction and write data from the host computer, selects a logical storage area from among the plurality of logical storage areas, selects a storage device assigned to the selected logical storage area from among the plurality of storage devices, and transmits the write data to the selected storage device. When the memory controller receives the write data from the storage controller, converts the write data to compressed data by compressing the write data, writes the compressed data to any of the plurality of nonvolatile semiconductor memory chips, and transmits to the storage controller relationship information containing relationship between a data quantity of the write data and a data quantity of the compressed data. The storage controller regards each of the plurality of logical storage areas as a target area, stores a request data quantity indicating the data quantity of write data written to the target area in a specific period, and regards, based on the request data quantity and the relationship information, as an estimated data quantity of the target area a quantity of data written to the plurality of nonvolatile semiconductor memory chips based on write data written to the target area in the specific period. The storage controller selects a first logical storage area from among the plurality of logical storage areas, selects from among the plurality of logical storage areas a second logical storage area with an estimated data quantity less than an estimated data quantity of the first logical storage area and assigned to a storage device different from a storage device assigned to the first logical storage area, and migrates first data stored in the first logical storage area to the second logical storage area.

Advantageous Effects of Invention

According to one embodiment of the invention, it is possible to improve the accuracy of the leveling out process for the deterioration between the plurality of storage media mounted with nonvolatile semiconductor memories while suppressing the load on the storage controller. By this means, it is possible to extend the lifetime of the plurality of storage mediums as an overall storage system.

BRIEF DESCRIPTION OF DRAWINGS

FIG. 9 illustrates disk management table (TBL) 13100.
FIG. 10 illustrates RG management TBL 13200.
FIG. 12 illustrates entry management TBL 13800.
FIG. 13 illustrates extent management TBL 13400.
FIG. 14 illustrates virtual volume management TBL 13500.
FIG. 15 illustrates statistical information management TBL 13600.
FIG. 16 illustrates FM WR quantity prediction TBL 13700.
FIG. 17 illustrates extent FM WR quantity prediction TBL 13900.
FIG. 19 illustrates logical conversion TBL 23100.
FIG. 20 illustrates internal information management TBL 23200.
FIG. 31 illustrates statistical information management TBL 13600 in Embodiment 2.
FIG. 32 illustrates FM WR quantity prediction TBL 13700 in Embodiment 2.
FIG. 35 illustrates the disk management TBL 13100 in Embodiment 3.
FIG. 36 illustrates FM WR quantity prediction TBL 13700 in Embodiment 3.

DESCRIPTION OF EMBODIMENTS

Embodiments of the invention will now be described.
It should be noted that although descriptions of information in the invention are expressed as "aaa Table", "aaa List", "aaa DB", "aaa Queue" and the like, this information may be also expressed in ways other than data structures such as tables, lists, DB, and queues. As a result, "aaa Table", "aaa List", "aaa DB", "aaa Queue" and the like may be referred to as "aaa information" to show that it is not dependent on data structures.

Moreover, when describing the content of each information, Expressions such as "identification information", "identifier", "first name", "last name", "ID" may be used, but it is possible for these to be substituted by each other.

In what follows, the description may refer to a "program" as the subject of the sentence, but as a program is executed using a processor with a specific process being carried out using a memory and communication port (communication control device), the description may also refer to a processor as the subject. Moreover, processes cited with the program as the subject may be processes carried out by a managing server such as a computer or information processing device. Moreover, all or part of the programs may be realized using dedicated hardware.

Moreover, all types of program may be installed in the storage system by means of storage media which can be read by a program distribution server or computer.

Moreover, in the subsequent description a physical memory medium made for convenience be referred to as a "disk", but this reference does not necessarily mean that the physical storage medium is a storage medium of circular shape. In the subsequent description, in the subsequent description disk will frequently indicate an SSD, for example.

Furthermore, in the subsequent description there is no limitation on the unit of a period or time. For example, the unit of a period or time may be expressed with either one or a combination of two or more of these expressions: year, month, day, hour, minute, second.

Moreover, in the current example, nonvolatile semiconductor storage media, containing SSD, are FM. In the current example, FM is a type of FM which can be deleted in block units and read and written in page units, typically an NAND type flash memory. However, the FM may also be another type of flash memory (for example NOR) in place of the NAND type. Moreover, other nonvolatile memories, for example semiconductor memory such as magnetoresistive memory MRAM (Magnetoresistive Random Access Memory), variable resistance type memory ReRAM (Resistance Random Access Memory), ferroelectric memory FeRAM (Ferroelectric Random Access Memory) or a phase change memory may also be used in place of the FM.

Moreover, in the following description and drawings, a table may be referred to as TBL, Write as WR and Read as RD.

The inter-device WL will now be described for an embodiment of the invention.

Figure 1:
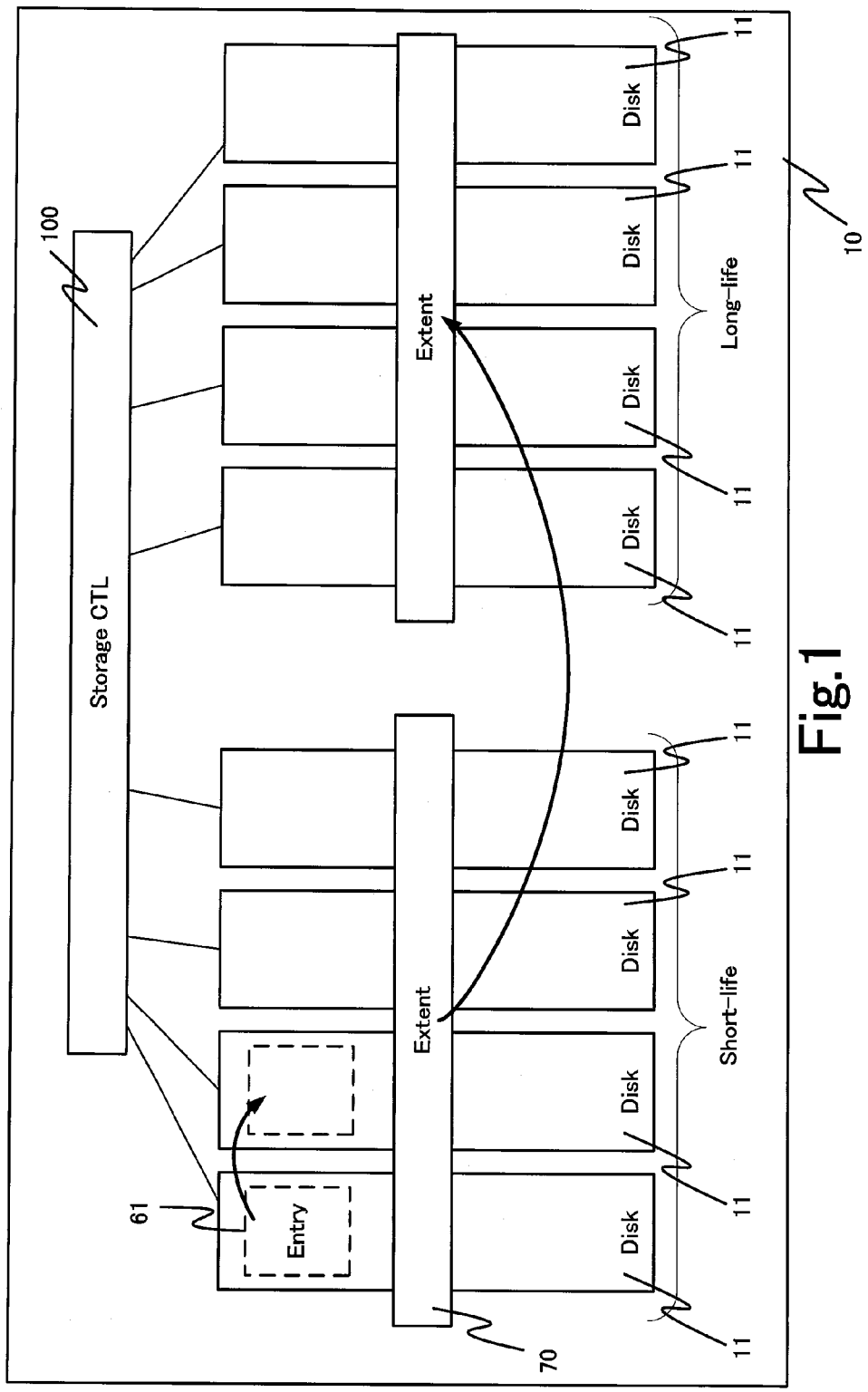
FIG. 1 schematically illustrates inter-device WL in an embodiment of the invention.

FIG. 1 is a schematic diagram illustrating an inter-device WL in an embodiment of the invention.

Storage system 10 is provided with storage controller 100 and a plurality of physical storage media 11 (storage devices). In what follows, physical storage medium 11 may be referred to as a device. Storage system 10 is provided with a plurality of logical storage areas. Logical storage areas may be extents or entries to be described later, or may be all or part of a logical volume (LU: Logical Unit) provided to the superior device (for example a host computer) coupled to storage system 10. Storage controller 100 may be configured from a RAID group to which a plurality of physical storage media 11 are assigned. Storage controller 100 executes the leveling off of deterioration between physical storage media 11 (for example, the number of deletions).

Storage controller 100 first acquires internal information relating to the physical storage media from each physical storage medium 11. Internal information contains indicators for the lifetime of physical storage medium 11 and the state of wear, and indicators on the state of compression such as the compression ratio. For example where physical storage medium 11 is an SSD (physical storage medium having an FM), internal information contains information indicating deterioration of the SSD (for example the number of deletions and remaining number of deletions). Moreover, where the SSD compresses write data from storage controller 100 converting it into compressed data, writing the compressed data into physical storage medium 11, the internal information contains information indicating the relationship between the quantity of write data and the quantity of compressed data (for example the compression rate). Storage controller 100 predicts the residual lifetime for each SSD based on this internal information. Thereafter storage controller 100 selects an SSD with a shorter residual lifetime than other SSDs as the source of data migration, and selects an SSD with a longer residual lifetime than the source of migration as the migration destination for this data. Storage controller 100 is able to reduce the overhead due to information, transmission between storage controller 100 and SSD by acquiring internal information in SSD units. Storage controller 100 may also acquire internal information for each physical storage area (for example DIMM: dual in-line memory module) and certain logical address ranges within the SSD.

Storage controller 100 next identifies data to be migrated from the SSD that is the source of migration. With inter-device WL, the unit for data migration is entry 61 or extent 70 which is a logical address range (logical storage area) of a fixed size. Entry 61 is a logical address range within a single SSD. Entry 61 is a collection of blocks.

Extent 70 is a logical address range which spans a plurality of SSDs, and is a collection of entries 61. A single extent 70 contains one or a plurality of entries in a plurality of SSDs respectively.

When carrying out data migration in small units, such as blocks or pages that are physical storage areas within the FM, there is a large load on storage controller 100. It is possible to suppress the load on storage controller 100 by carrying out inter-device WL in entry or extent units that are greater than blocks or pages.

Storage controller 100 predicts (estimates) the FM write quantity, which is the quantity of data written to the FM for each logical storage area such as entry 61 and extent 70. Here where the SSD writes write data in compressed form into FM, the FM write quantity indicates the quantity of data after compression. For example, if the FM write quantity for a certain SSDs large, a frequent overwriting of blocks occurs, with the result that the number of deletions increases accordingly. Where the number of deletions for a certain block increases, and the number of deletions for this block reaches an upper limit, reading from this block is still possible, but writing to this block is not possible. SSDs where this type of block increases become unusable. For this reason storage controller 100 looks for entries with a large quantity of FM write data from SSDs with a shorter residual lifetime than other SSDs, and migrates data containing these entries to SSDs with a longer lifetime. Moreover, in the same way for extents, it is possible to migrate to another SSD group data within extents with a larger FM write quantity among an SSD group that is a plurality of SSDs. In this way, it is possible to level off the number of deletions (deterioration) between SSDs without increasing the load on storage controller 100.

Moreover, it is possible to suppress accelerated deterioration in the short residual lifetime of an SSD by exchanging data in logical storage areas with a small FM write quantity in SSDs with a long-life with data in logical storage areas with a large FM write quantity in SSDs with a short residual lifetime.

Various examples will now be described.

Embodiment 1

The structure of computer system 10000 in Embodiment 1 of the invention will now be described.

Figure 2:
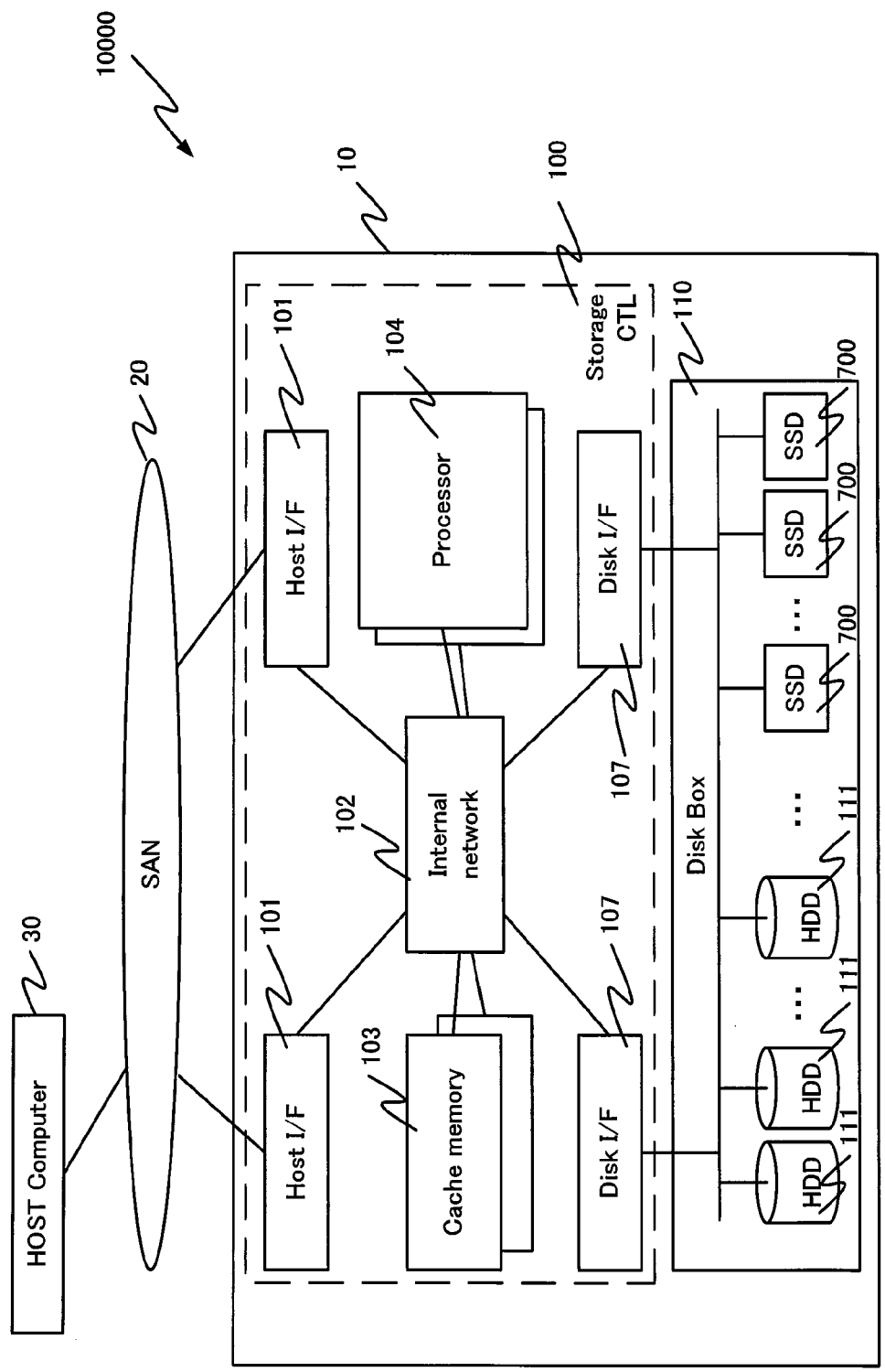
FIG. 2 illustrates the configuration of computer system 10000 in Embodiment 1 of the invention.

FIG. 2 illustrates the configuration of computer system 10000 in Embodiment 1 of the invention. Computer system 10000 has storage system 10 and host computer 30.

Host computer 30 is an example of a superior device which uses storage system 10. Host computer 30 is an application server, for example. Host computer 30 and storage system 10 communicated via SAN (Storage Area Network) 20. A fiber channel, SCSI (Small Computer System Interface), iSCSI (internet Small Computer System Interface), USB (Universal Serial Bus), IEEE 1394 bus, or SAS (Serial Attached SCSI) may for example be used as SAN 20. In place of SAN 20, another type of communication network (for example LAN (Local Area Network)) may be employed. It should be noted that in this diagram, both host computer 30 and storage system 10 are respectively shown as one unit, but at least one of these may be a plurality.

Host computer 30 stores control software which executes control commands and the like for storage system 10, and control commands and the like are executed in storage system 10 by executing this control software, carrying out protective management of storage system 10. Execution of processes in accordance with these control commands by storage system 10 enables such work as to be carried out as changes in the RAID level of the RAID group (hereinafter RG) within storage system 10 or adjustments to the activation threshold for inter-device WL, or configuration of the on/off data compression function at the RG unit. It should be noted that RG is a physical storage medium group which stores data in accordance with the RAID level configured using a plurality of physical storage media. A computer different to host computer 30 may be used as a computer which executes control commands for storage system 10.

Storage system 10 is provided with storage controller 100 and disk box 110 coupled to storage controller 100.

Storage controller 100 controls the operations of storage system 10. Storage controller 100 is provided with a communication interface device and a memory, and a control device coupled to these. The communication interface may for example be host I/F (Interface) 101 which is a front end communication interface device, or disk I/F 107 which is a back-end communication interface device. The memory will for example be a cache memory 103. The control device will for example be a processor (for example, CPU (Central Processing Unit) 104. Host I/F 101, cache memory 103, processor 104 and disk I/F 107 will be connected to an internal network 102 by a dedicated coupling bus such as PCI (Peripheral Component Interconnect) for example, enabling it to communicate via internal network 102. Cache memory 103 is coupled to internal network 102 by a dedicated coupling bus such as DDR3 (Double Data Rate 3) for example.

Host I/F 101 is an interface for connecting storage system 10 and SAN 20.

Internal network 102 is a network for coupling together devices present within storage system 10. Internal network 102 contains switches. In place of internal network 102, ASICs (Application Specific Integrated Circuit) having assist functions such as a switch function, DMA (direct memory access) transfer and RAID calculation can be used.

Cache memory 103 stores computer programs and data necessary for processor 104 to control storage system 10.

Processor 104 controls storage system 10 based on computer programs and data in cache memory 103. Storage controller 100 may have a plurality of processes 104. In this case, it is possible to control storage system 10 with the plurality of processes 104 coordinated or shared. In the following description, the operation of processor 104 will be described as the operation of storage controller 100.

Disk I/F 107 is an interface for coupling storage controller 100 to disk box 110.

Disk box 110 is provided with a plurality of disks. The disk is a nonvolatile physical storage medium such as HDD 111 or SSD 700. Of this plurality of disks, a plurality of disks of the same type are assigned to RG. With each of these RGs, it is possible to supply logical volume as the storage spaces for user data. It should be noted that in this diagram, although HDD 111 and SSD 700 are shown as the disks for disk box 110, HDD 111 need not be present.

Figure 3:
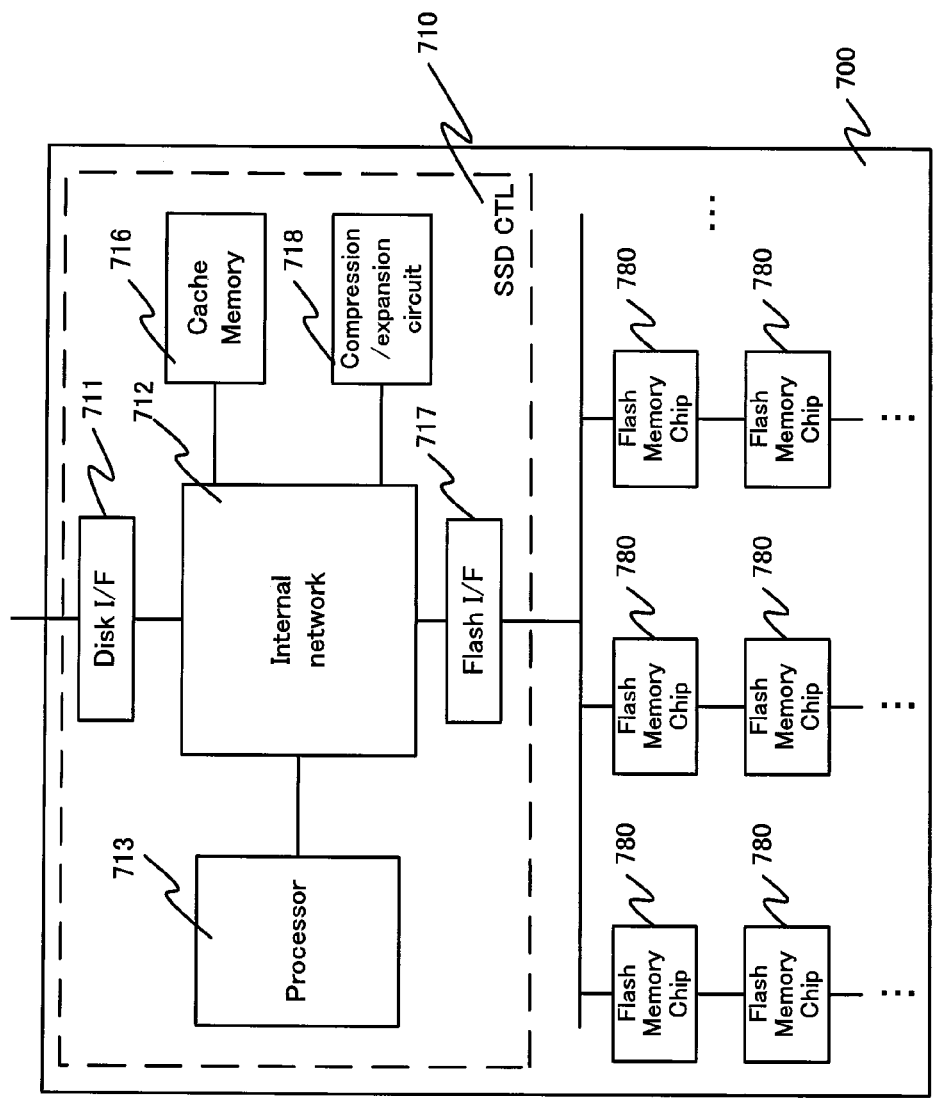
FIG. 3 illustrates the configuration of SSD 700.

FIG. 3 shows the structure of SSD 700.

SSD 700 has a plurality of FMC (Flash Memory Chip) 780, and SSD controller 710 coupled to these.

SSD controller (SSD CTL) 710 controls the operation of SSD 700. SSD controller 710 is provided with a communication interface device, a memory, a control device which is connected to these, and hardware which executes data compression/expansion. The communication interface may for example be disk I/F 711 which is a front end communication interface device and flash I/F 717 which is a backend communication device. The memory may for example be cache memory 716. The control device is for example processor 713. The data compression/expansion hardware which executes may for example be compression/expansion circuit 718. It should be noted that the data compression/expansion function may be realized by software through processor 713 executing a dedicated program. In this case, compression/expansion circuit 718 may be omitted. Disk I/F 711, processor 713, cache memory 716, flash I/F 717 and compression/expansion circuit 718 are coupled respectively via internal network 712. In the following description, the data compression/expansion function will be referred to as the data compression function.

Disk I/F 711 is connected to disk I/F 107 of storage controller 100 by a dedicated connection bus. Internal network 712 is a network for coupling devices together. Internal network 712 may contain switches. This may be substituted with ASICs having a switch function.

Cache memory 716 is an area for storing computer programs and data necessary for processor 713 to control SSD 700.

Processor 713 controls SSDs 700 overall based on computer programs and data in cache memory 716. In the following description, the operation of processor 713 will be described as the operation of SSD controller 710.

Flash I/F 717 is an interface for coupling SSD controller 710 to FMC 780.

In the example, SSD 700 is a storage device having a plurality of FMCs 780 and SSD controller 710 which controls these, and its external appearance and the like is not limited to a form factor.

Figure 4:
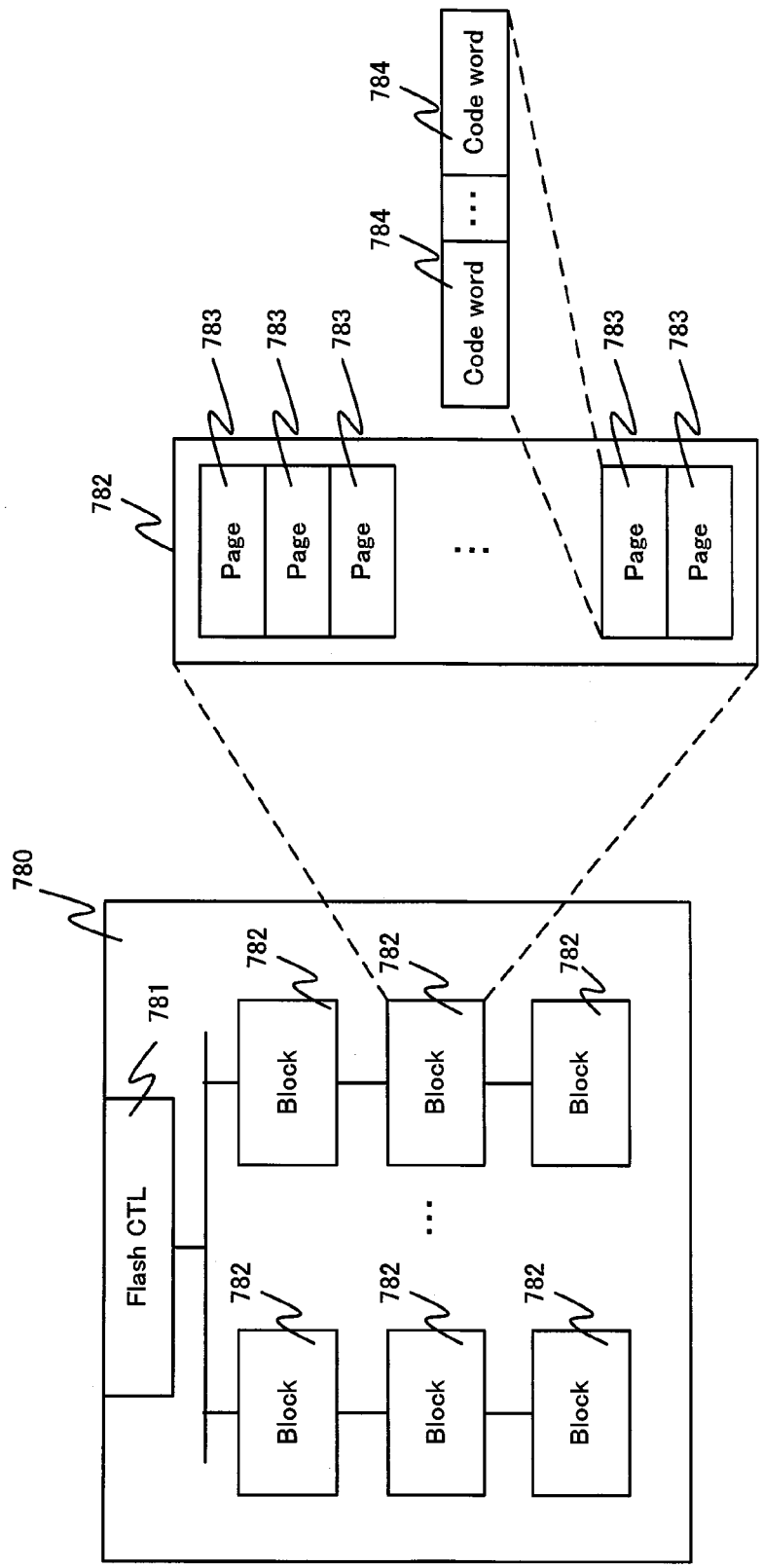
FIG. 4 illustrates the configuration of FMC 780.

FIG. 4 illustrates the structure of FMC 780.

FMC 780 is provided with a plurality of blocks 782, and FM controller (hereinafter flash controller) 781 coupled to these. Flash controller 781 controls FMC 780. Blocks 782 are provided with a plurality of pages 783. Data reads from FMC 780 and data writes to FMC 780 are executed in units of pages. Deletion of data is executed at the block level. Moreover, pages 783 are provided with a plurality of codewords 784. Both data and an ECC (error check and correction), a guarantee code which protects this data, are stored in codewords 784.

FMC 780 is a NAND type flash memory, for example. Data cannot be overwritten on FMC 780. For this reason when writing new data to a page on which data has been written, data is deleted in block units, and written to pages from which data has been deleted.

SSD controller 710 carries out leveling off of numbers of deletions for the plurality of blocks 782 in SSD 700. SSD controller 710 levels off the number of deletions for blocks 782 within SSD 700 by storing data with a larger number of updates in a block 782 whose number of deletions is smaller, storing data whose frequency of updates is smaller in block 782 with a larger number of deletions.

Moreover, SSD controller 710 may carry out leveling off of the number of deletions by selecting an empty block whose number of deletions is small in which to store data when writing. At this time SSD controller 710 may select the block to write to from a group whose number of deletions is small having divided a plurality of blocks 782 into a plurality of groups according to the number of deletions.

The lifetime of an SSD is extended by leveling off the number of deletions for the plurality of blocks 782 within SSD 700.

Figure 5:
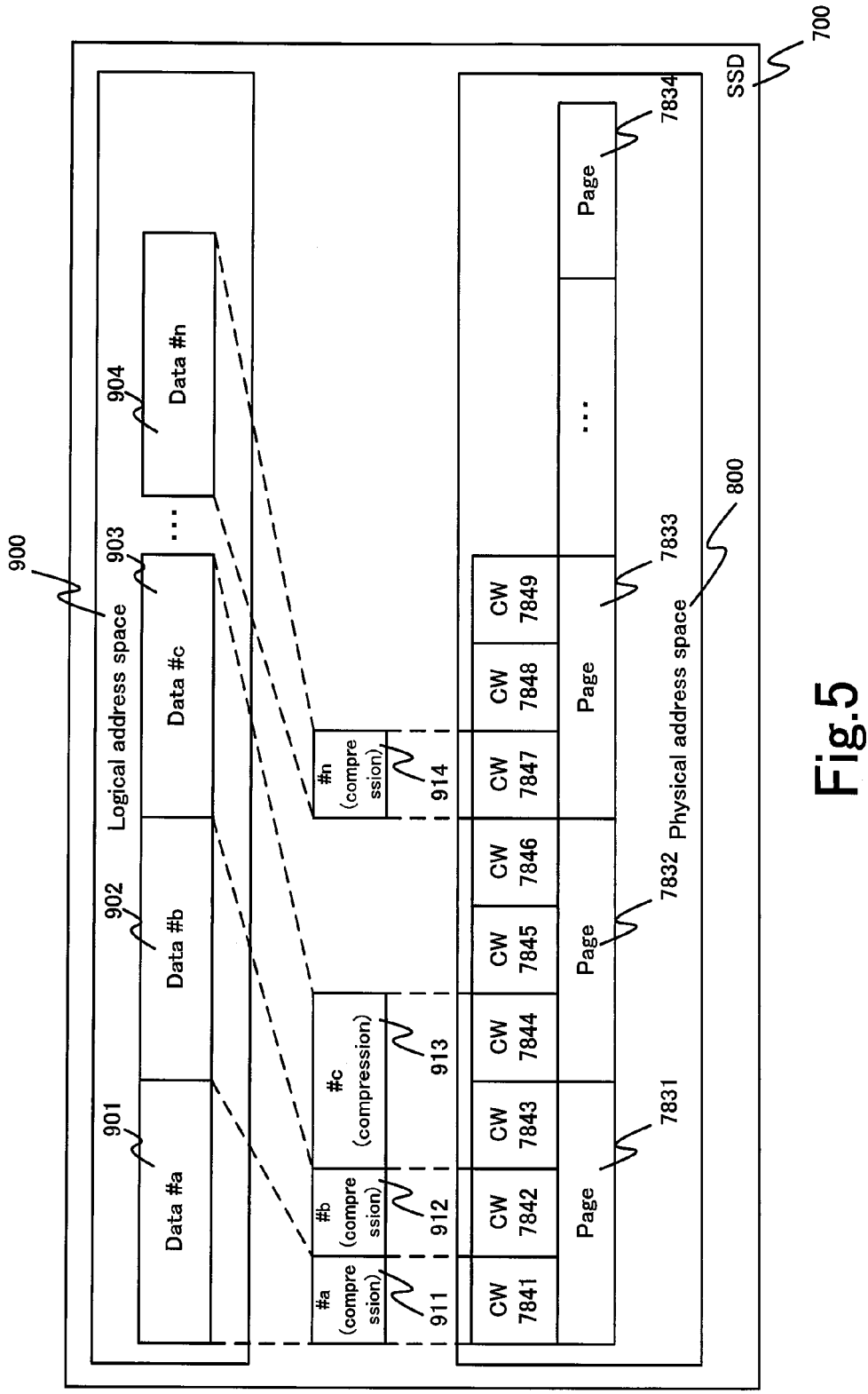
FIG. 5 illustrates the address spaces in SSD 700.

FIG. 5 shows an address space in SSD 700.

Logical address space 900 and physical address space 800 are defined for SSD 700. Logical address space 900 is a unique address space supplied to storage controller 100 by SSD 700. At the same time physical address space 800 is an address space in which actual data is stored inside the plurality of FMCs 780, and is divided into a plurality of physical pages 7831. SSD controller 710 divides logical address space 900 into a plurality of areas (logical pages) 901, 902, 903, 904 which have the same size as a physical page, for example, and where necessary assigns a plurality of physical pages 7831, 7832, 7833, 7834 to the plurality of logical pages 901, 902, 903, 904. Here the data in logical page 901 is converted into compressed data 911 by the data compression function of SSD 700, the data of logical page 902 is converted into compressed data 912, the data of logical page 903 is converted into compressed data 913, and the data of logical page 904 is converted into compressed data 914. Ultimately, the compressed data is stored in physical pages in codeword (hereinafter CW) units. In the diagram, compressed data 911 is stored in CW 7841, compressed data 912 in CW 7842, compressed data and 913 in CW 7843 and CW 7844, compressed data 914 in CW 7847. Depending on such factors as the data pattern, the size of the compressed data may not be limited to a fixed size due to changes in the compression ratio. In this way with SSD 700 having a data compression function, it is possible to restrict the number of physical pages used by having a plurality of logical pages correspond to a single physical page. In the example, an example of physical address space 800 being limited by the data compression function is shown, but in contrast this SSD 700 may also have a function which expands logical address space 900 until physical address space 800 is full of compressed data.

It should be noted that the compression ratio may be calculated from the number of CWs contained in a page and the number of CWs for data after compression. For example, as page #a contains three CWs, where data #a after compression is not more than a single CW's worth, the compression ratio is 33.3%.

SSD controller 710 is able to realize WL and the like by dynamically varying the mapping between the address range inside logical address space 900 (logical storage area) and the address range within physical address space 800 (physical storage area). It should be noted that SSD controller 710 manages the correspondence between logical address space 900 and physical address space 800 using a logical conversion table to be described later. In the example, storage controller 100 does not manage logical conversion table within SSD 700 directly. For this reason as long as SSD controller 710 does not notify internal information and the like within SSD to storage controller 100, storage controller 100 is not able to grasp the correspondence between logical address space 900 and physical address space 800.

The technique for creating virtual volume will now be described.

Techniques used to create virtual capacity (for example, Thin Provisioning) are techniques which provide host computer 30 with a virtual capacity larger than the physical capacity available to storage system 10. Host computer 30 has access to virtual logical volumes (virtual volumes). Using a technique for creating virtual capacity, storage system 10 assigns physical storage areas to virtual storage areas in the write destination for write request data where write requests are received from host computer 30. In the example, the virtual storage areas assigned to an extent are known as a virtual extent using the storage area unit assigned by the technique for creating virtual capacity as the extent unit. Moreover, the size of an extent can be very versatile, ranging from several megabytes to several gigabytes.

Figure 6:
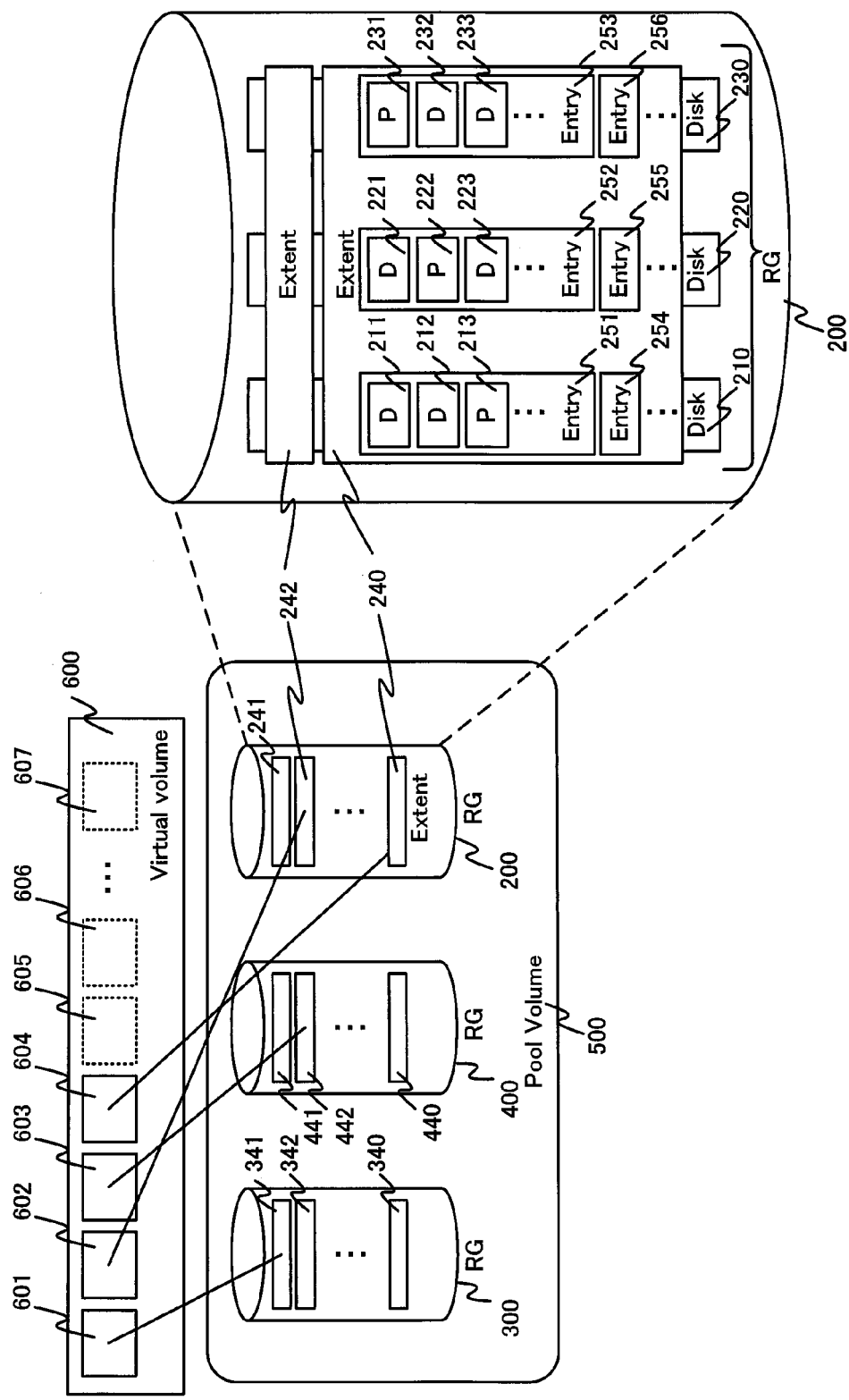
FIG. 6 illustrates the technique for creating virtual capacity.

FIG. 6 shows a technique for creating virtual capacity. In this diagram, the same type of disk (for example SSD 700) is assigned to the RG, and a plurality of RGs are assigned to pool volume 500.

An extent is a storage area obtained by dividing up pool volume 500, and is part of pool volume 500. In the diagram, pool volume 500 is divided into three RGs, RG 200, RG 300 and RG 400. RG 200 will now be described.

RG 200 is divided into disk 210, disk 220, and disk 230. Furthermore, RG 200 is a RAID 5, and two data (D) and a parity (P) are respectively stored in disks 210 to 230.

Storage areas within RG 200 are divided into a plurality of extents. The storage area within RG is indicated by a plurality of logical address spaces 900 within SSD 700.

The structure of an extent will now be described. An extent has an entry which is a logical address space for each disk. A plurality of individual data and parities are stored in the entry. In the example shown in the diagram, D211, D212 and P213 are stored in entry 251, for example, with D221, D222 and P223 in entry 252, and D231, D232 and P233 stored in entry 253. Although not shown in the diagram, data and parities are stored in entries 254, 255 and 256 in the same way. Moreover, entries 251, 254 are built into disk 210, entries 252, 255 are built into disk 220, with entries 253, 256 built into disk 230.

An extent is a collection of entries, extent 240 being provided with entries 251, 252, 253, 254, 255 and 256, for example.

Moreover, in this diagram extents 240, 241, 242 are created in RG 200, extents 340, 341, 342 are created in RG 300, and extents 440, 441, 442 are created in RG 400.

As an entry is a collection of blocks, the size of the extent will for example be N times of blocks (where N is an integer equal to or larger than 2).

Virtual volume 600 is a virtual logical volume in which host computer 30 stores user data. It should be noted that the capacity defined as the capacity of virtual volume 600 can be made a larger storage capacity than the total capacity of the storage medium available to storage system 10. It should be noted that virtual volume 600 is provided with an arbitrary number of virtual extents 601 to 607. In the diagram, a single extent is made to correspond to a single virtual extent, but a plurality of extents may be assigned to a single virtual extent. Virtual volume 600 has a virtual address which is a logical address within the virtual volume, and a virtual extent is created by dividing the virtual address into prescribed ranges.

In the diagram, the virtual extents 601 to 604 indicated by the solid line are (assigned) virtual extents to which extents within RG 200, 300, 400 are assigned. In other words, extent 341 is assigned to virtual extent 601, extent 242 is assigned to virtual extent 602, extent 442 is assigned to virtual extent 603, and extent 240 is assigned to virtual extent 604.

It should be noted that the virtual addresses within virtual extents 605 to 607 indicated by the dotted line are not defined as the write destination for data, and that extents are not assigned to virtual extents 605 to 607 (unassigned).

Figure 7:
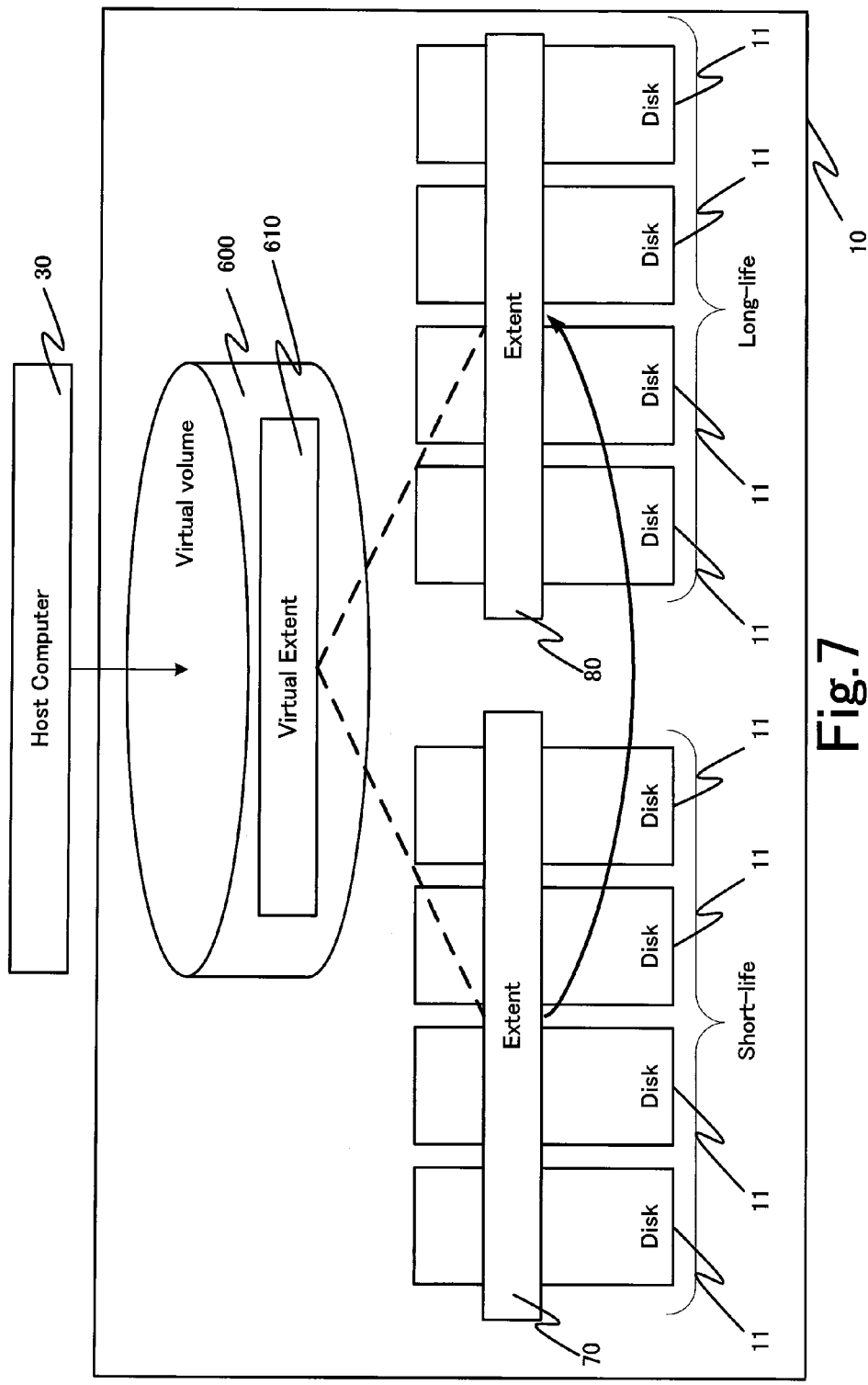
FIG. 7 illustrates an example of the relationship between inter-device WL and a virtual volume.

FIG. 7 shows an example of the relationship between inter-device WL and virtual volume.

In the example, where data is migrated between SSDs, host computer 30 is able to access data from the migration destination without varying the destination address by changing the logical address of the virtual address within virtual volume 600. For example, storage controller 100 migrates data from extent 70 assigned to virtual extent 610 to extent 80, changing the logical address corresponding to the virtual address in virtual extent 610 to the logical address of the migration destination of extent 80 from the logical address of extent 70 which is the source of migration. Host computer 30 is able to carry out inter-device WL without varying the address of the address destination by accessing virtual volume 600.

In the example, storage controller 100 uses a virtual volume for address changes, but may carry out address changes without using the virtual volume.

The content of cache memory 103 in storage controller 100 will now be described.

Figure 8:
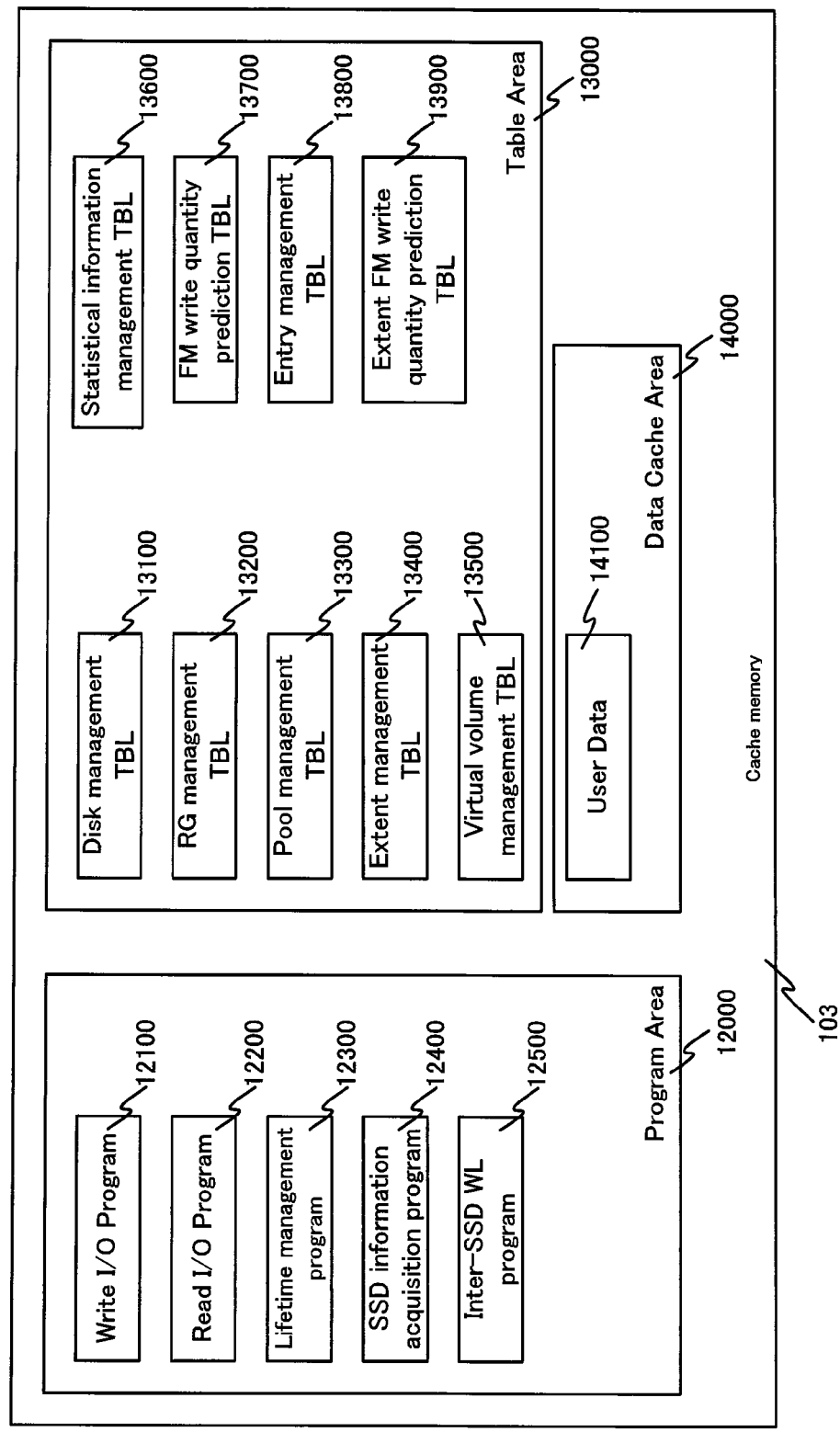
FIG. 8 illustrates the content of cache memory 103 in storage controller 100.

FIG. 8 illustrates the content of cache memory 103 in storage controller 100.

Cache memory 103 is provided with program area 12000, table area 13000, and data cache area 14000. Program area 12000 is an area in which the programs for controlling storage system 10 are stored. Table area 13000 is an area in which the tables for controlling storage system 10 are stored. Data cache area 14000 is an area in which user data is temporarily stored.

Program area 12000 stores write I/O program 12100, read I/O program 12200, lifetime management program 12300, SSD information acquisition program 12400, and inter-SSD WL program 12500.

Write I/O program 12100 is a program for processing write requests from host computer 30.

Read I/O program 12200 is a program for processing read requests from host computer 30.

Lifetime management program 12300 is a program for managing the lifetime of the disks such as SSD 700.

SSD information acquisition program 12400 is a program for acquiring SSD internal information for SSD 700.

Inter-SSD WL program 12500 is a program for executing inter-device WL.

Table area 13000 is provided with disk management TBL 13100, RG management TBL 13200, pool management TBL 13300, extent management TBL 13400, virtual volume management TBL 13500, statistical information management TBL 13600, FM WR quantity prediction TBL 13700, entry management TBL 13800 and extent FM WR quantity prediction TBL 13900.

Disk management TBL 13100 is a table which stores information relating to disks stored in disks box 110. RG management TBL 13200 is a table which stores information relating to the RAID group. Pool management TBL 13300 is a table storing information on pool volume. Extent management TBL 13400 is a table which stores information relating to extents. Virtual volume management TBL 13500 is a table which stores information relating to virtual volumes. Statistical information management TBL 13600 is a table which stores various information relating to the performance of storage system 10. FM WR quantity prediction TBL 13700 is a table which is used to predict the FM WR quantity for each entry to determine data targeted for migration when executing inter-device WL. Entry management storage table 13800 is a table which stores information relating to entries. Extent FM WR quantity prediction TBL 13900 is a table used to predict the FM WR quantity for each extent.

Data cache area 14000 temporarily stores user data 14100 in accordance with write requests and read requests. User data 14100 is data used by host computer 30.

FIG. 9 illustrates disk management TBL 13100.

Information managed at disk management TBL 13100 is mainly used to manage the residual lifetime of the disks. Disk management TBL 13100 has a record for each disk. Each record is provided with a disk number (#) 13101, disk type 13102, date of information update 13103, remaining guarantee period 13104, predicted residual lifetime 13105, compression configuration 13106, FM total read quantity 13107, FM total write quantity 13108, average compression ratio 13109, and remaining number of deletions 13110.

Disk #13101 is a disk identifier, and is a unique number within storage system 10.

Disk type 13102 shows the classification of the current disk, indicating for example SSD (SLC: Single Level Cell), SSD (MLC: Multi-Level Cell), SSD (TLC: Triple Level Cell), HDD and the like. Here, there can be three types of SSD depending on the type of NAND flash memory used: SLC type, MLC type and TLC type. SLC is a high-speed FM with a long-life and low capacity, capable of block deletions of the order of tens to hundreds of thousands. On the other hand, MLC is a low speed FM with a short lifetime and high-capacity, capable of block deletions of the order of thousands to tens of thousands. Compared to MLC, TLC is an even slower FM with a shorter lifetime but a high-capacity, and is capable of block deletions in the order of several hundred to several thousand.

Date of information update 13103 shows the most recent date at which information relating to the current disk has been updated (for example the date on which SSD internal information was received). Here the date of information update 13103 is shown as day, month and year.

Remaining guarantee period 13104 shows how much remains of the guarantee period determined by the vendor for the current disk. Here the disk guarantee period is the guaranteed period over which the disks will normally operate (for example, five years). FMC 780 deteriorates with increases in the number of deletions caused by data overwrites, and as the end of its lifetime approaches, reading/writing of data becomes impossible or there is a severe deterioration in data retention performance. As a result, the guarantee period is set in advance as the period over which the disk can normally be used based on the number of deletions or total write quantity or the like. Where the guarantee period over which a disk can be used has been exceeded (where remaining guarantee period 13104 has reached zero), this disk will be exchanged.

Predicted residual lifetime 13105 indicates the predicted value for the time remaining (residual lifetime) until the remaining number of deletions 13110 of current SSD 700 reaches zero. Predicted residual lifetime 13105 is a number predicted from the execution of lifetime management program 12300. Here the predicted residual lifetime 13105 is expressed as a number of days. Here, the fact that predicted residual lifetime 13105 is less than remaining guarantee period 13104 means that because of the concentration of write load on a particular SSD 700 due to factors such as variation in I/O, for example, the write load has become greater than that expected by the vendor for SSD 700, and this SSD 700 will reach the end of its lifetime before the period guaranteed by the vendor. Here, the write load will be the FM WR quantity, for example. By carrying out inter-device WL between SSDs 700, it is possible to avoid concentration of writing on a specific SSD, with the aim of extending the lifetime of the SSD 700. Moreover, predicted residual lifetime 13105 can be calculated on the basis of date of information update 13103, FM total read quantity 13107, FM total write quantity 13108, remaining number of deletions 13110 and the like. The method of calculating the residual lifetime period 13105 will be described later.

Compression configuration 13106 indicates whether or not the compression performance for data in the current disk is valid. For example, where it is valid (in use) the number corresponding to ON (for example "1") is stored, and where invalid (not in use) a number corresponding to OFF (for example "0") is stored. It should be noted that the manager of storage system 10 can configure the on/off setting for the data compression function via control software installed in host computer 30.

FM total read quantity 13107 is a cumulative number for the quantity of reads occurring within the current SSD 700 (the quantity of data read from FMCs 780 in the current SSD 700) and is updated based on SSD internal information. FM total write quantity 13108 is the cumulative value of the quantity of writes occurring within the current SSD 700 (the quantity of data written to FMC 780 in the current SSD 700), and is updated based on SSD internal information. Average compression ratio 13109 indicates the ratio (percentage) of the cumulative values for the quantity of compressed data relative to the cumulative value for the quantity of write data. Here, SSD controller 710 compresses write data transmitted to the current SSD 700 from storage controller 100, converting it to compressed data, and writing it to FMC 780 in current SSD 700. Average compression ratio 13109 is an average value for the compression ratio of all of the physical storage areas within current SSD 700, and is updated based on SSD internal information from the current SSD 700.

Remaining number of deletions 13110 indicates the number of block deletions that can be executed for the current SSD 700. Here the number of remaining deletions 13110 is shown as a percentage, and is updated based on SSD internal information. When this number drops to zero, it indicates that the number of deletions for all the blocks within FMC 780 has reached the limit. The remaining number of deletions 13110 may be a value for the number of deletions by which the number of deletions determined in advance for the current SSD 700 has dropped from the upper limit to the present, or may be the present number of deletions for the current SSD 700.

Information registered as FM total read quantity 13107, FM total write quantity 13108, average compression ratio 13109 and remaining number of deletions 13110 is contained in SSD internal information acquired by storage controller 100 from each SSD 700, and is updated using this SSD internal information. Storage controller 100 will for example be able to acquire SSD internal information from SSD controller 710 by using a general interface such as S.M.A.R.T. (Self-Monitoring Analysis and Reporting Technology).

Moreover, as disk management TBL 13100 mainly stores information relating to the lifetime management of the current disk, storage controller 100 does not need to acquire predicted residual lifetime 13105 and remaining number of deletions 13110 from disks (for example, HDD) for which the number of overwrites is not limited.

FIG. 10 illustrates RG management TBL 13200.

RG management TBL 13200 is provided with a record for each RG. Each record is provided with RG #13201, disk type 13202, RAID level 13203, RAID structure 13204, compression configuration 13205 and disk #13206.

RG #13201 is an RG identifier, and is a unique number within storage system 10.

Disk type 13202 shows a disk identifier assigned to the current RG. A plurality of disks of the same type may be assigned to a single RG.

RAID level 13203 shows the RAID level of the current RG, and may be a value such as RAID 1+0, 1, 3, 4, 5, or 6, for example.

RAID structure 13204 shows the number of data disks (disks storing data) and the number of parity disks (disks storing parity) among the disks assigned to the current RG.

Compression configuration 13205 shows the state of configuration (on or off) of the data compression function as the disks assigned to the current RG. Compression configuration 13205 corresponds to compression configuration 13106 in disk management TBL 13100. The compression configuration for all of the disks in a single RG is the same.

Disk #13206 shows the disk number assigned to the current RG, and contains a valid number for the number of disks shown in RAID structure 13204.

Figure 11:
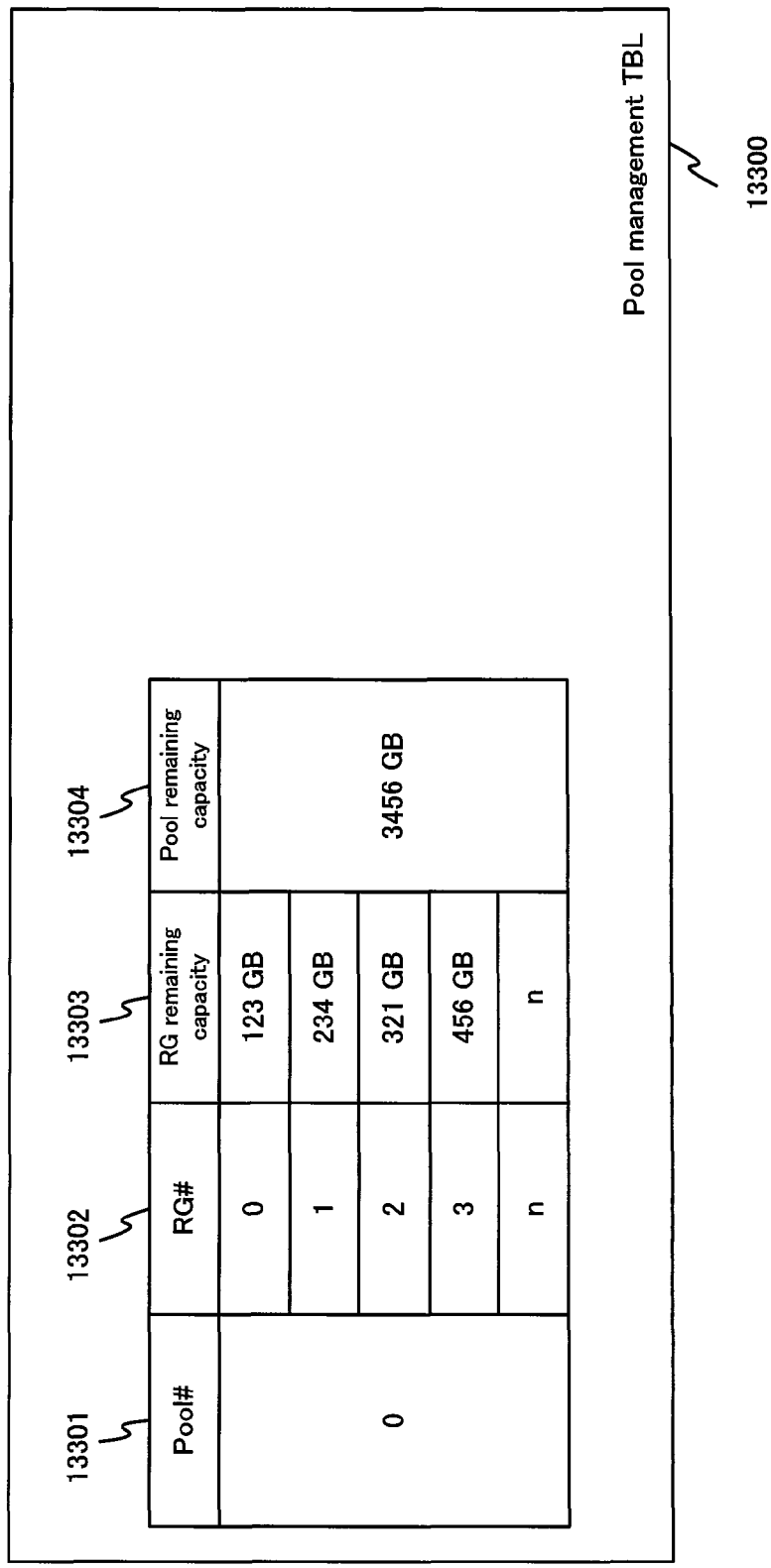
FIG. 11 illustrates pool management TBL 13300.

FIG. 11 illustrates pool management TBL 13300.

Pool management TBL 13300 is provided with a record for each pool. Each record has pool #13301, RG #13302, RG remaining capacity 13303, and pool remaining capacity 13304.

Pool #13301 is a pool identifier, and is a unique number within storage system 10.

RG #13302 and RG remaining capacity 13303 have values corresponding respectively to all the RGs assigned to the current pool. RG #13302 shows the RG number of the RG assigned to the current pool. RG remaining capacity 13303 shows the remaining capacity of the current RG.

Pool remaining capacity 13304 shows the remaining capacity of the current pool, and is equivalent to a total value for RG remaining capacity 13303 of all the RGs assigned to the current pool. Moreover, RG remaining capacity 13303 and pool remaining capacity 13304 reduce when data is written to an unassigned area of an extent in a virtual volume, and is updated by executing write I/O program 12100.

FIG. 12 illustrates entry management TBL 13800.

Entry management TBL 13800 has a record for each entry. Each entry has disk #13801, entry #13802, size 13803, start-LBA 13804, last-LBA 13805, and assignment destination extent #13806.

Disk #13801 is a disk identifier, and is a unique number within storage system 10.

Entry #13802 is an entry identifier within the current disk, and is a unique identifier within the current disk. Size 13803 shows the capacity of the current entry in units of bytes, or example. The capacity of each entry in the current example is identical.

Start-LBA 13804 and last-LBA 13805 respectively indicate the starting LBA and the final LBA of the address space for the current entry.

Assignment destination extent #13807 indicates whether or not the current entry has been assigned to an extent. For entries which have been assigned a certain extent, the assignment destination extent # stored here shows the extent to which it has been assigned. For entries that have not yet been assigned, "N/A" is stored.

Figure 13:
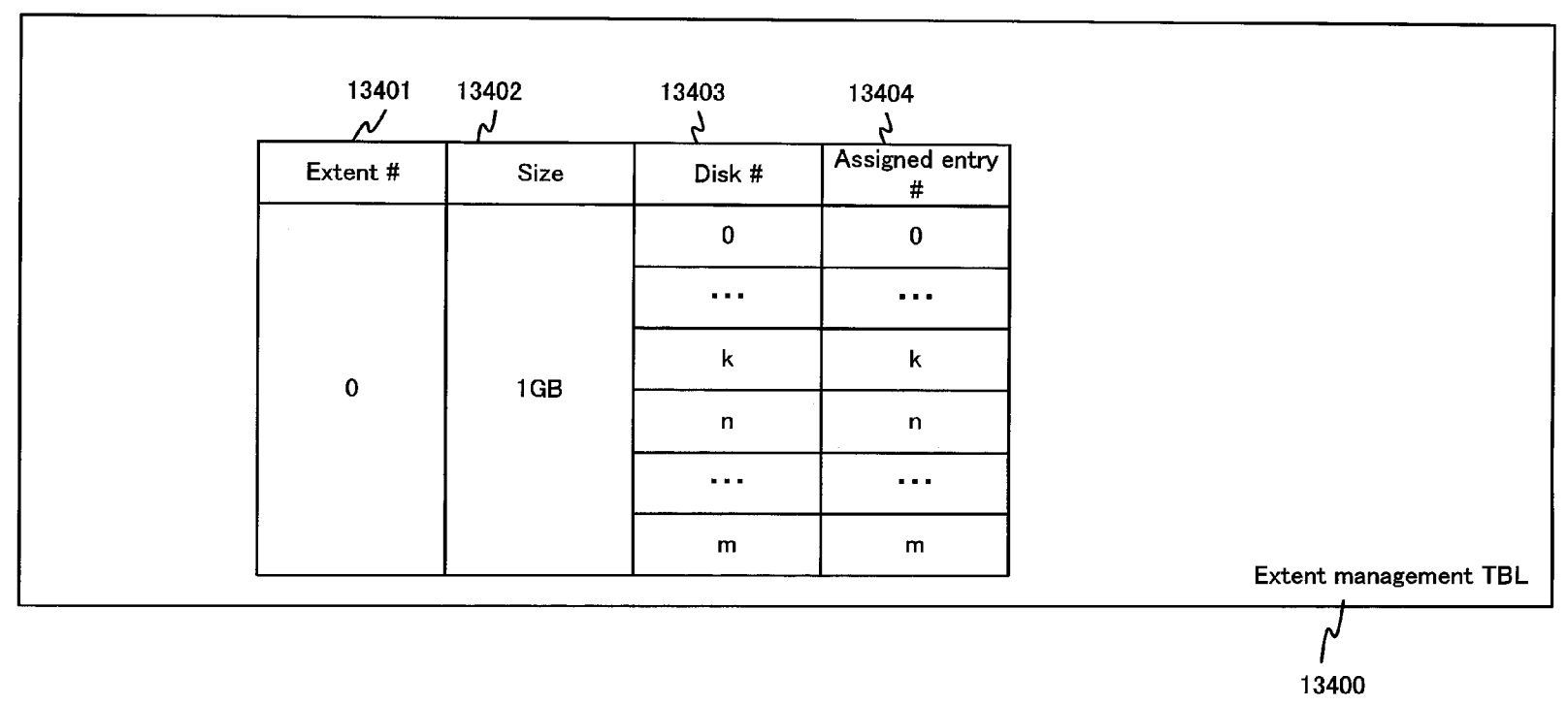

FIG. 13 illustrates extent management TBL 13400.

Extent management TBL 13400 has a record for each extent. Each record has extent #13401, size 13402, disk #13403, and assigned entry #13404.

Extent #13401 is identifier for the extent, and is a unique number within storage system 10.

Size 13402 expresses the capacity of the current extent in units of bytes, for example. In the current example, the capacity of each extent is identical.

Disk #13403 and assigned entry #13404 have values for all the disks respectively assigned to the current extent. Disk #13403 is an identifier for the current disk, and is a unique identifier within the current extent. Assigned entry #13404 indicates the entry assigned to the current disk.

FIG. 14 illustrates virtual volume management TBL 13500.

Virtual volume management TBL 13500 has a record for each virtual volume. Each record has virtual volume #13501, virtual capacity 13502, actual capacity 13503, virtual extent #13504 and assigned extent #13505.

Virtual volume #13501 is an identifier for the virtual volume, and is a unique number within storage system 10.

Virtual capacity 13502 is the virtual capacity for the current virtual volume. This virtual capacity 13502 is supplied to host computer 30.

Actual capacity 13503 is a total value for the capacity of the extent actually assigned to the current virtual volume.

Virtual extent #13504 is an identifier for the virtual extent contained in the current virtual volume. This shows that virtual volume #0 contains virtual extent #0 to n, for example.

Virtual extent #13504 and assigned extent #13505 have values for all the respective virtual extents in the current virtual volume.

Assigned extent #13505 is an identifier for the extent assigned to the current virtual volume, and is a unique identifier within the current virtual volume. Storage controller 100 manages the state of extent assignment for each virtual volume. For example, extent #0 is assigned to virtual extent #0, and extent #100 is assigned to virtual extent #1. Virtual extents to which an extent has not been assigned are indicated by "–" in extent #13505. For example, an extent has not been assigned to virtual extent #n.

FIG. 15 illustrates statistical information management TBL 13600.

Statistical information management TBL 13600 is information relating to the status of read/write access to each entry or extent. Storage controller 100 compiles statistical information management TBL 13600 by monitoring the read/write status in entry units. It should be noted that storage controller 100 is able to calculate the read/write status of an extent by calculating the value of the statistical information of entries belonging to each extent based on the content of this table.

Statistical information management TBL 13600 is provided with a record for each entry. Each record has disk #13601, entry #13602, average (Ave) WR I/O size 13603, average (Ave) RD I/O size 13604, WR ratio 13605, WR quantity 13606, and RD quantity 13607.

In what follows, any of disk #13601, entry #13602, average WR I/O size 13603, average RD I/O size 13604, WR ratio 13605, WR quantity 13606 and RD quantity 13607 may be referred to as statistical information.

Disk #13601 is a disk identifier, and is a unique number within storage system 10.

Entry #13602 is an identifier for an entry within the current disk, and is a unique number within the current disk.

Average WR I/O size 13603 is an average value for the I/O size of the WR I/O occurring in the current entry. Average RD I/O size 13604 is an average value for the I/O size of RD I/O occurring for the current entry. WR ratio 13605 is the WR command ratio of the I/O request occurring for the current entry. WR quantity 13606 is the cumulative value for the quantity of WR data in the current entry. RD quantity 13607 indicates the cumulative value for the quantity of RD data for the current entry. It should be noted that WR quantity 13606 and RD quantity 13607 respectively indicate the uncompressed data size as they are values based on I/O content requested by storage controller 100 to SSD 700.

It should be noted that statistical information management TBL 13600 may also have a cumulative value for the number of I/O requests for each entry, and LOPS (Input/Output Per Second), which is the number of I/O requests per unit time.

In the example, it is possible to reduce the burden on observation compared to observation of FMC 780 in block or page units by having storage controller 100 monitor the statistical information in entry or extent units.

Storage controller 100 monitors the access status for currently assigned extents based on virtual volume management TBL 13500. Statistical information and SSD internal information are for example values accumulated from the time the extent was assigned to the virtual volume. It should be noted that statistical information and SSD internal information may be cumulative values that are reset at a unit time. Moreover, the statistical information and SSD internal information targeted for judgment of necessity may also be reset in accordance with the timing of the judgment of necessity of the inter-device WL. For example, storage controller 100 may reset only values relating to extents which form the source of migration and the destination of migration in the inter-device WL. In other words, the period for calculation from resetting of the statistical information and SSD internal information (a specific period) will be a period such as the period from when the extent was assigned to the virtual volume, or the period from the previous measurement to the most recent measurement during regular measurement, or the period from the previous judgment of necessity in the inter-device WL to the latest judgment of necessity in the inter-device WL.

FIG. 16 illustrates FM WR quantity prediction TEL 13700.

FM WR quantity prediction TBL 13700 is compiled on the basis of disk management TBL 13100 and statistical information management TBL 13600. FM WR quantity prediction TBL 13700 has a record for each entry. Each record has a disk #13701, entry #13702, WR quantity 13703, compression ratio 13704, and FM WR predicted quantity 13705.

Disk #13701 is a disk identifier and is a unique number within storage system 10.

Entry #13702, WR quantity 13703, and FM WR predicted quantity 13705 have values corresponding respectively to all the entries in the current disk.

Entry #13702 is an entry identifier in the current disk, and is a unique number within the current disk.

WR quantity 13703 indicates the cumulative value for the quantity of WR data for which the current entry is a write destination. This value is renewed based on the value of WR quantity 13606 for the current entry in statistical information management TBL 13600 when the FM WR quantity is predicted.

Compression ratio 13704 is an average value for the compression ratio in the current disk, and is based on SSD internal information obtained from SSD 700. This value is copied from average compression ratio 13109 of the current disk in disk management TBL 13100, when the FM WR quantity is predicted. It should be noted that with this example, the value for average compression ratio 13109 for all the entries assigned to a certain disk is the same, as it uses the average value for the compression ratio in disk units.

FM WR predicted quantity 13705 indicates the predicted quantity for the data actually written into FMC 780 through writing into the current entry.

With the example, the value of the product of WR quantity 13703 of a certain entry and average compression ratio 13704 of the disk to which the current entry belongs is taken as the FM WR quantity occurring in the current entry.

FIG. 17 illustrates extent FM WR quantity prediction TBL 13900.

Extent FM WR quantity prediction TBL 13900 has a record for each extent. Each record has extent #13901 and extent FM WR predicted quantity 13902.

Extent #13901 is an identifier for the extent, and is a unique number within storage system 10.

Extent FM WR predicted quantity 13902 indicates the predicted quantity of data actually written into FMC 708 through writing into the current extent. Here the total predicted FM WR quantity for all the entries belonging to the current extent is taken as the extent FM WR predicted quantity.

For example, when the quantity of data written into a certain extent is large, the rewriting of data to blocks in the SSD 700 assigned to this extent occurs frequently, and the number of deletions for this block increases. Where the number of deletions in a block increases, the lifetime of the SSD 700 with this block becomes shorter. For this reason it is possible to carry out highly accurate inter-device WL by determining the extent targeted for migration on the basis of the extent FM WR predicted quantity when carrying out inter-device WL. It should be noted that target for migration may be an entry.

The content of cache memory 716 in SSD 700 will now be described.

Figure 18:
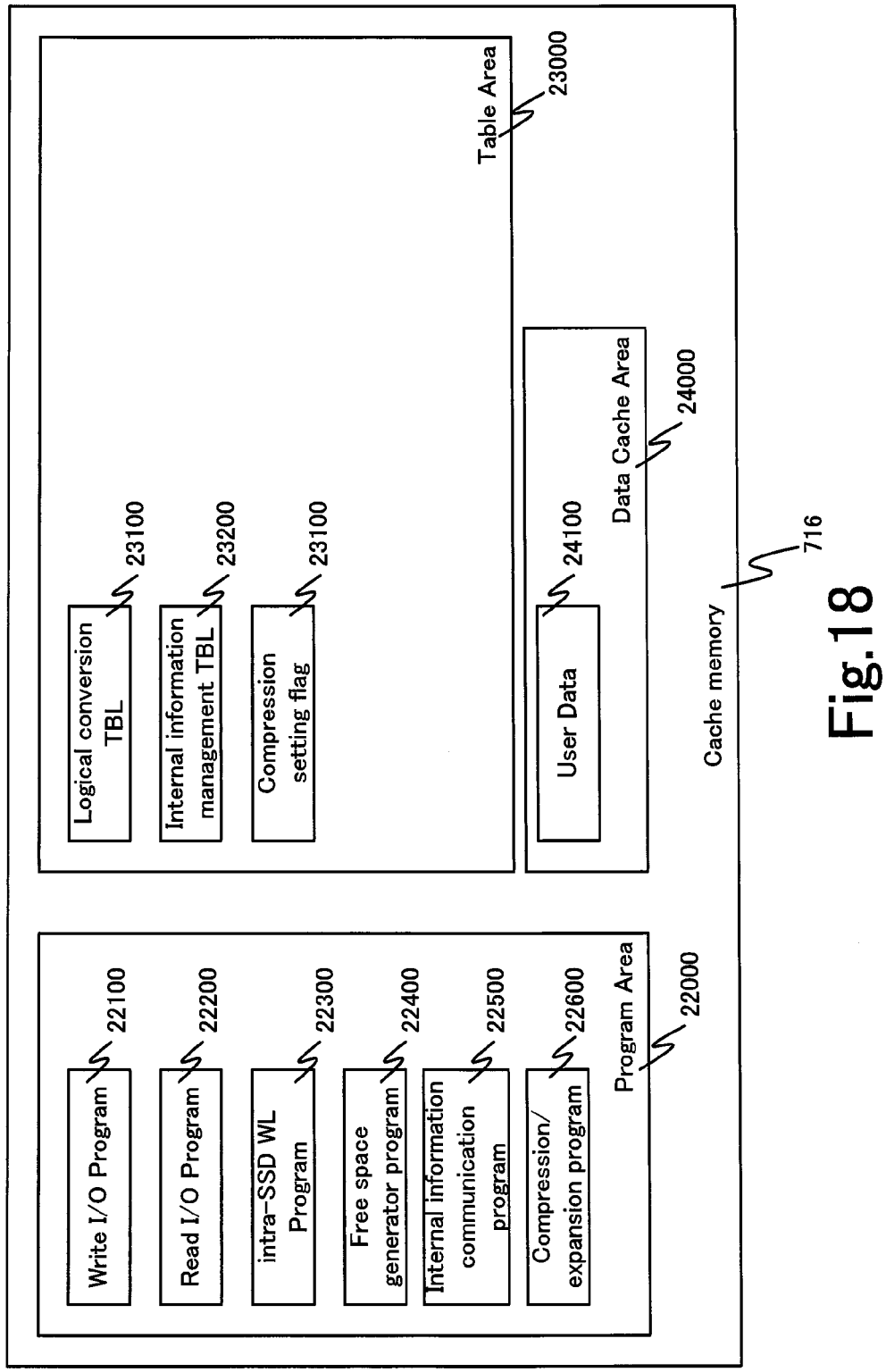
FIG. 18 illustrates the content of cache memory 716 in SSD 700.

FIG. 18 illustrates the content of cache memory 716 in SSD 700.

Cache memory 716 has program area 22000, table area 23000, and data cache area 24000.

Program area 22000 is an area which stores programs for controlling SSD 700. Table area 23000 is an area for storing tables for controlling SSD 700. Data cache area 24000 is an area for temporarily storing user data.

Program area 22000 has write I/O program 22100, read I/O program 22200, intra-SSD WL program 22300, free space generator program 22400, SSD internal information communication program 22500 and compression/expansion program 22600.

Write I/O program 22100 is a program which processes write requests from storage controller 100.

Read I/O program 22200 is a program for processing read requests from storage controller 100.

intra-SSD WL program 22300 is a program for executing WL within SSD 700.

Free space generator program 22400 is a program for executing a reclamation process carried out to avoid the depletion of free space in SSD 700. The reclamation program is a process which, when empty blocks have started to deplete within SSD 700, generates empty blocks through the generation of blocks with invalid data only by consolidating pages that store valid data and writing to other blocks, and deleting the data within these blocks.

SSD internal information communication program 22500 generates SSD internal information following requests from storage controller 100, and is a program for notifying storage controller 100 of this SSD internal information.

Compression/expansion program 22600 is a program which realizes the compression/expansion of data with software using processor 713. It should be noted that where SSD controller 710 has a compression/expansion circuit 718, compression/expansion program 22600 may be omitted.

Table area 23000 is provided with logical conversion TBL 23100, internal information management TBL 23200 and compression setting flag 23300.

Logical conversion TBL 23100 is a table for managing the correspondence between logical address spaces and physical address spaces in SSD 700. Internal information management TBL 23200 is a table for managing SSD internal information, which is informational internal to SSD 700. Compression setting flag 23300 is a flag which indicates whether the data compression function of SSD 700 is on or off.

Data cache area 24000 is an area for storing user data 24100. User data 24100 referred to here is data read from a block, or data written to a block.

FIG. 19 shows logical conversion TBL 23100.

Logical conversion TBL 23100 has a record for each logical page supplied to storage controller 100. As the I/O unit for FMC 780 is a page, the size of each logical page is a page size. Each record has a start-LBA 23101, block #23102, page #23103, codeword (CW) offset 23104, and length 23105.

Start-LBA 23101 shows the starting LBA for the logical page supplied to storage controller 100. It should be noted that start-LBA 23101 is a multiple of the page size.

Block #23102, page #23103, CW offset 23104 and length 23105 show information on the physical address range assigned to the logical page shown in start-LBA 23101. It should be noted that where SSD 700 uses a data compression function, the at least two logical pages can be mapped onto a single physical page. In the diagram, the logical page from LBA0 to LBA8191 and the logical page from LBA8192 to LBA16383 are stored in a different CW (from CW0 to CW4, and CW4 to CW6) within the same physical page (page #0 of block #0).

FIG. 20 shows internal information management TBL 23200.

Information stored in internal information management TBL 23200 is notified to storage controller 100. Internal information management TBL 23200 has total write request quantity 23211, total read request quantity 23212, FM total write quantity 23213, average compression ratio 23214, FM total read quantity 23215 and remaining number of deletions 23216.

Total write request quantity 23211 is a cumulative value for the size of the write data requested to SSD 700 by storage controller 100. Total read request quantity 23212 is a cumulative value for the size of read data requested to SSD 700 by storage controller 100. In other words, WR quantity 13606 and RD quantity 13607 within statistical management TBL 13600 are respectively equivalent to total write request quantity 23211, and total read request quantity 23212.

FM total write quantity 23213 is a cumulative quantity for the quantity of data actually written to FMC 780. FM total read quantity 23215 is a cumulative quantity for the quantity of data actually read from FMC 780. It should be noted that FM total write quantity 23213 and FM total read quantity 23215 contain read/write quantities other than read/write based on I/O requests from storage controller 100 that are generated separately within SSD 700, such as reclamation and the like.

Average compression ratio 23213 is the average value for the compression ratio of compressed data obtained by the data compression function internal to SSD 700. The average value for the compression ratio is the value of the total CW capacity for compressed data stored (the total value of length 23105) divided by the total logical capacity of SSD 700 (maximum value of start LBA 23101+logical page size). Remaining number of deletions 23216 is the total value of the number of deletions in FMC 780 generated by data written to FM.

SSD controller 710 updates values within internal information management TBL 23200 when there is a write, read or deletion of data in FMC 780.

It should be noted that internal information management TBL 23200 may also store WA (Write Amplification) to be described later.

The action of storage system 10 will now be described.

Figure 21:
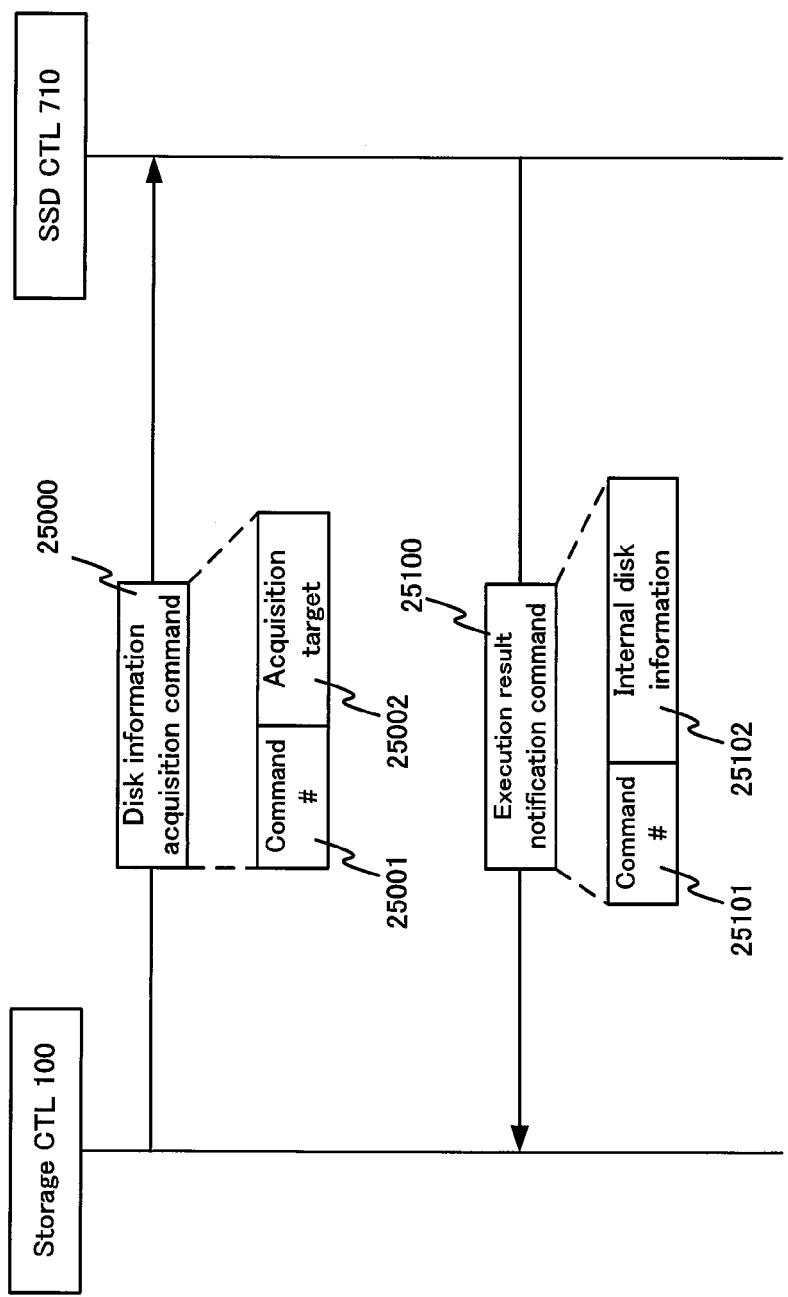
FIG. 21 illustrates the action of storage controller 100 in acquiring SSD internal information from SSD controller 710.

FIG. 21 shows the action of storage controller 100 acquiring SSD internal information from SSD controller 710.

SSD internal information acquisition command 25000 is a command which storage controller 100 transmits to SSD 700.

SSD internal information acquisition command 25000 has command #25001 and acquisition target 25002, for example. Command #25001 is an identifier for the command. Acquisition target 25002 shows an item targeted for acquisition from SSD 700. Specifically, acquisition target 25002 indicates which of the items that storage controller 100 requires from items contained in internal information management TBL 23200 within SSD 700.

Execution result notification command 25100 is a command which SSD controller 710 transmits to storage controller 100, and contains corresponding content for SSD internal information acquisition command 25000. Execution result notification command 25100 contains for example command #25101 and disk internal information 25102. Command #25101 is a field indicating what request command it is response to, and stores a value for the corresponding command #25001. Disk internal information 25102 stores a response value to the content identified by acquisition target 25002. This value stores the SSD internal value calculated or copied from internal information management TBL 23200 of SSD 700.

Figure 22:
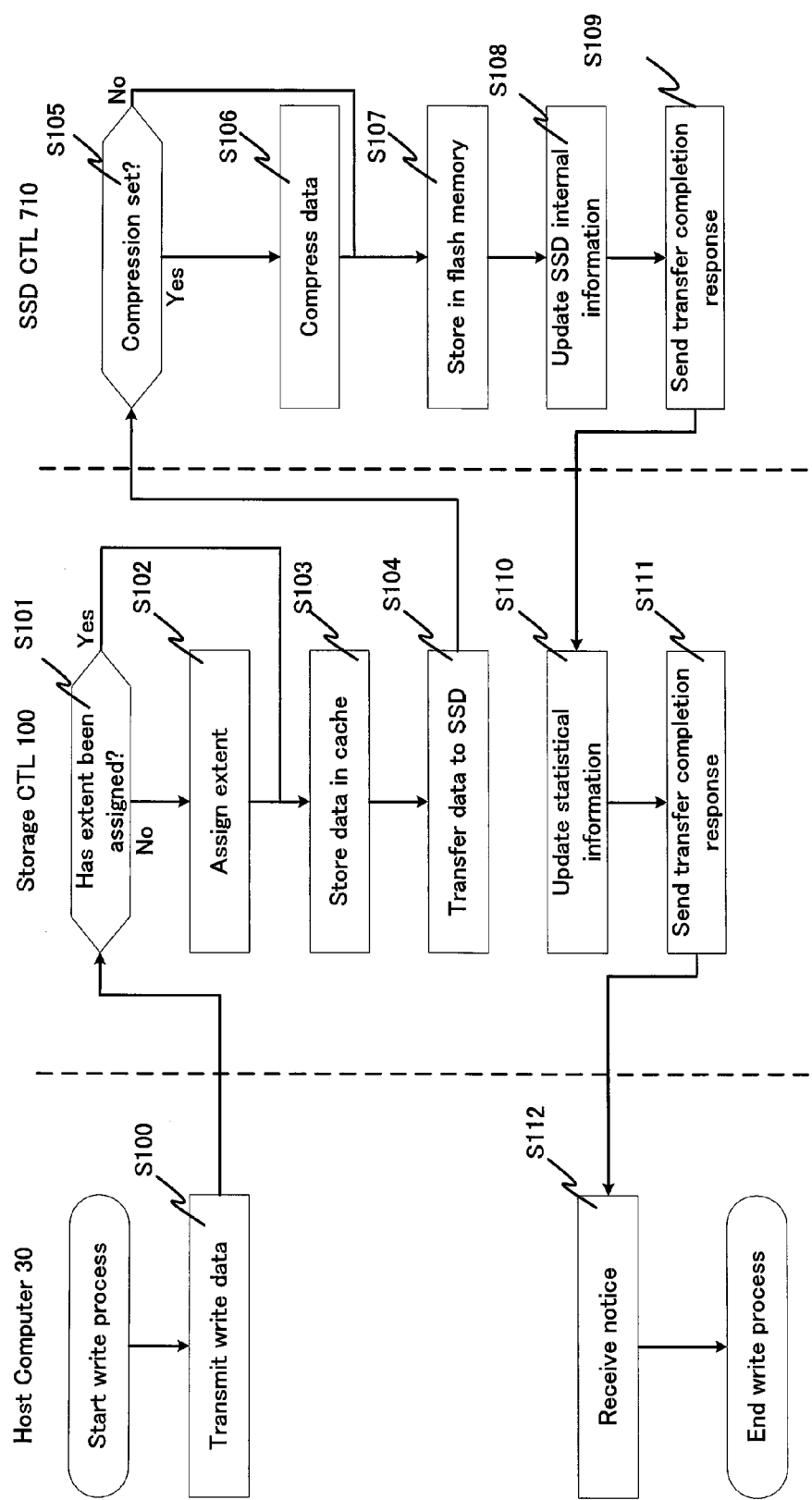
FIG. 22 illustrates the write process.

FIG. 22 shows the write process.

This sequence diagram shows the action of host computer 30, storage controller 100, and SSD controller 710.

Host computer 30 transmits write data and write requests (hereinafter host write requests) to storage controller 100 (S100).

Upon receiving write data or a host write request, storage controller 100 determines whether or not an extent has been assigned to the write destination range identified by the host write request (virtual address range in the virtual volume, virtual extent) based on virtual volume management TBL 13500 (S101). It should be noted that stories controller 100 is able to assign an extent to the write destination range expressed by the write request on the occasion of reception of the host write request. Where the result of determination shows that an extent has not been assigned to the write destination range (S101: No), storage controller 100 selects an unassigned extent from pool volume 500 and assigns this extent to a virtual extent in the write destination range (S102), storing the received write data in cache memory 103 (S103). It should be noted that storage controller 100 assigns an extent to a virtual extent when migrating data to SSD 700 from cache memory 103.

At the same time, where that the result of determination in S101 is that an extent has been assigned to the write destination range (S101: Yes), storage controller 100 proceeds to the previously described process S103.

After S103, storage controller 100 transfers write data stored in cache memory 103 and a write request for writing this write data in SSD 700 to SSD controller 710 of SSD 700, the storage destination of the data (S104).

SSD controller 710 transfers write data and write requests from storage controller 100. At this time, SSD controller 710 refers to its own compression setting flag 23100 (S105) and determines whether or not the data compression function is valid. Where the data compression function is valid, SSD controller 710 compresses the write data and converts it to compressed data (S106), and then determines the storage destination in FMC 780 for the compressed data on the basis of logical conversion TBL 23100, storing the compressed data in the FMC 780 that has been determined (S107).

At the same time, where data compression setting in S105 is invalid, SSD controller 710 does not carry out data compression, but determines the storage destination for the data in the FM based on logical conversion TBL 23100, and stores data in the FM that has been determined (S107).

Thereafter, SSD controller 710 updates internal information management TBL 23200 based on the received write request (S108). SSD controller 710 transmits a transfer completion response indicating the completion of transfer to storage controller 100 (S109) as a response to the write request received at S105.

Storage controller 100 receives the transfer completion response from SSD controller 710, and updates statistical information management TBL 13600 based on the host write requests received (S110).

Thereafter, storage controller 100 transmits a transfer completion response indicating completion of transfer to host computer 30 as a response to the host write request received at S101 (S111).

Has computer 30 receives the transfer completion response from storage controller 100 (S112) and completes the writing process.

It should be noted that storage controller 100 transmits the transfer completion response to host computer 30 at the point where the write data is stored in cache memory 103, and thereafter may carry out a transfer of write data to SSD controller 710 from cache memory 103 at the desired timing. In this case the write process is referred to as the post write process, and is known as a means of improving the write process performance of storage controller 100.

In the write process of the drawing, the action of storage controller 100 is an action executed by write I/O program 12100 by processor 104, and the action of SSD controller 710 is an action executed by the write I/O program 22100 by processor 713.

Figure 23:
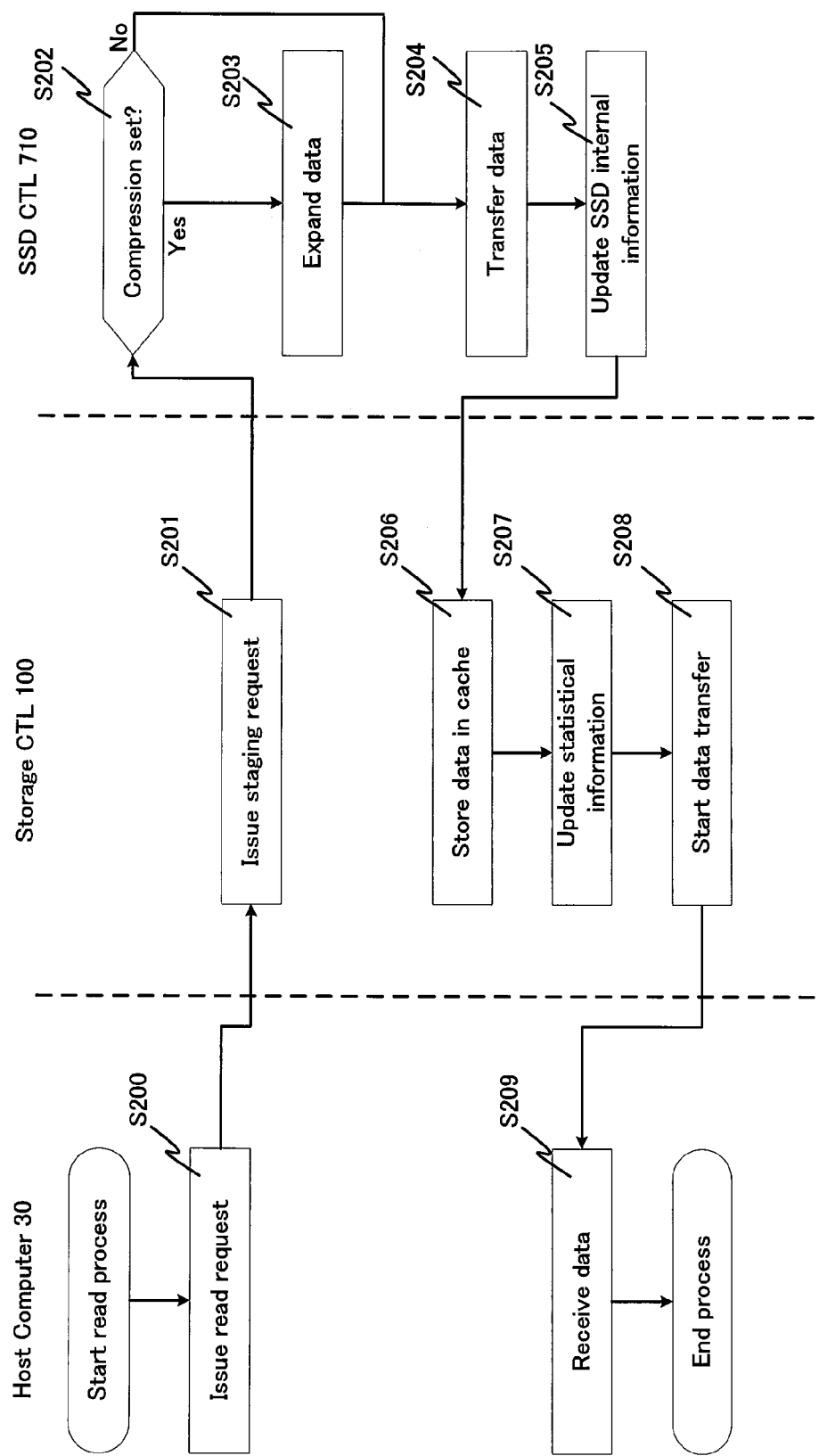
FIG. 23 illustrates the read process.

FIG. 23 illustrates the read process.

This sequence diagram illustrates the action of host computer 30, storage controller 100 and SSD controller 710, in the same way as for the write process.

Host computer 30 transmits a read request for data to storage controller 100 (S200).

Once a read request has been received, storage controller 100 identifies the extent assigned to the read source range based on virtual volume management TBL 13500 (virtual address range in the virtual volume, virtual extent) indicated by this read request, identifies SSD 700 assigned to the identified extent, and transmits the read request for the extent identified (staging request) to SSD controller 710 of the identified SSD 700 (S201).

SSD controller 710 receives the staging request, identifies the physical address range of FMC 780 corresponding to the logical address range indicated in the staging request based on logical conversion TBL 23100, and reads data from this physical address range (one or more pages). At this time SSD controller 710 checks whether the data compression function is valid or not (S202) and where the data compression function is valid (S202: Yes) expands the data read (S203) transmitting the expanded data to storage controller 100 (S204). At the same time, where the data compression function is invalid at S202 (S202: No), SSD controller 710 moves on to process S204, and transmits the data read to storage controller 100. SSD controller 710, then updates internal information management TBL 23200 based on the staging request (S205).

Storage controller 100 receives data from SSD controller 710 as a response to a staging request transmitted at S201, stores the received data in cache memory 103 (S206) and updates statistical information management TBL 13600 based on the read request received (S207). Thereafter, storage controller 100 transmits the data stored at S206 to host computer 30 (S208) as a response to the read request received at S200.

Host computer 30 receives data from storage controller 100 (S209), and terminates the read process.

With the read process in this diagram, the action of storage controller 100 is an action executed by read I/O program 12200 using processor 104, and the action of SSD controller 710 is an action executed by read I/O program 22200 using processor 713.

Inter-device WL process of storage controller 100 will now be described.

Figure 24:
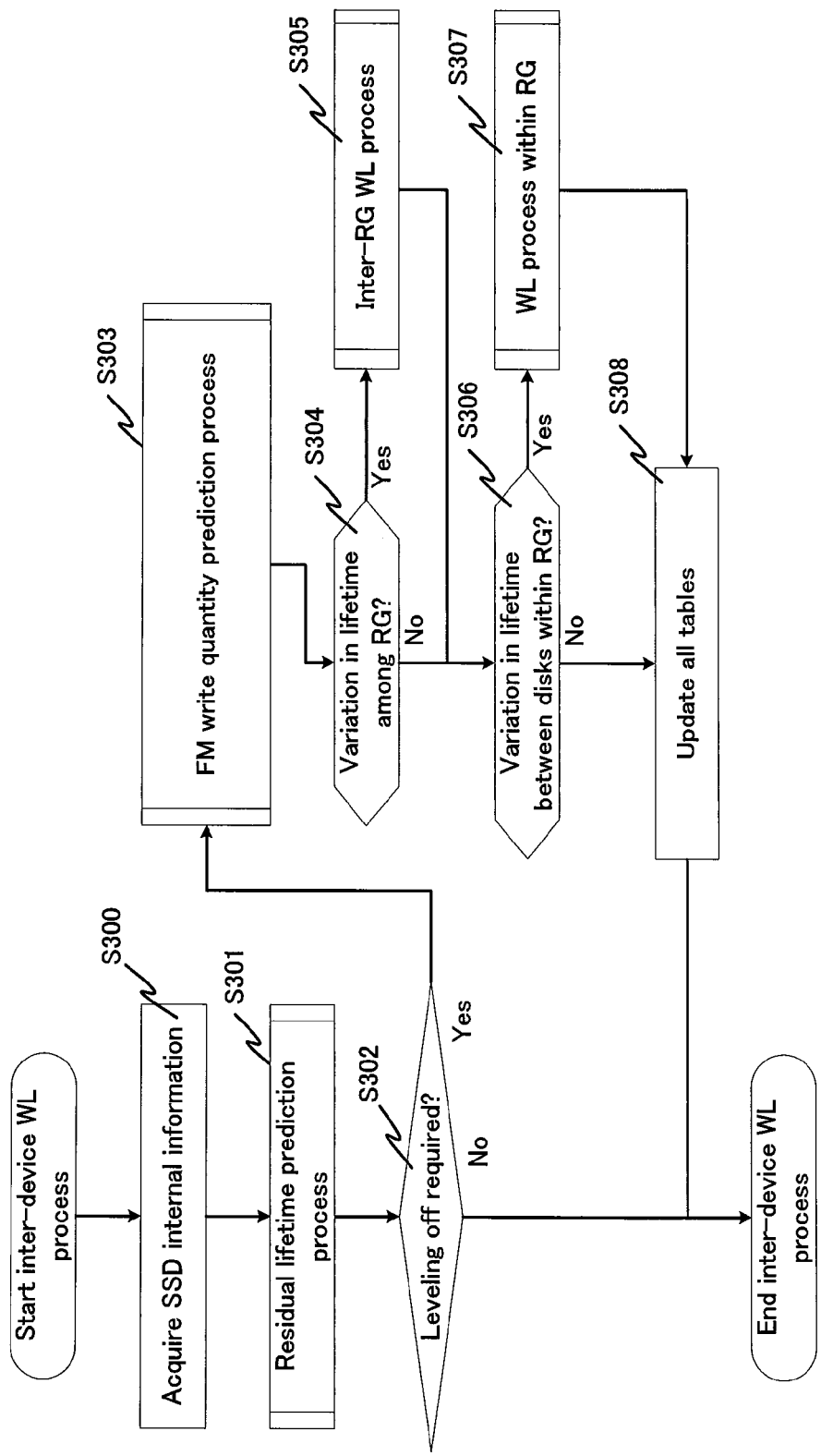
FIG. 24 illustrates the inter-device WL.

FIG. 24 illustrates inter-device WL.

Storage controller 100 levels out deterioration in the plurality of SSD 700s within disk box 110 using the inter-device WL process.

Storage controller 100 requests the transfer of SSD internal information by sending disk internal information acquisition command 25000 to SSD controller 710. As a response to this request, execution result notification command 25100 containing SSD internal information is received from SSD controller 710 (S300)

Storage controller 100 updates disk management TBL 13100 based on the SSD internal information received, and carries out a residual lifetime prediction process which predicts the residual lifetime of each SSD 700 (S310). This residual lifetime prediction process will be described later.

Storage controller 100 then determines whether or not the leveling off (inter-device WL) of deterioration in the plurality of SSD 700s is necessary (S302). Storage controller 100 is able to make the determination by checking whether or not SSD 700 has reached its lifetime in advance of the guarantee period (where predicted residual lifetime 13105 is less than remaining guarantee period 13104) for example, or whether or not there is variation in the quantity written to FM between the plurality of SSDs 700 (where the FM total write quantity 13108 has not been equalized). For example, storage controller 100 determines that leveling off is necessary where there is an SSD 700 which has reached its lifetime in advance of the guarantee period among the plurality of SSD 700s assigned to a certain extent. Moreover, storage controller 100 determines that leveling off is necessary where the difference between the maximum and minimum value or the standard deviation for FM total write quantity 13108 of the plurality of SSDs 700 is greater than a specified threshold, for example.

Where it is determined from the results of determination at S302 that leveling off is not necessary (S302: No), storage controller 100 terminates this flow. At the same time, where the determination at S302 is that leveling off is necessary (S302: Yes), storage controller 100 proceeds to S303, and carries out an FM write quantity prediction process to predict the quantity of FM WR for each entry or extent based on SSD 700 internal information management TBL 23200 and statistical information 13600 of storage controller 100 (S303). Details of the FM write quantity prediction process will be described later.

Storage controller 100 then uses disk management TBL 13100 and RG management TBL 13200 to determine whether or not there is variation in the residual lifetime of SSD 700s between RGs (satisfying the condition of variation between RGs in the residual lifetime of SSDs 700 between RGs) (S304). Here the condition of variation between RGs is satisfied if, having calculated the average values for the residual lifetime for all the SSD 700s assigned to each RG, the difference between the average value for two certain RGs is greater than a specified threshold, for example. Additionally, the condition of variation between RGs may be satisfied if, having calculated the minimum values for the residual lifetime of all the SSDs 700 assigned to each RG, the difference in the minimum values for two certain RGs is greater than a specified threshold.

Where it is determined at S304 that there is variation in the residual lifetime of SSDs 700 between RGs (S304: Yes), storage controller 100 executes an inter-RG WL process which migrates data between RGs (S305). The inter-RG WL process will be described in detail later. Thereafter, storage controller 100 proceeds to process S306. At the same time, where it is determined at S304 that there is no variation in the residual lifetime of SSDs 700 between RGs (S304: No), storage controller 100 proceeds to process S306.

Next, storage controller 100 uses disk management TBL 13100 to determine whether there is variation in the residual lifetime for SSDs 700 within an RG (whether the residual lifetime of SSDs 700 within RG satisfies the condition of variation within an RG) (S306). Here the condition of variation within an RG is satisfied if having calculated the maximum and minimum values from the remaining lives of all SSDs 700 assigned to a certain RG, the difference between the maximum and the minimum value exceeds a specific threshold for example. Additionally, the condition of variation within an RG may be satisfied if, having calculated the average residual lifetime for all the SSDs 700 assigned to a certain RG, the difference between the average residual lifetime and the residual lifetime for any of the SSDs 700 assigned to this RGs exceeds a specified threshold.

At S306, where it is determined that there is variation in the residual lifetime of SSDs 700 within the RG (S306: Yes), storage controller 100 executes an inter-RG WL process migrating data between SSDs 700 within the RG (S307). The inter-RG WL process will be described in detail later. Storage controller 100 then proceeds to process S308. At the same time, where it is determined at S306 that there is variation in the residual lifetime of SSDs 700 within the RG, storage controller 100 proceeds to process S308.

Next, storage controller 100 updates the information (for example data stored in a table) relating to entries or extents in which data migrated by inter-device WL (inter-RG WL process or internal RG WL process) is stored (S308), and terminates the inter-device WL process.

The inter-device WL process can be executed at any desired timing. For example, storage controller 100 may execute the inter-device WL process at a fixed time interval (for example, a day). Moreover, storage controller 100 may executes the inter-device WL process linked to an I/O request from host computer 30. Furthermore, storage controller 100 may execute the inter-device WL process timed to the reception of a specific command from host computer 30 or another computer. Still further, storage controller 100 may execute the inter-device WL process based on a user instruction to storage controller 100 from control software of host computer 30 to execute the inter-device WL process.

In the inter-device WL process in this diagram, the action of storage controller 100 is an action executed by inter-SSD WL program 12500 using processor 104.

The residual lifetime prediction process in S301 described previously will now be described in detail.

Figure 25:
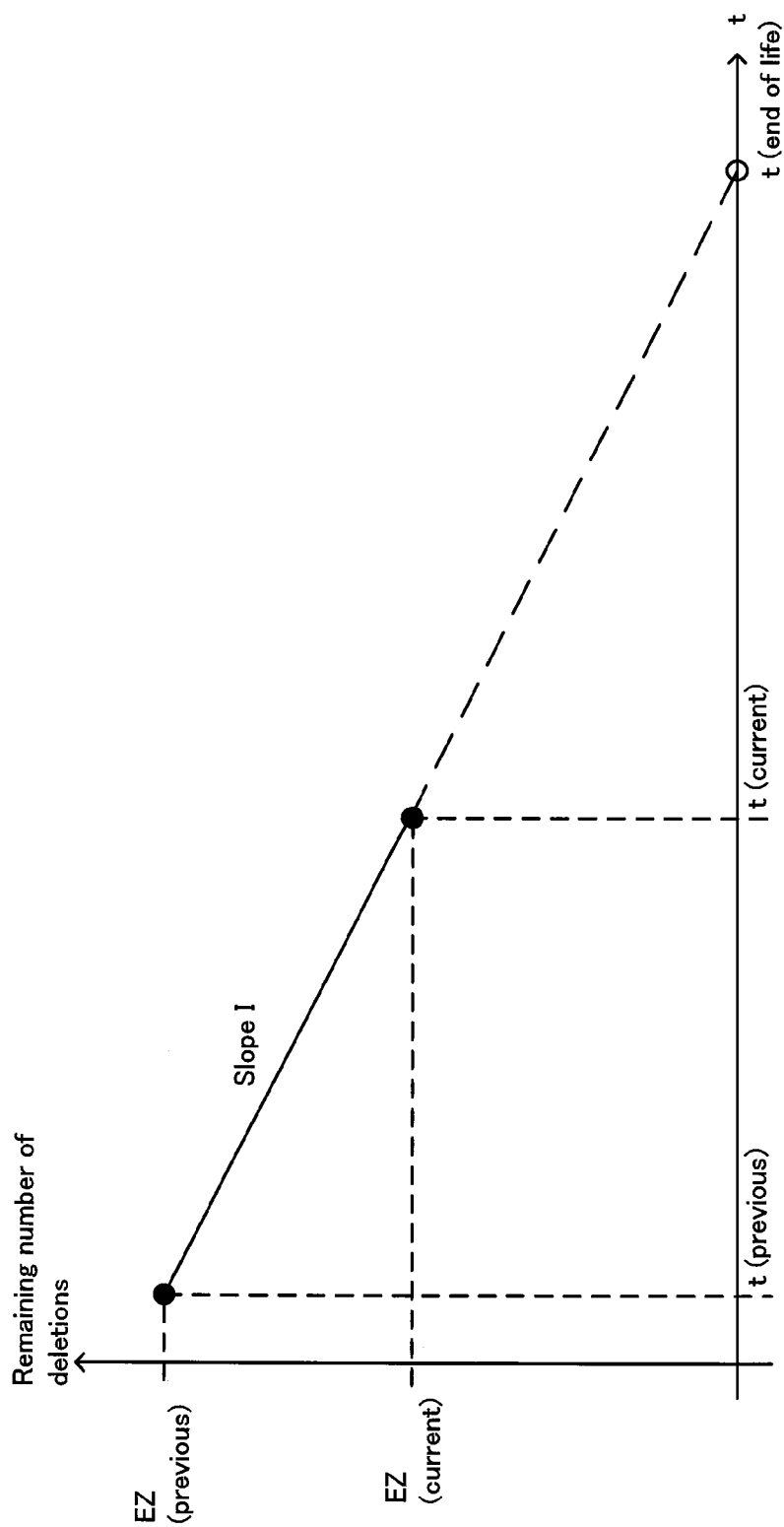
FIG. 25 illustrates the residual lifetime prediction process.

FIG. 25 illustrates the residual lifetime prediction process.

The residual lifetime prediction process predicts the residual lifetime, which is the amount of time until the lifetime is reached, from the speed of decline of the remaining number of deletions. The lifetime of SSD 700 is the actual time over which SSD 700 can be used, not the guarantee period. In this diagram the x-axis indicates the time from the start of use of SSD 700, with the y-axis indicating the number of remaining deletions. Where writing has been concentrated on a certain SSD 700, its lifetime becomes shorter. It is thus necessary to carry out inter-device WL so that other SSD 700s with a longer lifetime can be actively used.

t (previous) is the point at which the previous residual lifetime prediction process was carried out, and is a point which indicates the value stored in date of information update 13103. Moreover EZ (previous) is the remaining number of deletions at the time of the previous residual lifetime prediction process, and is the number indicated in the value stored in remaining number of deletions 13106.

t (present) is the point at which the current residual lifetime prediction process is carried out, with EZ (present) being the number of remaining deletions obtained at this point, containing the SSD internal information obtained at this time. Using this information, slope I, a linear line showing the remaining number of deletions against time, is calculated using the following formula.

$$I=(EZ(\text{present})-EZ(\text{previous}))/(t(\text{present})-t(\text{previous}))$$

The greater the absolute value of I, the faster the speed with which the number of remaining deletions will decrease.

The predicted residual lifetime, which is the time until t (end of life) is reached (t (end of life)−t (present)), and is the time from the present until the remaining number of deletions has reached zero, is calculated from the following formula using the calculated I and EZ (present).

$$\text{Predicted residual lifetime}=(EZ(\text{present})/I)$$

Storage controller 100 stores the predicted residual lifetime that has been calculated in disk management TBL 13100.

Where storage media and storage systems have been used continuously only for a prescribed period of time (a guarantee period, for example five years), it is important for data to be guaranteed. With the example, it is possible to use the plurality of storage media (for example, SSD 700) longer than the guarantee period by executing inter-device WL with the guarantee period as one index.

Furthermore, where the total write quantity, the quantity of data written to SSD 700 until the end of its lifetime is reached, is determined in advance, storage controller 100 may carry out a residual lifetime prediction process using the remaining write quantity (the value obtained by subtracting the FM total write quantity 13108 from the total write quantity) on the y-axis in place of the remaining number of deletions.

The FM write quantity prediction process in S303 described previously will now be described in detail.

Figure 26:
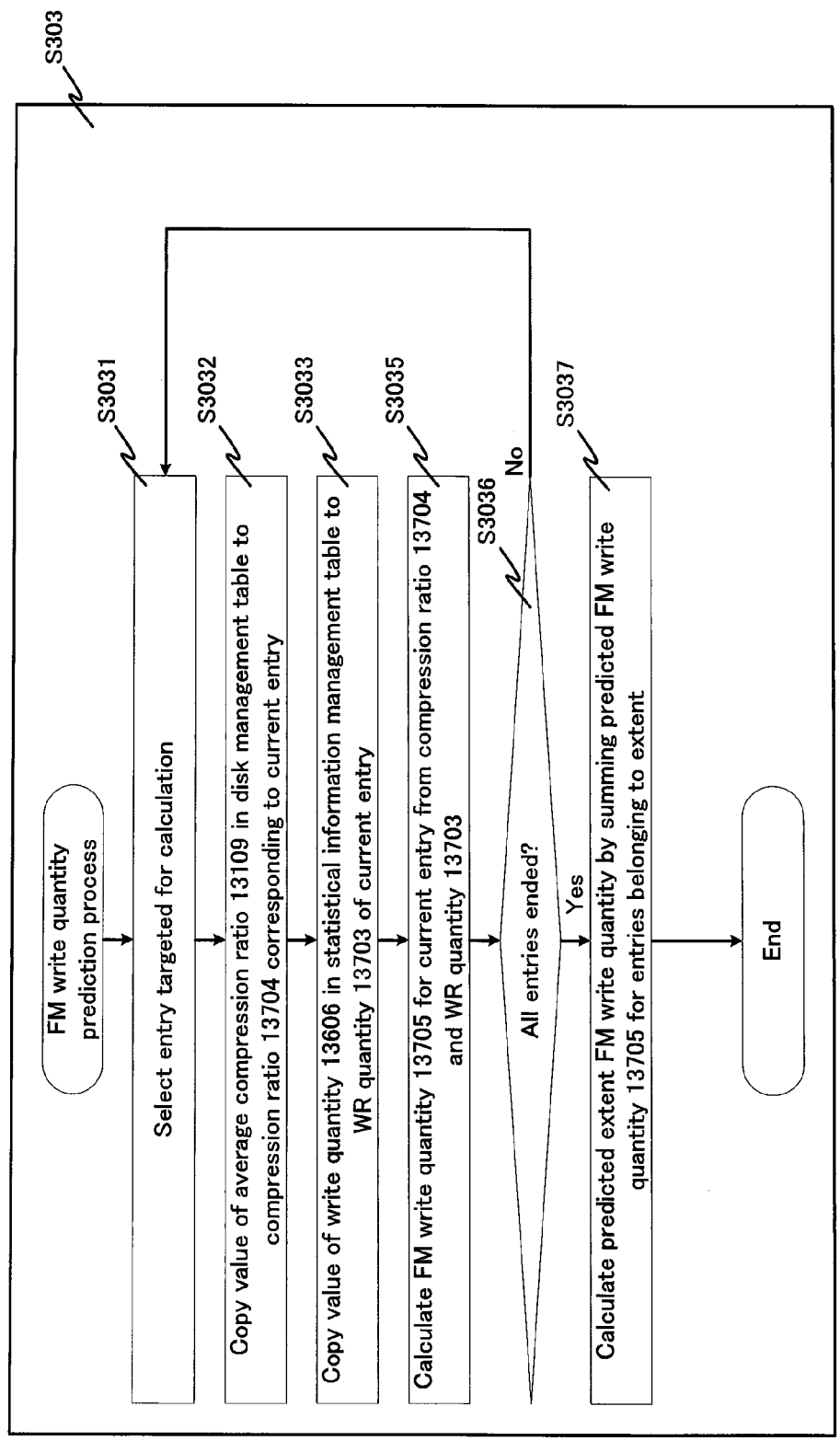
FIG. 26 illustrates the FM write quantity prediction process.

FIG. 26 illustrates the FM write quantity prediction process.

FM write quantity prediction process calculates the FM WR predicted quantity 13705 for FM WR quantity prediction TBL 13700 and extent FM WR predicted quantity 13902 for extent FM WR quantity prediction TBL 13900.

Storage controller 100 sequentially selects entries that are a target for prediction for the FM WR quantity based on FM WR quantity prediction TBL 13700 (S3031). Storage controller 100 then acquires a value for average compression ratio 13109 for SSD 700 assigned to the current entry in disk management TBL 13100, and stores (copies) this value in compression ratio 13704 of SSD 700 assigned to the current entry in FM WR quantity prediction TBL 13700 (S3032). Storage controller 100 then acquires a value for WR quantity 13606 of the current entry in statistical information management TBL 13600, and stores (copies) this value in WR quantity 13703 of the current entry within FM WR quantity prediction TBL 13700 (S3033). Storage controller 100 then calculates the FM WR predicted quantity 13705 within FM WR quantity prediction TBL 13700 from WR quantity 13703 and compression ratio 13704 of the current entry (S3035). The FM WR predicted quantity 13705 for the current entry will for example be a value for compression ratio 13704 of the current entry multiplied with WR quantity 13703 for the current entry. Storage controller 100 next determines whether or not the calculation of FM WR predicted quantity 13705 for all of the current entries has ended (S3036), and where the calculation has not ended (S3036: No), the process moves onto process S3031, and the next entry is selected. At the same time, where it is determined that the calculation has ended at S3036 (33036: Yes), the FM WR predicted quantity for each extent is calculated (S3037). Specifically, an entry is identified as belonging to a certain extent by referring to information in extent management TBL 13400, the total value of this FM WR predicted quantity 13705 is calculated as the extent FM WR predicted quantity, and this value is stored in extent FM WR predicted quantity 13902 of the current extent in extent FM WR quantity prediction TBL 13900.

It should be noted that storage controller 100 may use the write I/O number for each extent or entry and may also use the write quantity in the write I/O to calculate FM WR predicted quantity 13705.

The inter-RG WL process will now be explained.

Figure 27:
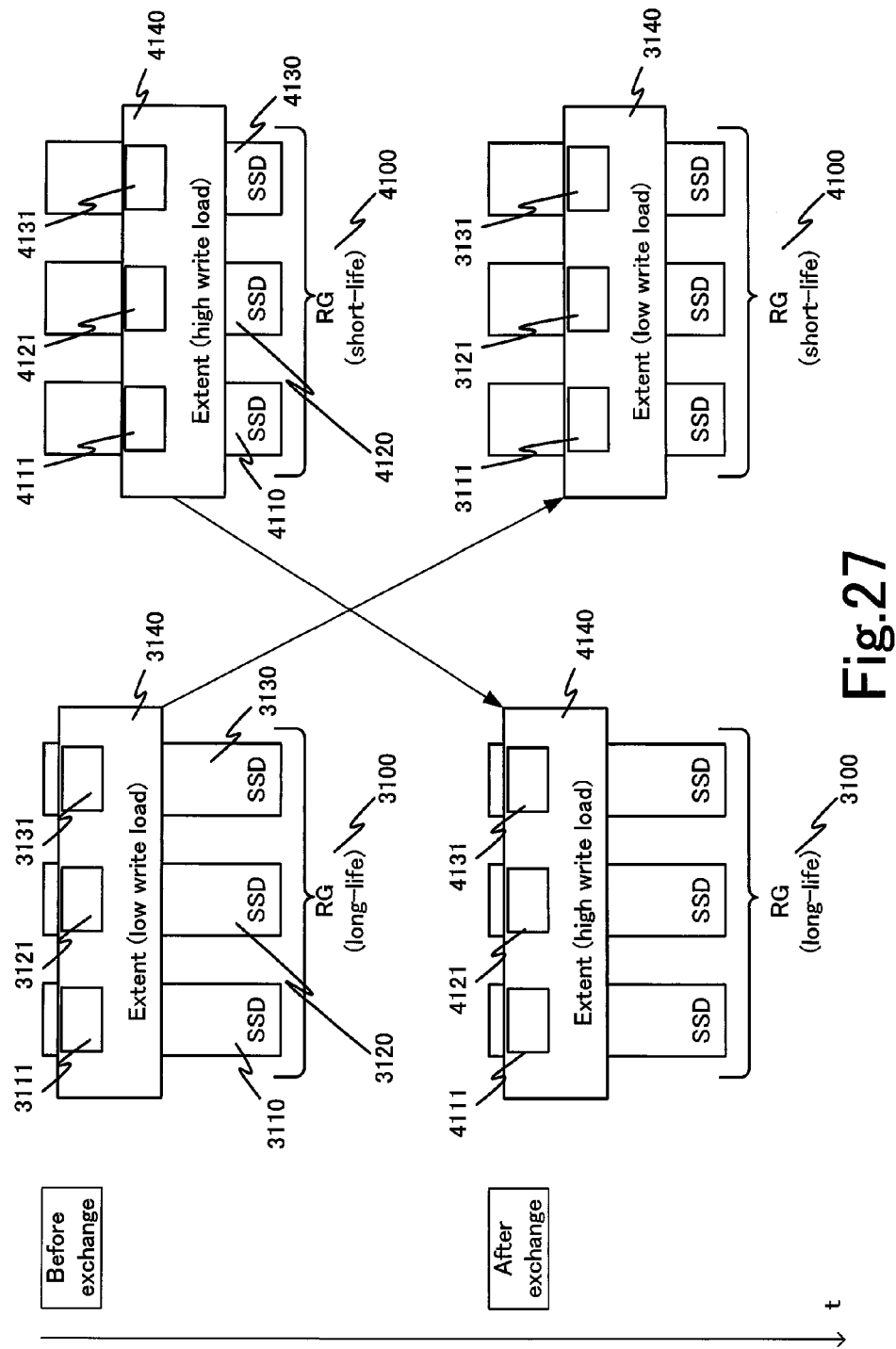
FIG. 27 schematically illustrates an example of the inter-RG WL process.

FIG. 27 schematically illustrates an example of the inter-RG WL process.

With the inter-RG WL process, storage controller 100 migrates data within a specific extent to another RG.

In the example in the diagram, SSD 3110, SSD 3120 and SSD 3130 are assigned to RG 3100. Moreover, RG 3100 has extent 3140. Extent 3140 is provided with entry 3111 in SSD 3110, entry 3121 in SSD 3120, and entry 3131 in SSD 3130.

SSD 4110, SSD 4120 and SSD 4130 are assigned to RG 4100. Moreover, RG 4100 is provided with extent 4140. Extent 4140 is provided with entry 4111 in SSD 4110, entry 4121 in SSD 4120, and entry 4131 in SSD 4130.

RG 4100 is a short-life RG. The short-life RG will for example be an RG containing a specified number (for example, 1) or grater of SSDs with a short lifetime. Short-life SSDs will, for example, be SSDs 700 with a predicted residual lifetime that is less than a specified threshold. The threshold will for example be determined based on the guarantee period. In this case the short-life SSD may be an SSD 700 estimated to reach the end of its lifetime faster than the guarantee period. The fact that as short-life SSD reaches the end of its lifetime before the guarantee period is likely to mean that writing has been concentrated in the short-life SSD. It is possible to extend the lifetime of the short-life SSD by migrating data with a high write load from a short-life SSD of this type.

Suppose that RG 3100 is a long-life RG. A long-life RG will for example be an RG where all the SSDs 700 within the RG are long-life SSDs. A long-life SSD will for example be an SSD 700 with a predicted residual lifetime greater than a prescribed threshold. A long-life RG can be said to be an RG that does not contain a short-life SSD.

Moreover, in the example in the drawing, storage controller 100 targets extent 4140 for which the extent FM WR predicted quantity is the greatest among the plurality of extents contained in RG 4100 as the target for inter-RG WL process. Moreover, storage controller 100 selects, as the target for inter-RG WL process, extent 3140 for which the extent FM WR predicted quantity is the smallest among the plurality of extents contained in RG 3100.

It should be noted that even where the lifetime of all of SSDs 700 being managed is predicted to be longer than the guarantee period, storage controller 100 execute the inter-RG WL process where the divergence between the lifetime of SSD 700 within a certain RG and the lifetime of an SSD 700 within another RG is not less than a specified threshold.

In this way, where the residual lifetime of RG 3100 and RG 4100 diverges, storage controller 100 carries out an inter-RG WL process to level off the residual lifetime of the SSDs within RG 4100 and the residual lifetime of the SSDs within RG 3100. For example storage controller 100 carries out a data exchange progress which exchanges data stored respectively in RG 4100 and RG 3100. By means of this data exchange process, data with a high write load is stored in RG 3100 with its long residual lifetime, and data with a low write load is stored in RG 4100 with its short residual lifetime.

This data exchange process will now be explained in detail.

Storage controller 100 specifies the logical address range for entry 3111, entry 3121, and entry 3131 within extent 3140 and entry 4111, entry 4121, and entry 4131 within extent 4140 by referring to extent management TBL 13400 and entry management TBL 13800. Thereafter, storage controller 100 issues a read request to SSDs 700 (the SSD 700 assigned to extent #3140 and SSD 700 assigned to extent #4140) containing the logical address range identified. Having received the read request, SSD 700 reads data specified as the physical page where the data is stored based on the logical address range contained in the read request and logical conversion TBL 23100, and transfers this to storage controller 100. Storage controller 100 temporarily stores the data read from this SSD 700 to cache memory 103. By this means the first data read from extent 3140 and the second data read from extent 4140 are temporarily stored in cache memory 103.

Thereafter, storage controller 100 issues a first data write request to the SSD 700 assigned to extent 4140, and issues a second data write request to the SSD 700 assigned to extent 3140. Having received the write request, the SSD 700 identifies an empty physical page from logical conversion TBL 23100, writes the received data into the identified empty physical page, and updates logical conversion TBL 23100. By this means the first data from extent 3140 is stored in extent 4140, and the second data from extent 4140 is stored in extent 3140.

Moreover, the exchange process sequentially varies the assignment of assigned extent #13505 of virtual volume management TBL 13500, and varies the assigned sequence of assigned entry #13404 for of extent management TBL 13400, and varies the value of start-LBA 13804 and last-LBA 13805 of entry management TBL 13800.

By storing data in extent 3140 with a lesser write load in RG 4100 with a short residual lifetime, the write load on SSD 700 assigned to RG 4100, whose residual lifetime is short, is reduced. As a result it is possible to suppress the speed of reduction in the residual lifetime of RG 4100. At the same time by storing data in extent 4140 with a greater write load in RG 3100 with a long residual lifetime, the write load on RG 3100 with a long residual lifetime is increased. Thus it is possible to shrink the divergences between the residual lifetime of RG 3100 and the residual lifetime of RG 4100 by means of this data exchange process. In other words, the number of deletions between the devices is leveled off.

Moreover, with the data exchange process in this diagram the data stored respectively in extent 3140 and extent 4140 is exchanged to enable the divergence between the residual lifetime of RG 3100 and RG 4100 to shrink, but the data stored in extent 4140 may be migrated to an extent in which data is not being stored.

Moreover, the data exchange process may be a process where data is migrated from a certain extent to an extent within another RG whose write load is lower than this entry, or a process where data is migrated from a certain extent to an extent assigned to a free space within another RG. Furthermore, the data exchange process may be a process where data is migrated from a certain entry to an entry within another SSD where the write load is lower than this entry, and may be a process where data is migrated from a certain entry to an entry assigned to a free space within another SSD.

Figure 28:
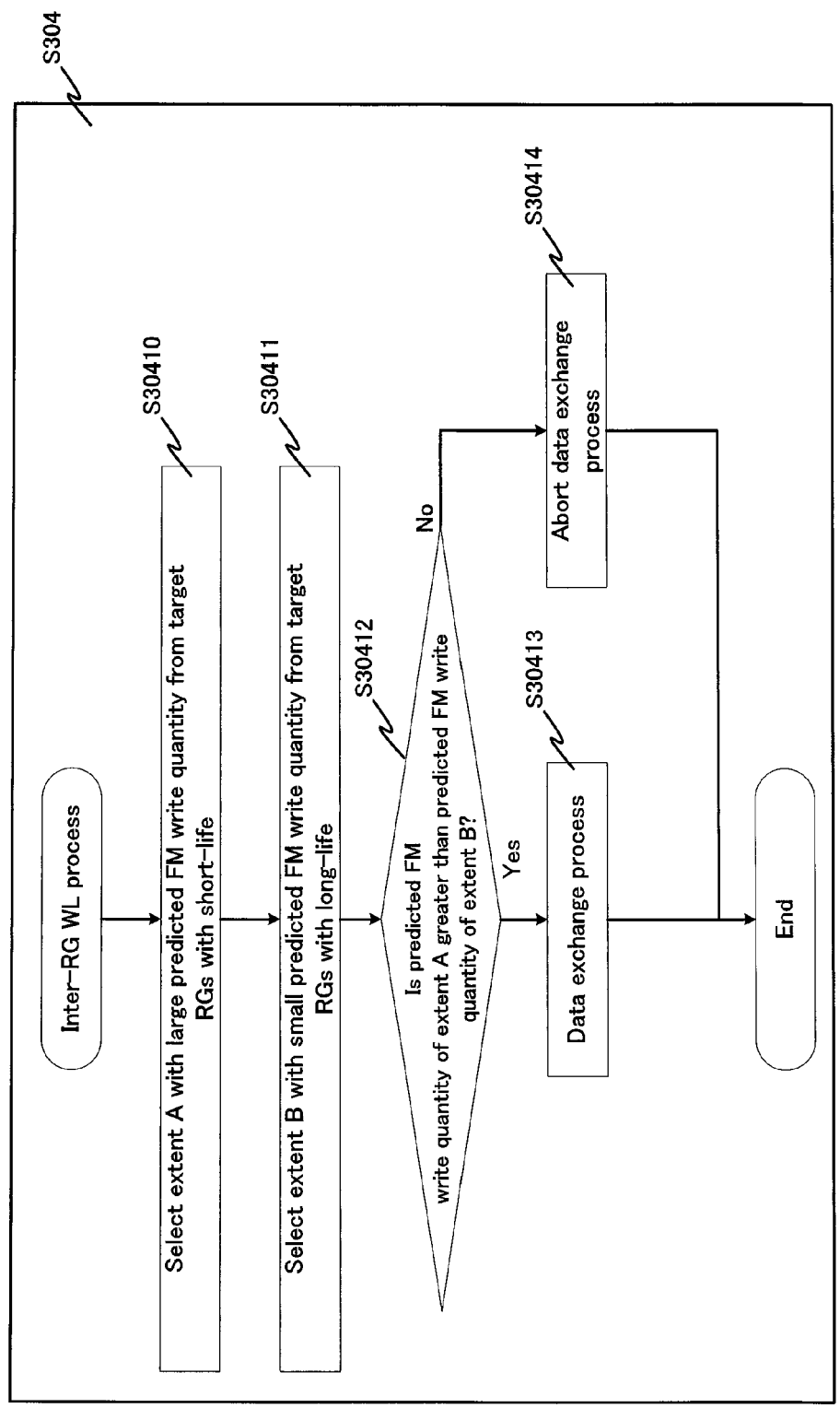
FIG. 28 illustrates the inter-RG WL process.

FIG. 28 illustrates the inter-RG WL process.

With the inter-RG WL process, storage controller 100 transmits to SSD controller 710 a data exchange indication stored respectively in two extents, and having received the data exchange indication, SSD controller 710 transmits data corresponding to the data exchange indication to storage controller 100.

Storage controller 100 selects a short-life RG as the target short-life RG based on disk management TBL 13100 and RG management TBL 13200. Where a plurality of short-life RGs are present, storage controller 100 may select any of these RGs as the target short-life RG. In this case storage controller 100 takes the predicted residual lifetime of each RG as the shortest predicted residual lifetime among the predicted remaining lives of SSDs 700 contained in each RG, and may select them as a target short-life RG in order from the shortest expected residual lifetime RG. Moreover, storage controller 100 may sequentially select the target short-life RG in order from the RG with the largest number of short-life SSDs.

Referring to FM WR quantity prediction TBL 13900, storage controller 100 selects extent A whose extent FM WR predicted quantity is large from the plurality of extents within the target short-life RG (S30410). Here extent A will for example be an extent whose extent FM WR predicted quantity is the largest among all the extents within target short-life RG.

Furthermore, storage controller 100 selects a long-life RG as a target long-life RG based on disk management TBL 13100 and RG management TBL 13200. Where there is no long-life RG or there are a plurality of long-life RGs, storage controller 100 may select as target long-life RG in order from the RG with the smallest number of short-life SSDs.

Referring to FM WR quantity prediction TBL 13700, storage controller 100 then selects extent B with a small FM WR quantity from among the plurality of extents within the target long-life RG (S30411). Extent B will for example be an extent whose extent FM WR predicted quantity is the smallest among all the extents within the target long-life RGs. It should be noted that storage controller 100 may makes a group of extents for whom the extent FM WR predicted quantity is not greater than a prescribed threshold, and select an extent from among these.

Storage controller 100 then determines whether or not the extent FM WR predicted quantity for extent A is greater than the extent FM WR predicted quantity for extent B (S30412).

If the result of determination at S30412 is positive (S30412: Yes), storage controller 100 carries out a data exchange process for extent A and extent B (S30413), and terminates this flow. At the same time, where the result of determination at S30412 is negative (S30412: No), storage controller 100 does not carry out a data exchange process (S30414) and terminates the flow.

Should the extent FM WR predicted quantity of extent B be greater than the extent FM WR predicted quantity for extent A, by moving extent B to an RG whose expected residual lifetime including extent A is shorter, storage controller 100 further increases the write load on this RG, and there is no leveling off of the number of deletions between devices. For this reason the determination of S30412 allows leveling off of the number of deletions to be appropriately carried out between devices without moving any unnecessary data.

The WL process within an RG will now be described.

Figure 29:
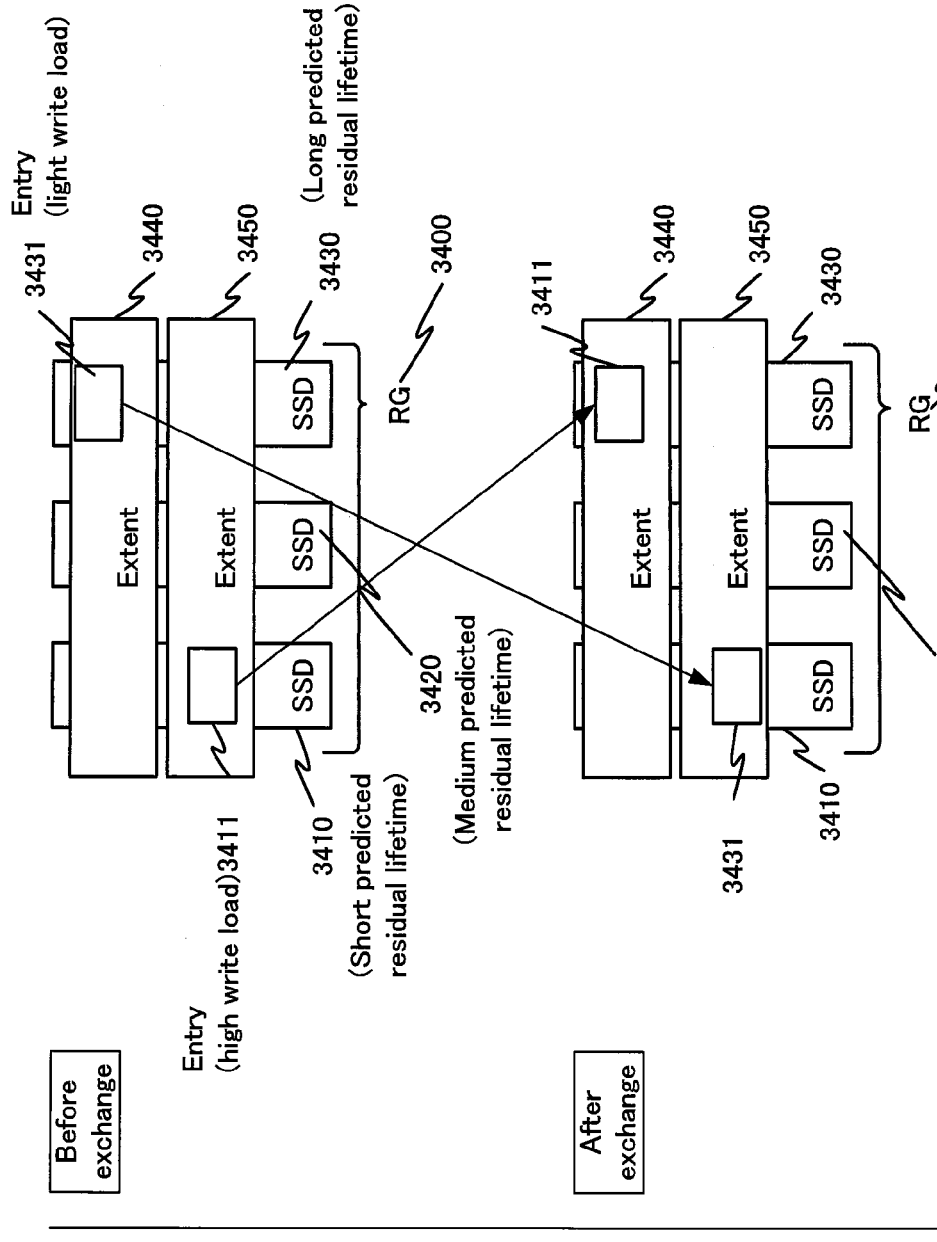
FIG. 29 schematically illustrates an example of the internal RG WL process.

FIG. 29 is a schematic diagram showing an example of the WL process in an RG.

With the WL process inside an RG, storage controller 100 moves data within a identified entry to another entry within the same RG.

In the example in the diagram, SSD 3410, SSD 3420, and SSD 3430 are assigned to RG 3400. Extents 3440, 3450 are contained in the same RG 3400.

Here the predicted residual lifetime of SSD 3430 is the longest of the SSDs 700 within RG 3400. This SSD 3430 is assigned to entry 3431 whose FM WR predicted quantity is small. Data is stored in this entry 3431. At the same time the predicted residual lifetime of SSD 3410 is shorter than the predicted residual lifetime of SSD 3430. This SSD 3410 is assigned to entry 3411 whose FM WR predicted quantity is greater than entry 3431. Data is stored in this entry 3411.

Here, storage controller 100 carries out a WL process inside the RG to level off the residual lifetime of SSD 3410 and SSD 3430. For example, in this data exchange process storage controller 100 carries out a data exchange process which exchanges data between entry 3431 whose FM WR predicted quantity is large and entry 3411 whose estimated FM WR predicted quantity is small. By this means it is possible to realize a leveling off of the deterioration in SSD 700 within RG 3400.

Figure 30:
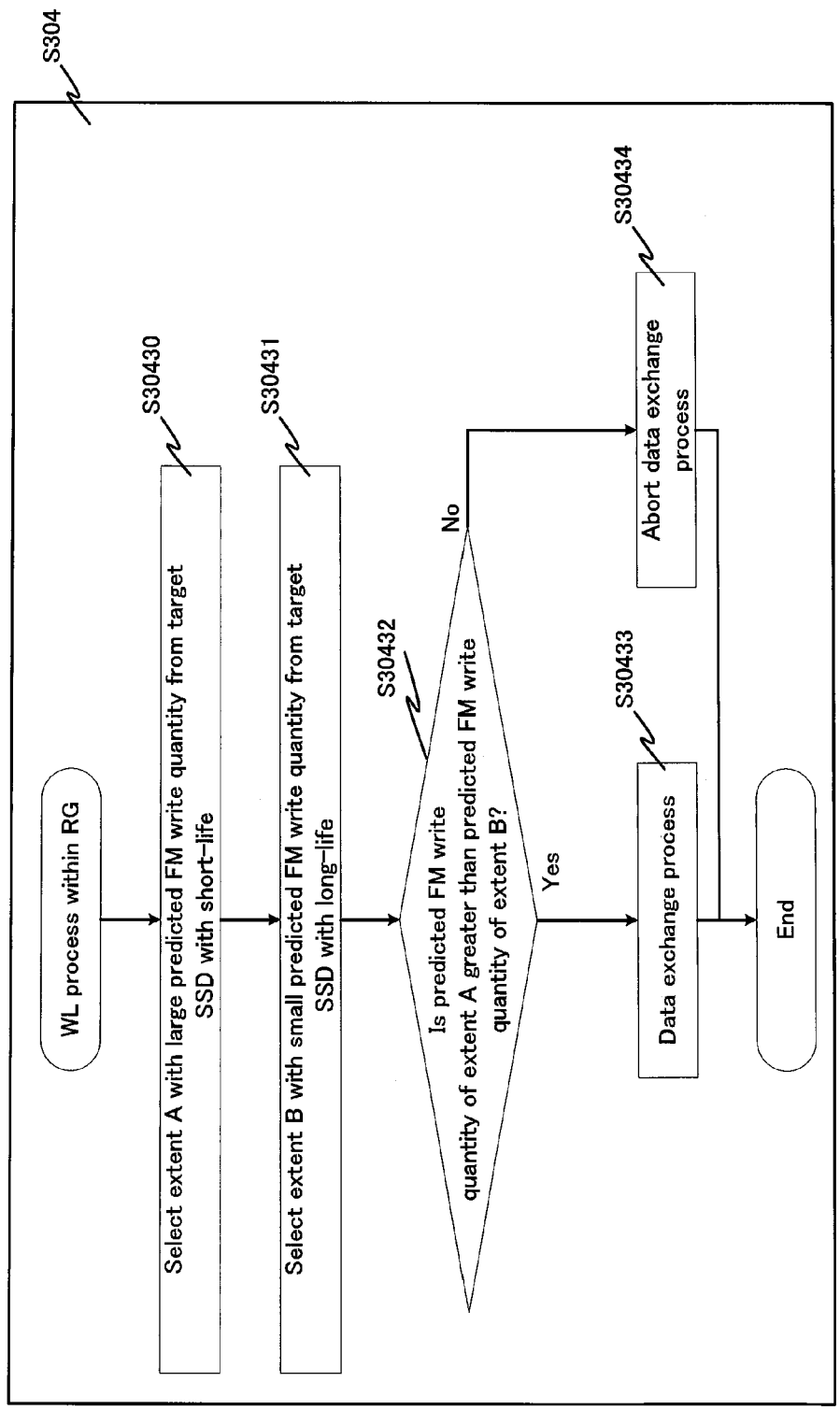
FIG. 30 illustrates the internal RG WL process.

FIG. 30 illustrates the WL process within an RG.

In the WL process within an RG, storage controller 100 selects a short-life RG as the target RG based on disk management TBL 13100 and RG management TBL 13200, and selects a short-life SSD within the target RG as the target short-life SSD. Where a plurality of short-life SSDs exist, storage controller 100 may select the target short-life RG in order from the short-life SSD with the shortest expected residual lifetime. Storage controller 100 refers to FM WR quantity prediction TBL 13700, and selects entry A with a large FM WR quantity from the target short-life SSDs (S30430). Here entry A will for example be an entry whose FM WR predicted quantity is the largest among all the entries within the target RG.

Next storage controller 100 selects a long-life SSD within the target RG as the target long-life SSD based on disk management TBL 13100 and FM WR quantity prediction TBL 13700. Where there is no long-life SSD, or a plurality of long-life SSDs are present, storage controller 100 may select the target long-life RG in order from the longest predicted residual lifetime SSD 700. Storage controller 100 selects entry B with a small FM WR quantity from among the target long-life SSDs (S30431). Here entry B will for example be an entry whose FM WR predicted quantity is the smallest among all the entries in the target RG.

Storage controller 100 then determines whether or not the FM WR quantity of entry A is greater than the FM WR quantity of entry B (S30432).

Where the result is positive (S30422: Yes), storage controller 100 carries out a data exchange process for entry A and entry B (S30433), and terminates the flow. At the same time, where the determination result of S30432 is negative (S30432: No), storage controller 100 does not carry out the data exchange process (S30434), and terminates the flow.

With the determination at S30422 it is possible to carry out leveling off of the number of deletions between devices appropriately, without unnecessary movement of data.

Moreover, storage controller 100 is able to easily move data by carrying out a data exchange process in units of extents having the same size or units of entry having the same size.

Moreover, by carrying out an inter-RG WL process and a WL process within an RG, it is possible to level off deterioration between the devices with different degrees of precision, enabling the efficiency of the leveling off to be improved.

Embodiment 2

With the example, parts identical to Embodiment 1 in the description will be omitted, and the description will focus on parts which differ to Embodiment 1.

In Embodiment 1, storage controller 100 obtains an average value for the compression ratio in SSD 700 from this SSD 700. In contrast, with Embodiment 2, storage controller 100 obtains the compression ratio for each entry from SSD 700. Specifically, SSD controller 710 includes the compression ratio in the response command to the write request from storage controller 100 sent to storage controller 100 at the end of the process. Here the compression ratio will for example be the compression ratio for the write data accompanying this write request. Storage controller 100 is able to manage the compression ratio for each entry by referring to the compression ratio within the response command. By this means in this example, it is possible to increase the precision of FM WR predicted quantity for each entry compared to Embodiment 1. As a result, it is possible to improve the precision of inter-device WL.

FIG. 31 illustrates statistical information management TBL 13600 in Embodiment 2. Compared to the statistical information management TBL 13600 in Embodiment 1, statistical information management TBL 13600 in this example is provided with compression ratio 13608 which is a new field for storing the compression ratio for each entry. The other fields are identical to Embodiment 1. The method of updating compression ratio 13608 will be described later.

FIG. 32 illustrates FM WR quantity prediction TBL 13700 in Embodiment 2. Compared to FM WR quantity prediction TBL 13700 in Embodiment 1, FM WR quantity prediction TBL 13700 in this example stores compression ratio 13704*b* for each entry #13702 instead of storing compression ratio 13704 for each disk #13701. By this means, where the compression ratio for different entries within the same SSD 700 differs due to different data patterns, storage controller 100 is able to more accurately detect the difference.

Figure 33:
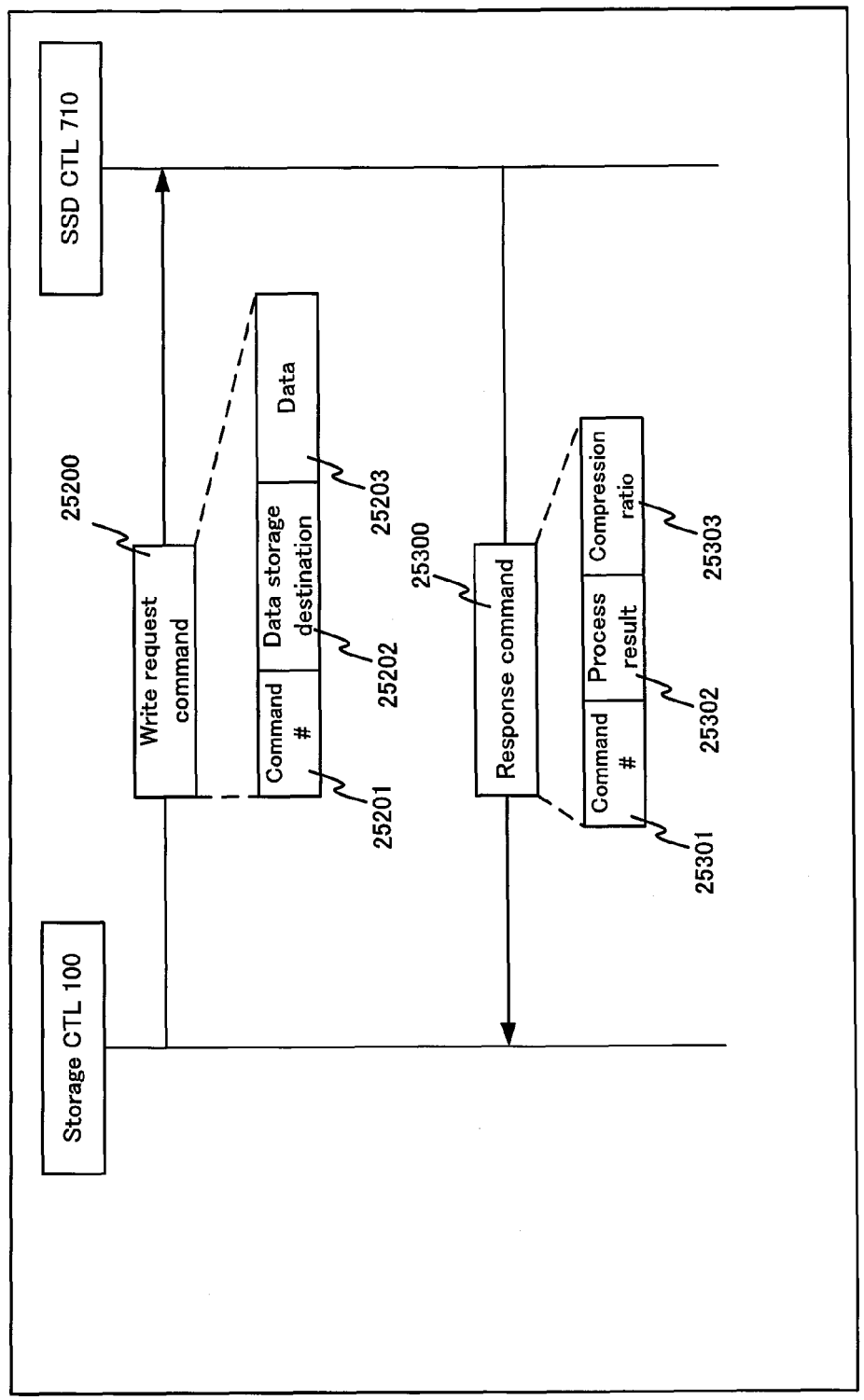
FIG. 33 illustrates the of write request operation in Embodiment 2.

FIG. 33 illustrates the write request action in Embodiment 2. This diagram illustrates the action where storage controller 100 transmits write request command 25200 to SSD controller 710, and SSD controller 710 transmits response command 25300, which is its response to storage controller 100.

Write request command 25200 has command #25201, data storage destination 25202 and data 25203. Command #25201 is an identifier for managing the plurality of write request commands, and is a unique number. Data storage destination 25202 indicates the disk # and LBA which is the storage destination for the read request data. Data 25203 is the data written to SSD 700.

Response command 25300 indicates the results of execution for the received write request. Response command 25300 has command #25301, process result 25302 and compression ratio 25303. Command #25301 is a device for managing which write command 25200 it is a response to, and indicates a value corresponding to command #25201. Process result 25302 indicates whether or not the current write request has succeeded. Storage controller 100 is able to confirm the success of the write request issued to SSD 700 by referring to this value. Compression ratio 25303 indicates the compression ratio for data written to SSD 700 by the current write request.

With the previously described write process S104, storage controller 100 transmitted write request command 25200 to SSD controller 710. With the above described write process S109, SSD controller 710 transmits response command 25300 to storage controller 100.

Next, at S110 storage controller 100 acquires a value for compression ratio 25303 contained in response command 25200, and when updating statistical information management TBL 13600 stores the value for compression ratio 25303 obtained in compression ratio 13608, target entry for the write request. In this way compression ratio 13608 indicates the compression ratio contained in the response to the latest write request. Here, storage controller 100 may store the compression ratio received for each entry, calculate the average value for the compression ratio stored for each entry, and store the calculated value in compression ratio 13608 of statistical information management TEL 13600. Moreover, storage controller 100 may only store a specified number of received compression ratios for each entry in order of newness, and calculate the average value of the specified number. Moreover, storage controller 100 may calculate the average value with a weighing according to such factors as the time at which the compression ratio is received or the size of the data in the write request.

Figure 34:
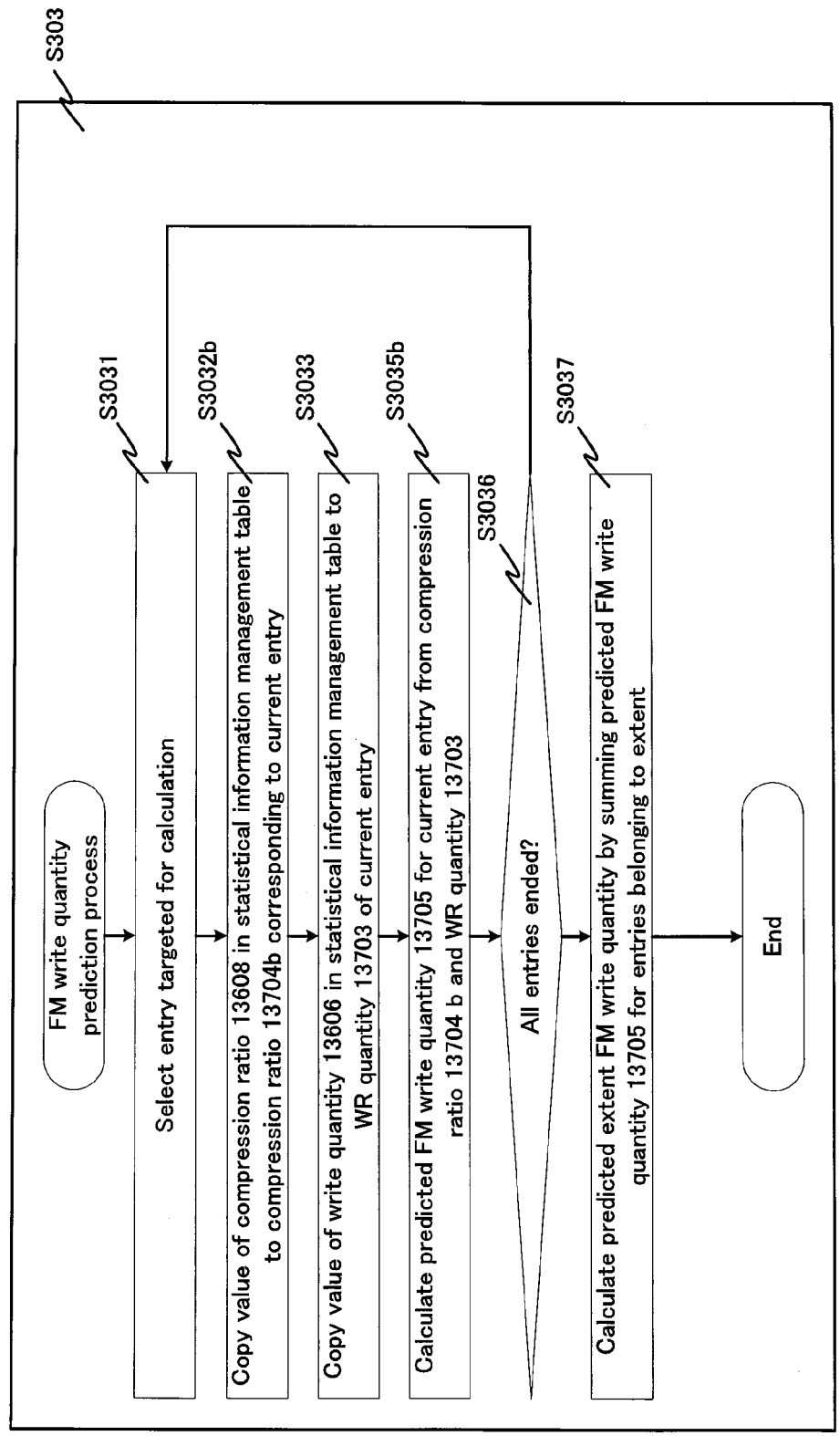
FIG. 34 illustrates the FM write quantity prediction process in Embodiment 2.

FIG. 34 shows the FM write quantity prediction process in Embodiment 2.

The FM write quantity prediction process in the example carries out inter-device WL process S303 in the same way as for Embodiment 1. Compared to the FM write quantity prediction process in Embodiment 1, the FM write quantity prediction process in this example has S3032b in place of S3032, and S3035b in place of S3035.

At S3032b, storage controller 100 acquires a value for compression ratio 13108 for the current entry within disk management TBL 13100, and stores (copies) this value in compression ratio 13704b for the current entry in FM WR quantity prediction TBL 13700.

At S3035b storage controller 100 calculates the FM WR predicted quantity 13705 for the current entry from WR quantity 13703 for the current entry and compression ratio 13704b in FM WR quantity prediction TBL 13700. FM WR predicted quantity 13705 for the current entry will be the value of compression ratio 13704b multiplied with WR quantity 13703 of the current entry, for example.

Storage controller 100 is able to improve the accuracy of the FM WR predicted quantity by updating the compression ratio of the target entry of the write request based on the compression ratio notified from SSD controller 710.

Embodiment 3

In this example, description of parts identical to Embodiment 2 will be omitted, and the description will focus on parts that differ from Embodiment 2.

In the example, storage controller 100 estimates the FM WR quantity using WA (Write Amplification).

Where a write request is transmitted to an SSD 700 whose data compression function is invalid, there will be cases where the quantity of data written to FMC 780 in fact is greater than the quantity of write data SSD 700 received from storage controller 100 due to processes within SSD 700 such as WL and reclamation. The increase in quantity of write data due to processes internal to SSD 700 depends on such factors as the access pattern and the size of the write data.

Where the quantity of write data increases due to an internal process in SSD 700, the number of deletions will also increase in line with this. Thus in this example, storage controller 100 acquires WA from SSD controller 710, and using this value to estimate the FM write quantity, it is possible to improve the accuracy of the FM WR predicted quantity and improve the accuracy of inter-device WL.

WA will now be described.

With the quantity of write data received from storage controller 100 by SSD controller 710 taken as a, and the quantity of data actually written to FMC 780 by SSD controller 710 as b, WA is expressed by the ratio (b/a).

For example, in a situation where the compression function data of SSD 700 is valid, and moreover no data at all has been written to SSD 700, there will be cases where WA is 1.0 as this data can be written directly into an empty page when SSD 700 receives write data from storage controller 100. Moreover, WA can exceed 1.0 where the data compression function of SSD 700 is invalid, valid data are written into a certain page on SSD 700, and a reclamation process is necessary as there are no empty pages in SSD 700 for example, as there is a need for pages which will become the migration destination for valid data and pages in which to write data from storage controller 100.

For this reason, in order to predict more accurately the quantity of data written to FMC 780, in this example storage controller 100 takes into consideration WA, which is a parameter indicating the amount of internal copying in SSD 700. Thus in Embodiment 3, storage controller 100 estimates the FM write quantity using WA, acquiring SSD internal information containing WA from SSD 700 by using the same disk internal information acquisition command as Embodiment 1.

FIG. 35 illustrates disk management TBL 13100 in Embodiment 3. Compared to disk management TEL 13100 in Embodiment 1, disk management TBL 13100 in this example is newly provided with WA 13110 which is a field for registering WA for each disk. WA 13110 stores the value obtained from SSD 700 using a disk internal information acquisition command for each SSD 700.

FIG. 36 illustrates FM WR quantity prediction TBL 13700 in Embodiment 3. Compared to FM WR quantity prediction TBL 13700 in Embodiment 2, FM WR quantity prediction TBL 13700 in this example is newly provided with WA 13706, which is a field listing the WA for each disk. WA 13706 stores a value copied from WA 13110 of the current SSD 700 in disk management TBL 13100.

Figure 37:
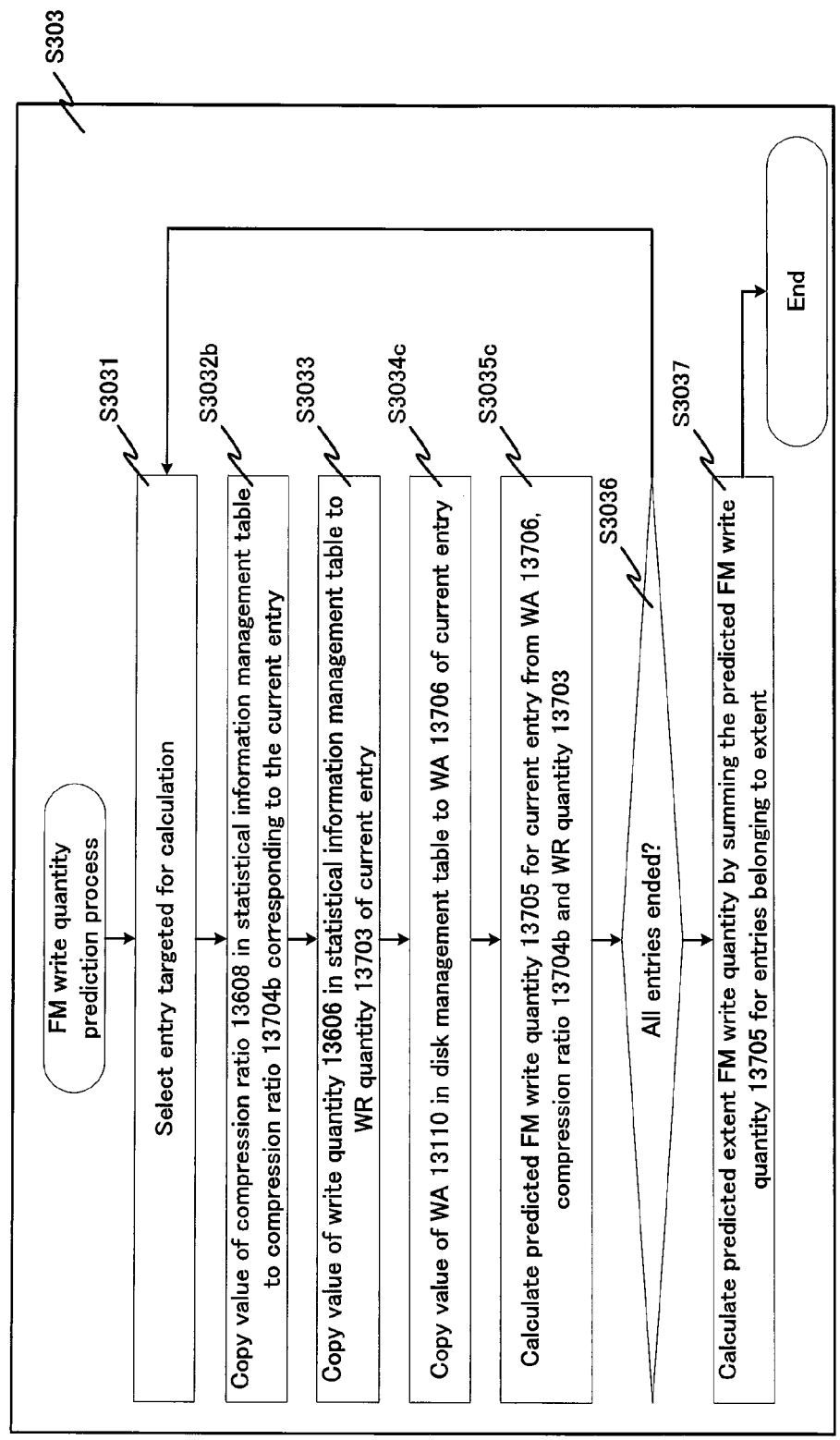
FIG. 37 illustrates the FM write quantity prediction process in Embodiment 3.

FIG. 37 illustrates the FM write quantity prediction process in Embodiment 3.

The FM write quantity prediction process in this example carries out inter-device WL process S303 in the same way as Embodiment 2. Compared to the FM write quantity prediction process in Embodiment 2, the FM write quantity prediction process in this example is newly provided with S3034c between S3033 and S3035b, and has S3035c in place of S3035b.

At S3034c, storage controller 100 copies the value of WA 13110 in SSD 700 assigned to the current entry in disk management TBL 13100 to WA 13706 of the current entry in FM WR quantity prediction TBL 13700.

At S3035c, storage controller 100 calculates FM WR predicted quantity 13705 for the current entry from WR quantity 13703, compression ratio 13704b, and WA 13706 for the current entry within FM WR quantity prediction TBL 13700. FM WR predicted quantity 13705 for the current entry will be the product of WR quantity 13703 for the current entry, compression ratio 13704b for the current entry and WA 13706 for the current entry, for example.

The effect of the above example will now be described.

By having storage controller 100 store statistical information for I/O requests in SSD controller 710, and receiving SSD internal information indicating changes to the quantity of data due to compression from SSD controller 710, the internal state of SSD 700 (for example, the quantity written to FMC 780) can be estimated. Moreover, storage controller 100 can use the estimated state to improve the accuracy of inter-device WL for a plurality of SSDs 700. Moreover, it is possible to improve the accuracy of inter-device WL, and to improve the accuracy of leveling off of deterioration between devices even where an SSD 700 has a data compression function, and the write quantity stored by storage controller 100 in SSD 700 and the actual write quantity to FMC 780 are different.

Moreover, when data is repeatedly read from a specific page in FMC 780, its character is such that there is a danger of data becoming degraded. Thus an ordinary SSD stores an ECC, a data error correction code, on the page together with the data, and partial errors are corrected by the ECC when the data is read. Where the occurrence of data errors exceeds a specified threshold at this time, SSD migrates the data read to another page. In other words, FM division can occur even in an environment where only data reads occur. Here storage 100 estimates the read quantity of FMC 780, and may carry out inter-device WL using the read quantity estimated in the same way as for the write quantity to FMC 780. In this case, storage controller 100 may use read I/O numbers as information relating to the reads for each entry and extent in order to estimate the read quantity for FMC 780, and may also use the read quantity.

Storage controller 100 may acquire deterioration information indicating deterioration in SSD 700 from SSD controller 710 not limited to the remaining number of deletions. Deterioration information may be a value indicating the number of deletions in SSD 700, and may also be an attribute which affects the residual lifetime of SSD 700 (for example, a storage medium classification such as single level cell or multi-level cell), or may be a number used in predicting (calculating) the residual lifetime. By acquiring deterioration information from an SSD 700, storage controller 100 is able to predict the residual lifetime of this SSD 700.

Storage controller 100 may acquire from SSD controller 710 relationship information indicating the relationship between the quantity of write data transmitted to SSD controller 710 from storage controller 100 and the quantity of compressed data in which that write data has been compressed that is not limited to the average compression ratio, the compression ratio or WA. The relationship data may be the ratio of data size after compression, and may be a number expressing the data size after compression. Storage controller 100 is able to estimate the quantity of data written to FMC 780 in this SSD 700 by acquiring information data from this SSD 700.

Storage controller 100 is able to identify logical storage areas with a higher write load than other logical storage areas by estimating the quantity of data written to a nonvolatile semiconductor memory for each logical storage area in an extent or entry. By having SSD controller 710 assign a plurality of physical storage areas to logical storage areas, storage controller 100 is able to manage the write load using logical storage areas larger than the physical storage areas managed by SSD controller 710 as a unit. Moreover, even where the logical storage area is assigned to another physical storage area through updating or the like, the properties of the write load for this logical storage area can be maintained.

With the above examples, storage controller 100 has carried out a process calculating the number of remaining deletions in the residual lifetime (number of days), but the SSD controller 710 may notify the residual lifetime directly. In this case SSD controller 710 will have the above-described residual lifetime prediction process function, for example.

Moreover, the character of FMC 780 is such that deterioration is more likely to occur the shorter the time from a data write (program) to deletion. Thus storage controller 100 may use the degree of deterioration which is an index that takes into account the time from writing to deletion in the calculation of the residual lifetime.

It is possible to use the cumulative value (point) as the degree of deterioration according to the time elapsed from the previous write for each block deletion. For example storage controller 100 adds 40 points to the degree of deterioration where data is deleted within 5 min of data having been written, adding 35 points to the degree of deterioration where data is deleted within 10 min. In this way it is possible for storage controller 100 to manage the degree of deterioration by adding points for each deletion according to the amount of time that has elapsed.

By determining a maximum value for the predetermined degree of deterioration (upper limit value), it is possible to protect the lifetime from an accelerated rate of deterioration. By using the degree of deterioration in this way, it is possible to protect the lifetime more accurately than using only the FM WR predicted quantity and the number of deletions, and it is possible to improve the accuracy of inter-device WL.

In the above examples, inter-device WL has been described for extent and entry units, but storage controller 100 may carry out inter-device WL using LU units. In this case, storage controller 100 acquires SSD internal information in LU units. Other processes migrate data stored in LU by selecting the migration source RG (short-life RG) and migration destination RG (long-life RG) based on the lifetime of the RG in the same way as for the above examples based on the FM WR predicted quantity (write load) of migration destination RG and selected migration source RG.

Where an RG with a compression setting (compressed RG) and a RG with an uncompressed setting (uncompressed RG) exist together within storage system 10, storage controller 100 may execute inter-device WL between the compressed RG and non-compressed RG. In this case, storage controller 100 stores migration policies for inter-device WL, and the user or the administrator may select a migration policy according to the purpose for each LU or RG via the control software of host computer 30. The migration policy will give permission for inter-device WL only between compressed RGs, or permission for inter-device WL only for non-compressed RGs, or permission for inter-device WL between compressed RGs and non-compressed RGs, for example.

Moreover, where host computer 30 stores data compressed by an application of host computer 30 in storage system 10, it is possible that the size of data will not change, even when recompressed within SSD controller 710. Thus an interface which notifies whether or not the data transmitted to storage controller 100 from host computer 30 has been already compressed is prepared, and storage controller 100 makes the necessary judgment for compression using SSD controller 710 based on the notified information, or determines which RG to store the data in, whether a compressed RG or an non-compressed RG, or may determine the migration policy for inter-device WL. At this interface, a field may be prepared indicating whether or not the data has been compressed within the write request command attached to storage controller 100 by host computer 30, for example.

The technology described for the above examples can be expressed as follows:

(Expression 1)
A storage system comprising:
a plurality of storage devices; and
a storage controller coupled to the plurality of storage devices and a host computer, wherein
each of the plurality of storage devices includes a plurality of nonvolatile semiconductor memory chips, and a memory controller coupled to the plurality of nonvolatile semiconductor memory chips and the storage controller,
the storage controller assigns storage areas provided by each of the plurality of storage devices to a plurality of logical storage areas,
when the storage controller receives a write instruction and write data from the host computer, selects a logical storage area from among the plurality of logical storage areas, selects a storage device assigned to the selected logical storage area from among the plurality of storage devices, and transmits the write data to the selected storage device,
when the memory controller receives the write data from the storage controller, converts the write data to compressed data by compressing the write data, writes the compressed data to any of the plurality of nonvolatile semiconductor memory chips, and transmits to the storage controller relationship information containing relationship between a data quantity of the write data and a data quantity of the compressed data,
the storage controller regards each of the plurality of logical storage areas as a target area, stores a request data quantity indicating the data quantity of write data written to the target area in a specific period, and regards, based on the request data quantity and the relationship information, as an estimated data quantity of the target area a quantity of data written to the plurality of nonvolatile semiconductor memory chips based on write data written to the target area in the specific period, and
the storage controller selects a first logical storage area from among the plurality of logical storage areas, selects from among the plurality of logical storage areas a second logical storage area with an estimated data quantity less than an estimated data quantity of the first logical storage area and assigned to a storage device different from a storage device assigned to the first logical storage area, and migrates first data stored in the first logical storage area to the second logical storage area.

(Expression 2)
A storage system in Expression 1, wherein
the memory controller transmits deterioration information indicating deterioration in the plurality of nonvolatile semiconductor memory chips to the storage controller,
the storage controller predicts, based on deterioration information of the each of the plurality of storage devices, a residual lifetime of the corresponding storage device,
a residual lifetime of a storage device assigned to the second logical storage area is longer than a residual lifetime of a storage device assigned to the first logical storage area.

(Expression 3)
A storage system in Expression 2, wherein the first logical storage area and the second logical storage area have the same size.

(Expression 4)
A storage system in Expression 3, wherein the storage controller reads the first data stored in the first logical storage area, reads second data stored in the second logical storage area, requests the storage device assigned to the second logical storage area to write the first data read to the second logical storage area, and requests the storage device assigned to the first logical storage area to write the second data read to the first logical storage area.

(Expression 5)
A storage system in Expression 4, wherein
the memory controller accumulates the data quantity of the write data and accumulates the data quantity of the compressed data, calculates a compression ratio which is a ratio of the accumulated data quantity of compressed data to the accumulated data quantity of the write data, and transmits the compression ratio to the storage controller as relationship information on the corresponding storage device,
for a specific logical storage area being each of the plurality of logical storage areas, the storage controller calculates an estimated data quantity for the specific logical storage area by multiplying a request data quantity of the specific logical storage area by a compression ratio of the corresponding storage device.

(Expression 6)
A storage system in Expression 4, wherein
the memory controller calculates a compression ratio which is a ratio of the data quantity of compressed data to the data quantity of the write data, and transmits the compression ratio to the storage controller as relationship information on the selected logical storage area,
for a specific logical storage area being each of the plurality of logical storage areas, the storage controller calculates an estimated data quantity of the specific logical storage area by multiplying a request data quantity of the specific logical storage area by a value based on a compression ratio of the specific logical storage area.

(Expression 7)
A storage system in Expression 4, wherein
the memory controller calculates a compression ratio which is a ratio of the data quantity of compressed data to the data quantity of the write data, and transmits the compression ratio to the storage controller as relationship information on the selected logical storage area,
for a specific logical storage area being each of the plurality of logical storage areas, the storage controller calculates an estimated data quantity of the specific logical storage area by multiplying a request data quantity of the specific logical storage area by a value based on a compression ratio of the specific logical storage area.

(Expression 8)
A storage system in Expression 4, wherein the memory controller assigns a plurality of physical storage areas within the plurality of nonvolatile semiconductor memory chips to a logical storage area corresponding to local storage device.

(Expression 9)
A storage system in Expression 8, wherein the storage controller creates a RAID group from the plurality of storage devices.

(Expression 10)
A storage system in Expression 9, wherein the storage controller migrates data stored in the first logical storage area to the second logical storage area when variation in the respective residual lifetimes of the plurality of storage devices satisfies a specified first variation condition.

(Expression 11)
A storage system in Expression 4, wherein
the storage controller creates a first RAID group and a second RAID group from the plurality of storage devices, and
the first RAID group has the first logical storage area, and the second RAID group has the second logical storage area.

(Expression 12)
A storage system in Expression 11, wherein
the storage controller estimates a residual lifetime of a corresponding RAID group based on the respective residual lifetimes of the plurality of storage devices, and migrates data stored in the first storage area to the second storage area when the variation in the respective residual lifetimes of the first RAID group and the second RAID group satisfies a specified second variation condition.

(Expression 13)
A storage system in Expression 12, wherein
the first logical area includes a plurality of partial areas,
the storage controller disposes the plurality of partial areas in storage devices which differ from one another among the plurality of storage devices,
the storage controller regards each of the plurality of partial areas as a target partial area, stores a request data quantity indicating a data quantity of write data to the target partial area in the specific time period, and regards, based on the request data quantity and the relationship information, as an estimated data quantity of the target partial areas a quantity of data written into the nonvolatile semiconductor memory chip based on write data to the target partial area in the specific time period,
when a variation in the respective residual lifetimes of storage devices within the first RAID group satisfies a specified third variation condition, the storage controller selects a first partial area from among the plurality of partial areas, selects from among the plurality of partial areas a second partial area having an estimated data quantity less than an estimated data quantity of the first partial area disposed in a storage device different from a storage device in which the first partial area is disposed, and migrates data stored in the first partial area to the second partial area.

(Expression 14)
A storage system in Expression 4, wherein
the storage controller associates each of the plurality of logical storage areas with a virtual address, and in accordance with the migration, associates the second logical storage area with a virtual address associated with the first logical storage area prior to the migration.

(Expression 15)
A method of controlling a storage system including a plurality of storage devices, a storage controller coupled to the plurality of storage devices and a host computer, each of the plurality of storage devices including a plurality of nonvolatile semiconductor memory chips, and a memory controller coupled to the plurality of nonvolatile semiconductor memory chips and the storage controller,
the method comprising:
assigning, using the storage controller, storage areas provided by each of the plurality of storage devices to a plurality of logical storage areas,
when the storage controller receives a write instruction and write data from the host computer, selecting, using the storage controller, a logical storage area from among the plurality of logical storage areas, selecting, using the storage controller, a storage device assigned to the selected logical storage area from among the plurality of storage devices, and transmitting, using the storage controller, the write data to the selected storage device,
when the memory controller receives the write data from the storage controller, converting, using the memory controller, the write data to compressed data by compressing the write data, writing, using the memory controller, the compressed data to any of the plurality of nonvolatile semiconductor memory chips, and transmitting, using the memory controller, to the storage controller relationship information containing relationship between a data quantity of the write data and a data quantity of the compressed data,
regarding, using the storage controller, each of the plurality of logical storage areas as a target area, storing, using the storage controller, a request data quantity indicating the data quantity of data written to the target area in a specific period, and regarding, using the storage controller, based on the request data quantity and the relationship information, as an estimated data quantity of the target area a quantity of data written to the plurality of nonvolatile semiconductor memory chips based on write data written to the target area in the specific period, and
selecting, using the storage controller, a first logical storage area from among the plurality of logical storage areas, selecting, using the storage controller, from among the plurality of logical storage areas a second logical storage area with an estimated data quantity less than an estimated data quantity of the first logical storage area and assigned to a storage device different from the storage device assigned to the first logical storage area, and migrating, using the storage controller, first data stored in the first logical storage area to the second logical storage area.

The terms in the above Expressions will now be explained. Storage device corresponds to SSD 700 or the like. Nonvolatile semiconductor memory chip corresponds to FMC 780 or the like. Memory controller corresponds to SSD controller 710 or the like. Logical storage area corresponds to an entry, extent or the like. Write indication corresponds to host write request or the like. Write data quantity corresponds to WR quantity or the like. Relationship information corresponds to average compression ratio, compression ratio, WA or the like. Estimated data quantity corresponds to FM WR predicted quantity, extent FM WR predicted quantity or the like. Deterioration information corresponds to remaining number of deletions or the like. Residual lifetime corresponds to predicted residual lifetime or the like. Partial areas correspond to entries or the like. Physical storage areas correspond to pages or the like.

REFERENCE SIGNS LIST

10 Storage system
11 Physical storage medium
30 Host computer
100 Storage controller
102 Internal network
103 Cache memory
104 Processor
700 SSD (Solid State Drive)
710 SSD controller
712 Internal network drive
713 Processor
716 Cache memory
718 Compression/expansion circuit
780 Flash memory chip

The invention claimed is:

1. A storage system comprising:
a plurality of storage devices; and
a storage controller coupled to the plurality of storage devices and a host computer, wherein
each of the plurality of storage devices includes a plurality of nonvolatile semiconductor memory chips, and a memory controller coupled to the plurality of nonvolatile semiconductor memory chips and the storage controller,
the storage controller assigns storage areas provided by each of the plurality of storage devices to a plurality of logical storage areas,
when the storage controller receives a write instruction and write data from the host computer, the storage controller selects a logical storage area from among the plurality of logical storage areas, selects a storage device assigned to the selected logical storage area from among the plurality of storage devices, and transmits the write data to the selected storage device,
when the memory controller receives the write data from the storage controller, the memory controller converts the write data to compressed data by compressing the write data, writes the compressed data to any of the plurality of nonvolatile semiconductor memory chips, and transmits to the storage controller relationship information containing relationship between a data quantity of the write data and a data quantity of the compressed data,
the storage controller regards each of the plurality of logical storage areas as a target area, stores a request data quantity indicating the data quantity of write data written to the target area in a specific period, and regards, based on the request data quantity and the relationship information, as an estimated data quantity of the target area a quantity of data written to the plurality of nonvolatile semiconductor memory chips based on write data written to the target area in the specific period,
the storage controller selects a first logical storage area from among the plurality of logical storage areas, selects from among the plurality of logical storage areas a second logical storage area with an estimated data quantity less than an estimated data quantity of the first logical storage area and assigned to a storage device different from a storage device assigned to the first logical storage area, and migrates first data stored in the first logical storage area to the second logical storage area,
the memory controller transmits deterioration information indicating deterioration in the plurality of nonvolatile semiconductor memory chips to the storage controller,
the storage controller predicts, based on deterioration information of the each of the plurality of storage devices, a residual lifetime of the corresponding storage device,
a residual lifetime of a storage device assigned to the second logical storage area is longer than a residual lifetime of a storage device assigned to the first logical storage area,
the first logical storage area and the second logical storage area have the same size,
the storage controller reads the first data stored in the first logical storage area, reads second data stored in the second logical storage area, requests the storage device assigned to the second logical storage area to write the first data read to the second logical storage area, and requests the storage device assigned to the first logical storage area to write the second data read to the first logical storage area,
the memory controller accumulates the data quantity of the write data and accumulates the data quantity of the compressed data, calculates a compression ratio which is a ratio of the accumulated data quantity of compressed data to the accumulated data quantity of the write data, and transmits the compression ratio to the storage controller as relationship information on the corresponding storage device, and
for a specific logical storage area being each of the plurality of logical storage areas, the storage controller calculates an estimated data quantity for the specific logical storage area by multiplying a request data quantity of the specific logical storage area by a compression ratio of the corresponding storage device.

2. A storage system according to claim 1, wherein the memory controller assigns a plurality of physical storage areas within the plurality of nonvolatile semiconductor memory chips to a logical storage area corresponding to local storage device.

3. A storage system according to claim 2, wherein the storage controller creates a RAID group from the plurality of storage devices.

4. A storage system according to claim 3, wherein the storage controller migrates data stored in the first logical storage area to the second logical storage area when variation in the respective residual lifetimes of the plurality of storage devices satisfies a specified first variation condition.

5. A storage system according to claim 1, wherein
the storage controller creates a first RAID group and a second RAID group from the plurality of storage devices, and
the first RAID group has the first logical storage area, and the second RAID group has the second logical storage area.

6. A storage system according to claim 5, wherein
the storage controller estimates a residual lifetime of a corresponding RAID group based on the respective residual lifetimes of the plurality of storage devices, and migrates data stored in the first storage area to the second storage area when the variation in the respective residual lifetimes of the first RAID group and the second RAID group satisfies a specified second variation condition.

7. A storage system according to claim 6, wherein
the first logical area includes a plurality of partial areas,
the storage controller disposes the plurality of partial areas in storage devices which differ from one another among the plurality of storage devices,
the storage controller regards each of the plurality of partial areas as a target partial area, stores a request data quantity indicating a data quantity of write data to the target partial area in the specific time period, and regards, based on the request data quantity and the relationship information, as an estimated data quantity of the target partial areas a quantity of data written into the nonvolatile semiconductor memory chip based on write data to the target partial area in the specific time period, when a variation in the respective residual lifetimes of storage devices within the first RAID group satisfies a specified third variation condition, the storage controller selects a first partial area from among the plurality of partial areas, selects from among the plurality of partial areas a second partial area having an estimated data quantity less than an estimated data quantity of the first partial area disposed in a storage device different from a storage device in which the first partial area is disposed, and migrates data stored in the first partial area to the second partial area.

8. A storage system according to claim 1, wherein the storage controller associates each of the plurality of logical storage areas with a virtual address, and in accordance with the migration, associates the second logical storage area with a virtual address associated with the first logical storage area prior to the migration.

9. A storage system comprising:
a plurality of storage devices; and
a storage controller coupled to the plurality of storage devices and a host computer, wherein
each of the plurality of storage devices includes a plurality of nonvolatile semiconductor memory chips, and a memory controller coupled to the plurality of nonvolatile semiconductor memory chips and the storage controller,
the storage controller assigns storage areas provided by each of the plurality of storage devices to a plurality of logical storage areas,
when the storage controller receives a write instruction and write data from the host computer, the storage controller selects a logical storage area from among the plurality of logical storage areas, selects a storage device assigned to the selected logical storage area from among the plurality of storage devices, and transmits the write data to the selected storage device,
when the memory controller receives the write data from the storage controller, the memory controller converts the write data to compressed data by compressing the write data, writes the compressed data to any of the plurality of nonvolatile semiconductor memory chips, and transmits to the storage controller relationship information containing relationship between a data quantity of the write data and a data quantity of the compressed data,
the storage controller regards each of the plurality of logical storage areas as a target area, stores a request data quantity indicating the data quantity of write data written to the target area in a specific period, and regards, based on the request data quantity and the relationship information, as an estimated data quantity of the target area a quantity of data written to the plurality of nonvolatile semiconductor memory chips based on write data written to the target area in the specific period,
the storage controller selects a first logical storage area from among the plurality of logical storage areas, selects from among the plurality of logical storage areas a second logical storage area with an estimated data quantity less than an estimated data quantity of the first logical storage area and assigned to a storage device different from a storage device assigned to the first logical storage area, and migrates first data stored in the first logical storage area to the second logical storage area, the memory controller transmits deterioration information indicating deterioration in the plurality of nonvolatile semiconductor memory chips to the storage controller, the storage controller predicts, based on deterioration information of the each of the plurality of storage devices, a residual lifetime of the corresponding storage device, a residual lifetime of a storage device assigned to the second logical storage area is longer than a residual lifetime of a storage device assigned to the first logical storage area, the first logical storage area and the second logical storage area have the same size, the storage controller reads the first data stored in the first logical storage area, reads second data stored in the second logical storage area, requests the storage device assigned to the second logical storage area to write the first data read to the second logical storage area, and requests the storage device assigned to the first logical storage area to write the second data read to the first logical storage area, the memory controller calculates a compression ratio which is a ratio of the data quantity of compressed data to the data quantity of the write data, and transmits the compression ratio to the storage controller as relationship information on the selected logical storage area, and for a specific logical storage area being each of the plurality of logical storage areas, the storage controller calculates an estimated data quantity of the specific logical storage area by multiplying a request data quantity of the specific logical storage area by a value based on a compression ratio of the specific logical storage area.

10. A method of controlling a storage system including a plurality of storage devices, a storage controller coupled to the plurality of storage devices and a host computer, each of the plurality of storage devices including a plurality of nonvolatile semiconductor memory chips, and a memory controller coupled to the plurality of nonvolatile semiconductor memory chips and the storage controller, the method comprising:
assigning, using the storage controller, storage areas provided by each of the plurality of storage devices to a plurality of logical storage areas, when the storage controller receives a write instruction and write data from the host computer, selecting, using the storage controller, a logical storage area from among the plurality of logical storage areas, selecting, using the storage controller, a storage device assigned to the selected logical storage area from among the plurality of storage devices, and transmitting, using the storage controller, the write data to the selected storage device, when the memory controller receives the write data from the storage controller, converting, using the memory controller, the write data to compressed data by compressing the write data, writing, using the memory controller, the compressed data to any of the plurality of nonvolatile semiconductor memory chips, and transmitting, using the memory controller, to the storage controller relationship information containing relationship between a data quantity of the write data and a data quantity of the compressed data, regarding, using the storage controller, each of the plurality of logical storage areas as a target area, storing, using the storage controller, a request data quantity indicating the data quantity of data written to the target area in a specific period, and regarding, using the storage controller, based on the request data quantity and the relationship information, as an estimated data quantity of the target area a quantity of data written to the plurality of nonvolatile semiconductor memory chips based on write data written to the target area in the specific period, and selecting, using the storage controller, a first logical storage area from among the plurality of logical storage areas, selecting, using the storage controller, from among the plurality of logical storage areas a second logical storage area with an estimated data quantity less than an estimated data quantity of the first logical storage area and assigned to a storage device different from the storage device assigned to the first logical storage area, and migrating, using the storage controller, first data stored in the first logical storage area to the second logical storage area, transmitting, using the memory controller, deterioration information indicating deterioration in the plurality of nonvolatile semiconductor memory chips to the storage controller, predicting, by the storage controller, based on deterioration information of the each of the plurality of storage devices, a residual lifetime of the corresponding storage device, using the storage controller, reading the first data stored in the first logical storage area, reading second data stored in the second logical storage area, requesting the storage device assigned to the second logical storage area to write the first data read to the second logical storage area, and requesting the storage device assigned to the first logical storage area to write the second data read to the first logical storage area, using the memory controller, calculating a compression ratio which is a ratio of the data quantity of compressed data to the data quantity of the write data, and transmitting the compression ratio to the storage controller as relationship information on the selected logical storage area, and for a specific logical storage area being each of the plurality of logical storage areas, calculating, using the storage controller, an estimated data quantity of the specific logical storage area by multiplying a request data quantity of the specific logical storage area by a value based on a compression ratio of the specific logical storage area, wherein a residual lifetime of a storage device assigned to the second logical storage area is longer than a residual lifetime of a storage device assigned to the first logical storage area, and wherein the first logical storage area and the second logical storage area have the same size.

* * * * *